(12) United States Patent
Kawakami

(10) Patent No.: US 7,827,414 B2
(45) Date of Patent: Nov. 2, 2010

(54) CONTENT DATA TRANSMISSION SYSTEM AND CONTENT DATA TRANSMISSION METHOD

(75) Inventor: Takashi Kawakami, Tokyo (JP)

(73) Assignee: Sony Corporation, Tokyo (JP)

( * ) Notice: Subject to any disclaimer, the term of this patent is extended or adjusted under 35 U.S.C. 154(b) by 978 days.

(21) Appl. No.: 10/519,833

(22) PCT Filed: Jun. 8, 2004

(86) PCT No.: PCT/JP2004/008293

§ 371 (c)(1),
(2), (4) Date: Jan. 11, 2005

(87) PCT Pub. No.: WO2004/109686

PCT Pub. Date: Dec. 16, 2004

(65) Prior Publication Data

US 2005/0273632 A1 Dec. 8, 2005

(30) Foreign Application Priority Data

Jun. 9, 2003 (JP) ............................. 2003-163472
Jun. 1, 2004 (JP) ............................. 2004-163320

(51) Int. Cl.
G06F 11/30 (2006.01)
G06F 7/04 (2006.01)
G06F 21/00 (2006.01)
H04N 7/167 (2006.01)

(52) U.S. Cl. ..................... 713/193; 713/189; 380/201; 726/26

(58) Field of Classification Search .............. 726/26; 713/189, 193; 705/57–58; 380/201–203
See application file for complete search history.

(56) References Cited

U.S. PATENT DOCUMENTS 5,537,592 A * 7/1996 King et al. ................. 707/200

(Continued)

FOREIGN PATENT DOCUMENTS

JP 2001-93226 4/2001

(Continued)

*Primary Examiner*—Kimyen Vu
*Assistant Examiner*—Darren Schwartz
(74) *Attorney, Agent, or Firm*—Oblon, Spivak, McClelland, Maier & Neustadt, L.L.P.

(57) ABSTRACT

A library of a PC is easily synchronized with recorded contents of a disc loaded into a recording and reproducing apparatus (PD). The PC has a dynamic group and a database. Contents of the dynamic group are, dynamically changed. The dynamic group is correlated with the ID of the disc on which the contents of the dynamic group have been recorded. When the CP and the PD are connected, the ID of the disc loaded into the PD is read. The database is referenced for the ID of the disc. When there is a corresponding dynamic group, the dynamic group is compared with the recorded contents of the disc. Contents that exist in the dynamic group and that do not exist on the disc are checked out to the disc. In contrast, contents that exist on the disc and that do not exist in the dynamic group are checked in to the PC. In addition, the reproduction order of contents of the dynamic group is reflected to contents of the disc. The user can synchronize the recorded contents of the disc with the library of the PC only by connecting the PC and the PD.

18 Claims, 50 Drawing Sheets

| GROUP NAME | DISC ID | DISC CAPACITY | DYNAMIC FLAG | CHANGE FLAG |
|---|---|---|---|---|
| SONGS YOU HAVE OFTEN LISTENED THIS WEEK | CCCCC | GGGGG | 1 | 1 |
| AA BEST | DDDDD | HHHHH | 0 | 0 |
| NEW SONGS | EEEEE | JJJJJ | 1 | 0 |
| BB SELECT | FFFFF | KKKKK | 0 | 1 |

U.S. PATENT DOCUMENTS

| | | | |
|---|---|---|---|
| 5,715,403 A * | 2/1998 | Stefik | 705/44 |
| 6,038,639 A * | 3/2000 | O'Brien et al. | 711/114 |
| 6,288,862 B1 * | 9/2001 | Baron et al. | 360/55 |
| 6,512,722 B2 * | 1/2003 | Kumagai | 369/30.05 |
| 6,748,539 B1 * | 6/2004 | Lotspiech | 726/20 |
| 6,832,319 B1 * | 12/2004 | Bell et al. | 713/193 |
| 2001/0032088 A1 * | 10/2001 | Utsumi et al. | 705/1 |
| 2002/0161571 A1 * | 10/2002 | Matsushima et al. | 704/200 |
| 2003/0005454 A1 * | 1/2003 | Rodriguez et al. | 725/89 |

FOREIGN PATENT DOCUMENTS

| | | |
|---|---|---|
| JP | 2002-108350 | 4/2002 |
| JP | 2003-77214 | 3/2003 |

* cited by examiner

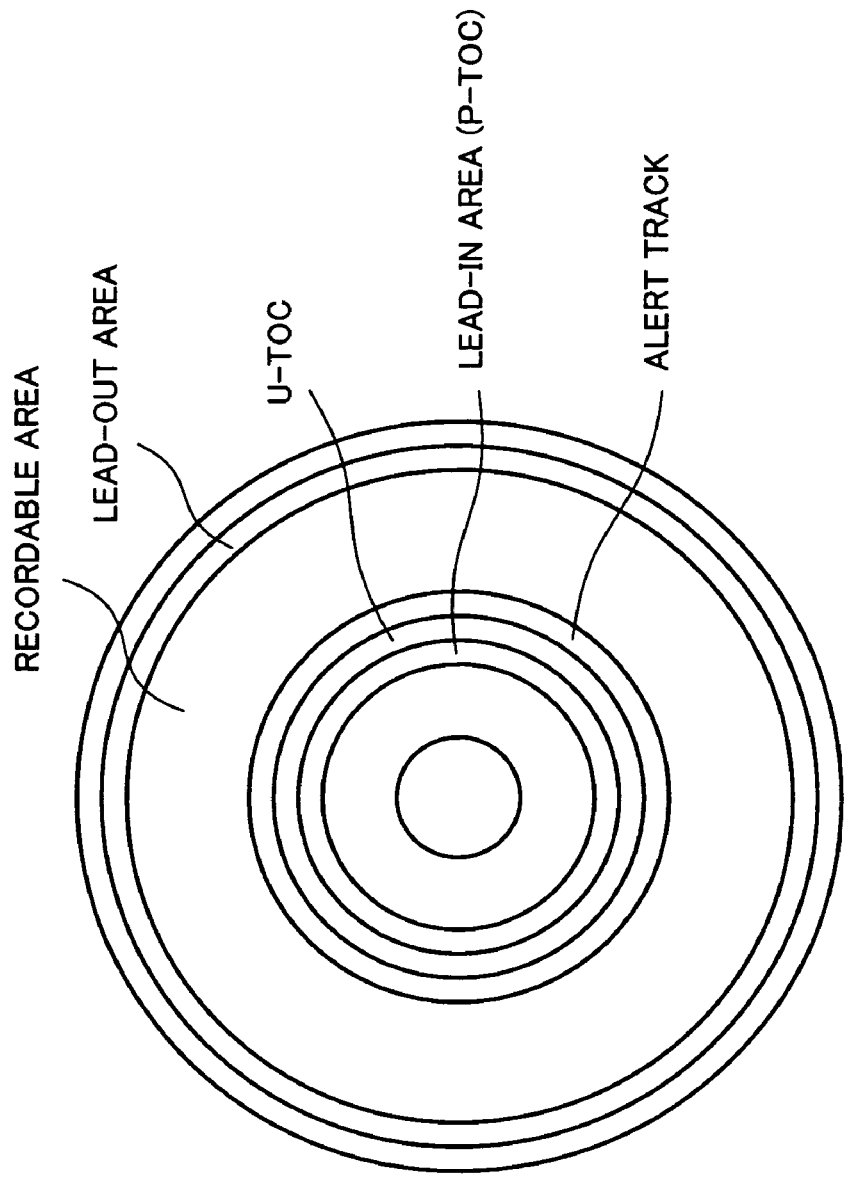

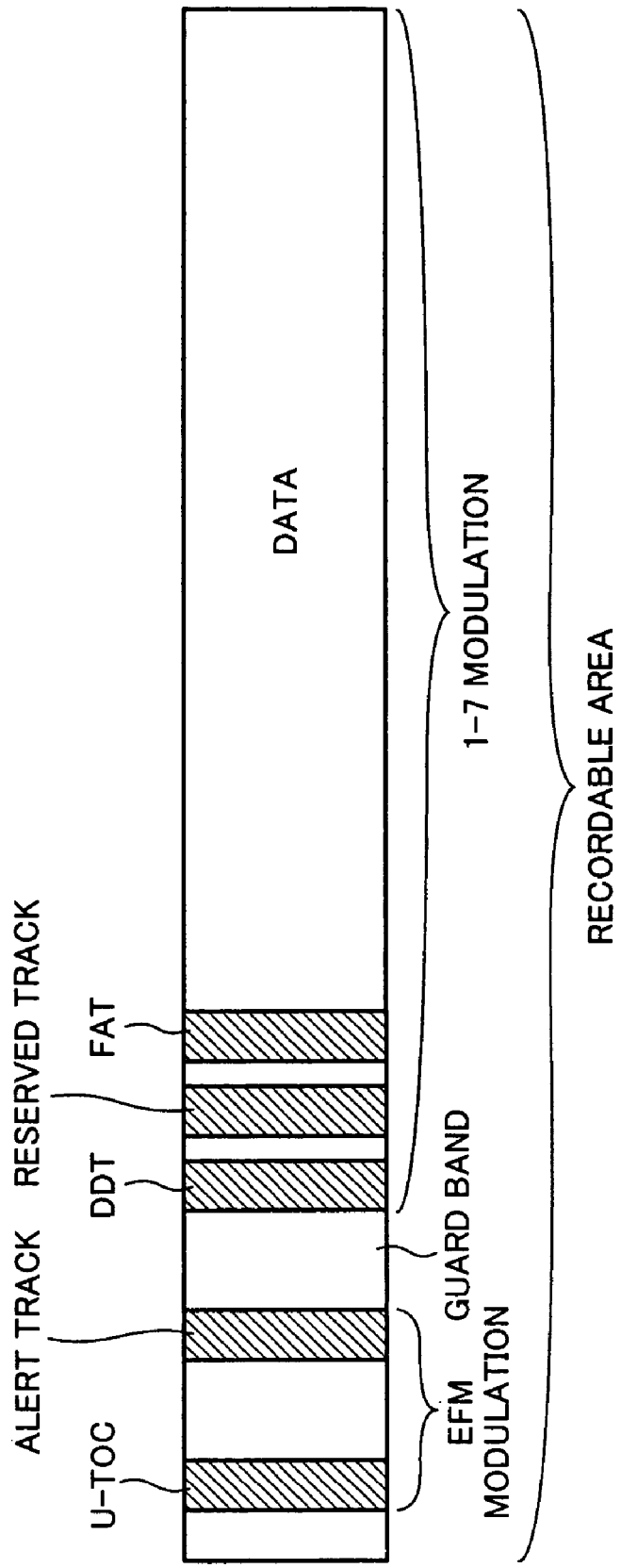

← MOVING DIRECTION OF
MAGNETIC WALL

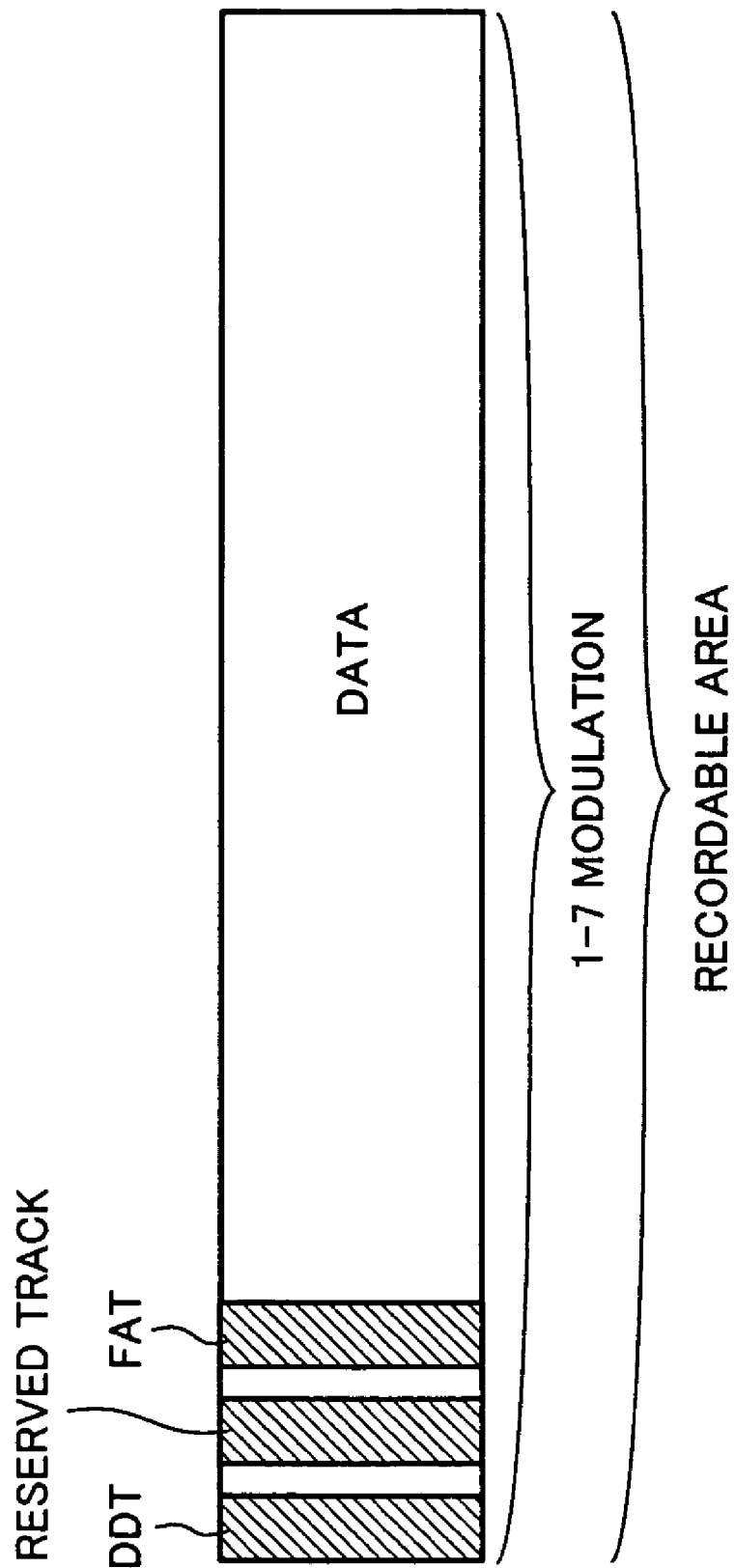

| START TRACK NUMBER | END TRACK NUMBER | GROUP NAME | FLAG |
|---|---|---|---|

Fig. 27A

| TRACK DESCRIPTOR 0 |
|---|
| TRACK DESCRIPTOR 1 |
| TRACK DESCRIPTOR 2 |
| ⋮ |
| TRACK DESCRIPTOR N |

Fig. 27B

| ENCODING SYSTEM | | |
|---|---|---|
| COPYRIGHT MANAGEMENT INFORMATION | KEY INFORMATION | |
| PART NUMBER | ARTIST NAME | TITLE |
| ORIGINAL SONG ORDER | RECORD DURATION | |

| START TRACK NUMBER | END TRACK NUMBER | NAME POINTER | FLAG |
|---|---|---|---|

Fig. 39A

| TRACK DESCRIPTOR 0 |
|---|
| TRACK DESCRIPTOR 1 |
| TRACK DESCRIPTOR 2 |
|  |
| TRACK DESCRIPTOR N |

Fig. 39B

| ENCODING SYSTEM | | | |
|---|---|---|---|
| AUDIO FILE | INDEX | ARTIST NAME | TITLE |
| ORIGINAL SONG ORDER | | RECORD DURATION | |

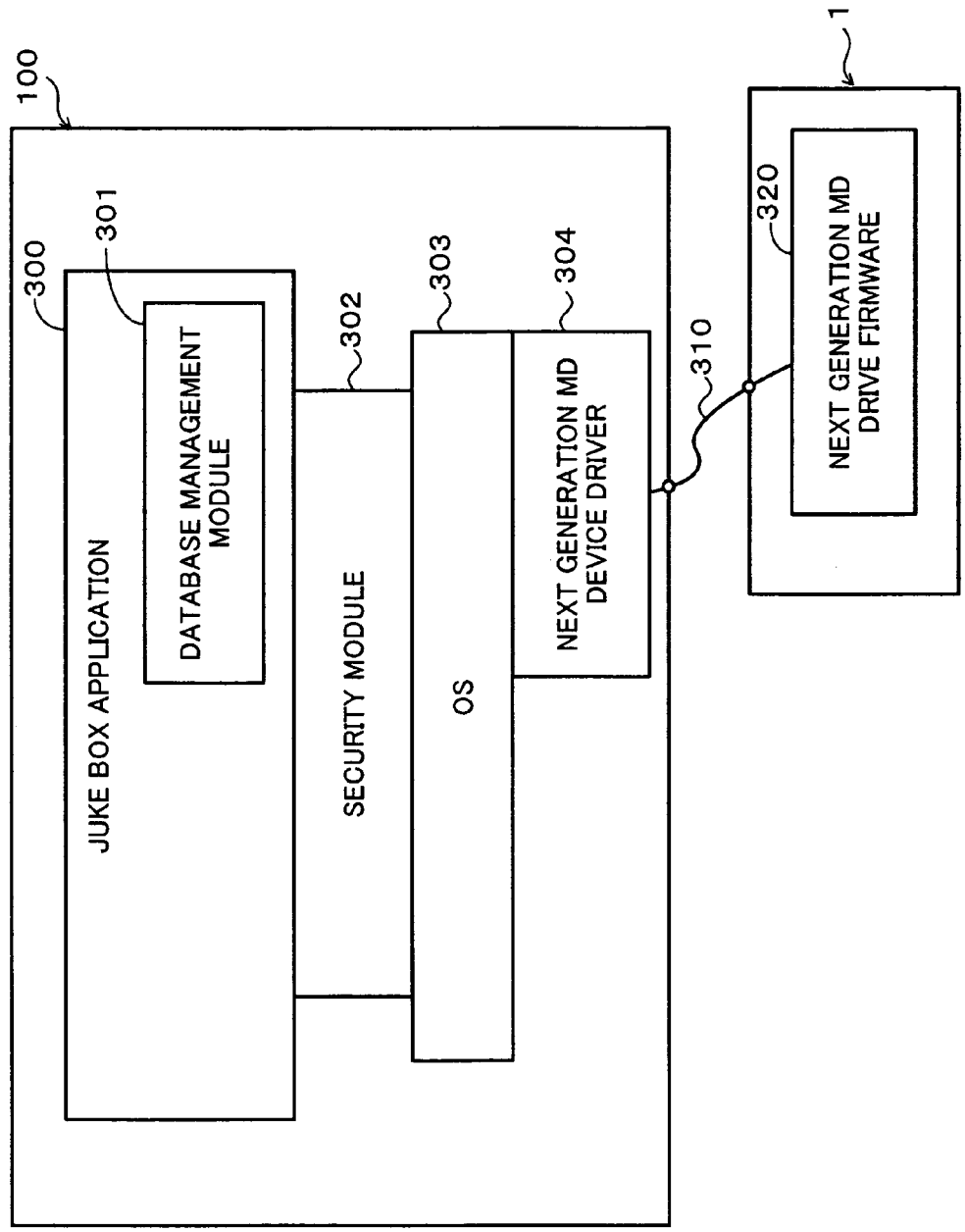

Fig. 48A

| GROUP NAME | DISC ID | DISC CAPACITY | DYNAMIC FLAG | CHANGE FLAG |
|---|---|---|---|---|
| SONGS YOU HAVE OFTEN LISTENED THIS WEEK | CCCCC | GGGGG | 1 | 1 |
| AA BEST | DDDDD | HHHHH | 0 | 0 |
| NEW SONGS | EEEEE | JJJJJ | 1 | 0 |
| BB SELECT | FFFFF | KKKKK | 0 | 1 |

Fig. 48B

| GROUP NAME | CONTENT ID | REPRODUCTION ORDER | NUMBER OF PERMISSIBLE CO TIMES | NUMBER OF REPRODUCTION TIMES |
|---|---|---|---|---|
| SONGS YOU HAVE OFTEN LISTENED THIS WEEK | LLLLLL | 4 | 2 | 2 |
| | NNNNNN | 2 | 2 | 6 |
| | OPOPOP | 1 | 2 | 11 |
| | QQQQQQ | 5 | 1 | 0 |
| | RRRRRR | 3 | 2 | 3 |

CONTENT DATA TRANSMISSION SYSTEM AND CONTENT DATA TRANSMISSION METHOD

TECHNICAL FIELD

The present invention relates to a content data transferring system and a content data transferring system for synchronizing recorded contents of a recording medium with a library that stores contents.

BACKGROUND ART

In recent years, a portable recording and reproducing apparatus that can record and reproduce music and so forth, that has an internal hard disk drive, and that is miniaturized has come out. Such a portable recording and reproducing apparatus is connected to a personal computer so as to manage music data recorded in the apparatus.

For example, a lot of music data are stored in the internal hard disk drive of the personal computer. The music data forms a library. The personal computer forms a music server. Music data are ordinarily ripped from CDs (Compact Discs) or downloaded from a network using a music distributing system operated on a network such as the Internet.

The personal computer and the portable recording and reproducing apparatus are connected with a cable. Music data stored in the library of the personal computer are transferred to the portable recording and reproducing apparatus. The portable recording and reproducing apparatus records the transferred music data to the internal hard disk drive. When the user carries the portable recording and reproducing apparatus with him or her, he or she can enjoy the music data stored in the library of the personal computer anywhere for example outdoors.

Japanese Patent Laid-Open Publication No. 2002-108350 describes a structure for downloading music data from a server that stores a lot of music data and storing the downloaded music data in a user's terminal unit in accordance with a user's request.

On the other hand, as a recording medium to and from which digital audio data is recorded and reproduced, a mini disc (MD) of which a 64-mm diameter magneto-optical disc is contained in a cartridge has been widespread. The MD system uses ATRAC (Adaptive Transform Acoustic Coding) as a compressing system for audio data. Music data are managed with a U-TOC (User TOC (Table Of Contents). In other words, a recording area called U-TOC is formed on the inner periphery of a recordable area of the disc. In the current MD system, the U-TOC is management information that is rewritten in accordance with song order, recording, erasing, and so forth of tracks (audio tracks/data tracks). In addition, the U-TOC manages the start position, end position, and mode of each track and each part that composes a track.

Since the MD system uses a file managing method that is different from the FAT (File Allocation Table) file system that personal computers generally use, the MD system does not have compatibility with the data recording and managing system that general-purpose computers such as personal computers use. Thus, a system that uses a general-purpose managing system such as the FAT system that has high compatibility with personal computers has been proposed.

A portable recording and reproducing apparatus that uses as a recording medium a disc having compatibility with a personal computer may be connected to a music server using the foregoing personal computer. A library stored in the music server may be recorded to the disc.

The recording capacity of a disc of the conventional MD system is around 160 MB. It is thought that the same function as the portable recording and reproducing apparatus using the foregoing hard disk drive can be accomplished with a disc having compatibility with a conventional MD and having an increased recording capacity. To increase the recording capacity of a disc of the conventional MD system, it is necessary to improve the wave length of a laser and the numerical aperture (NA) of an optical head. However, their improvement has their limits. Thus, a system that increases the recording capacity using a technology of such as magnetic super resolution has been proposed.

However, when a personal computer is used as a music server and music data are transferred from the personal computer to the portable recording and reproducing apparatus, it is desired that the library of the personal computer be synchronized with the recorded contents on the portable recording and reproducing apparatus side. However, it is difficult to synchronize all the contents of the library of the music server with the recode contents of the portable recording and reproducing apparatus.

When the portable recording and reproducing apparatus uses a disc of the foregoing MD system as a recording medium, since the recording capacity on the portable recording and reproducing apparatus side is smaller than the capacity of the library, all the contents of the library cannot be synchronized with the portable recording and reproducing apparatus side.

In addition, when the library and the recorded contents on the portable recording and reproducing apparatus side are not automatically synchronized, whenever the portable recording and reproducing apparatus and the personal computer are connected, the user should perform the operation for synchronizing them.

DISCLOSURE OF THE INVENTION

Therefore, an object of the present invention is to provide a content transferring system and a content data transferring method that allow a library on a music server side and recorded contents of a recording medium loaded into a portable recording and reproducing apparatus to be easily synchronized.

Thus, an object of the present invention is a content data transferring system for transferring content data selected from a first recording medium on which a plurality of content data have been recorded to a second recording medium, the content data transferring system comprising: a recording and reproducing apparatus for reproducing various types of recording medium identification information unique to the second recording medium and recording content data transferred from the first recording medium to the second recording medium; first set creating means for creating a first set, the first set being used to correlate the recording medium identification information with a second set, the second set being used to categorize the content data recorded on the first recording medium in accordance with a predetermined rule; second set creating means for creating the second set correlated with the first set; reproduction control information creating means for creating reproduction control information about the content data with the second set; and content transfer controlling means for transferring content data recorded on the first recording medium to the second recording medium so as to record the content data onto the second recording medium in accordance with the reproduction control information created in accordance with the recording medium identification information about the second recording medium, the recording medium identification information being reproduced by the recording and reproducing apparatus.

In addition, the present invention is a content data transferring method for transferring content data selected from a first recording medium on which a plurality of content data have been recorded to a second recording medium onto and from data are recorded and reproduced by a recording and reproducing apparatus, the content data transferring method comprising the steps of: receiving various types of recording medium identification information unique to the second recording medium from which data is reproduced by the recording and reproducing apparatus; creating a second set correlated with a first set in accordance with the recording medium identification information reproduced from the second recording medium, the first set being used to correlate the recording medium identification information with the second set, the second set being used to categorize the content data recorded on the first recording medium in accordance with a predetermined rule; creating reproduction control information about the content data with the second set; and transferring content data recorded on the first recording medium to the recording and reproducing medium so as to record the content data onto the second recording medium in accordance with the reproduction control information created in accordance with the recording medium identification information reproduced from the second recording medium.

As described above, according to the present invention, when content data selected from a first recording medium on which a plurality of content data have been recorded are transferred to a second recording medium onto and from data are recorded and reproduced by a recording and reproducing apparatus, various types of recording medium identification information unique to the second recording medium from which data is reproduced by the recording and reproducing apparatus is received. A second set correlated with a first set in accordance with the recording medium identification information reproduced from the second recording medium is created, the first set being used to correlate the recording medium identification information with the second set, the second set being used to categorize the content data recorded on the first recording medium in accordance with a predetermined rule. Reproduction control information about the content data is created with the second set. Content data recorded on the first recording medium are transferred to the recording and reproducing medium so as to record the content data onto the second recording medium in accordance with the reproduction control information created in accordance with the recording medium identification information reproduced from the second recording medium. Thus, the user can synchronize the recorded contents of the second recording medium with the recorded contents of the first recording medium for each second set in accordance with the reproduction control information.

According to the present invention, when content data selected from a first recording medium on which a plurality of content data have been recorded are transferred to a second recording medium onto and from data are recorded and reproduced by a recording and reproducing apparatus, various types of recording medium identification information unique to the second recording medium from which data is reproduced by the recording and reproducing apparatus is received. A second set correlated with a first set in accordance with the recording medium identification information reproduced from the second recording medium is created, the first set being used to correlate the recording medium identification information with the second set, the second set being used to categorize the content data recorded on the first recording medium in accordance with a predetermined rule. Reproduction control information about the content data is created with the second set. Content data recorded on the first recording medium are transferred to the recording and reproducing medium so as to record the content data onto the second recording medium in accordance with the reproduction control information created in accordance with the recording medium identification information reproduced from the second recording medium. Thus, the present invention has an effect of which the user can synchronize the recorded contents of the second recording medium with the recorded contents of the first recording medium for each second set in accordance with the reproduction control information.

In addition, according to the present invention, a library is formed in a personal computer. The library has dynamic groups of contents that are dynamically changed. The personal computer has a disc ID database that correlates dynamic groups and disc IDs. When the personal computer and a disc drive device are connected, the disc ID of a disc loaded into the disc drive device is obtained from the personal computer side. The disc ID database is searched for the obtained disc ID so as to determine whether or not the disc ID has been correlated with a dynamic group and whether or not the contents of the dynamic group have been changed from those when the personal computer and the disc drive device were connected last time. When the determined result represents that the dynamic group has been changed, the personal computer side performs a check-out for contents of the disc and the disc side performs a check-in for contents to the personal computer. Thus, a dynamic group can be easily updated on a disc loaded into the disc drive device.

BRIEF DESCRIPTION OF DRAWINGS

FIG. 1 is a schematic diagram describing a disc in accordance with the specifications of a next generation MD 1 system;

FIG. 2 is a schematic diagram describing a recording area of the disc in accordance with the specifications of the next generation MD 1 system;

FIG. 4 is a schematic diagram describing a recording area of the disc in accordance with the specifications of the next generation MD 2 system;

FIG. 27A and FIG. 27B are schematic diagrams describing a track information table in accordance with the first example of the audio data managing system;

FIG. 39A and FIG. 39B are schematic diagrams describing a track information table in accordance with the second example of the audio data managing system;

FIG. 47 is a schematic diagram showing an example of the structure of software according to an embodiment of the present invention;

FIG. 48A and FIG. 48B are schematic diagrams showing an example of the structure of a database managed by a jukebox application;

BEST MODES FOR CARRYING OUT THE INVENTION

Figure 3A:
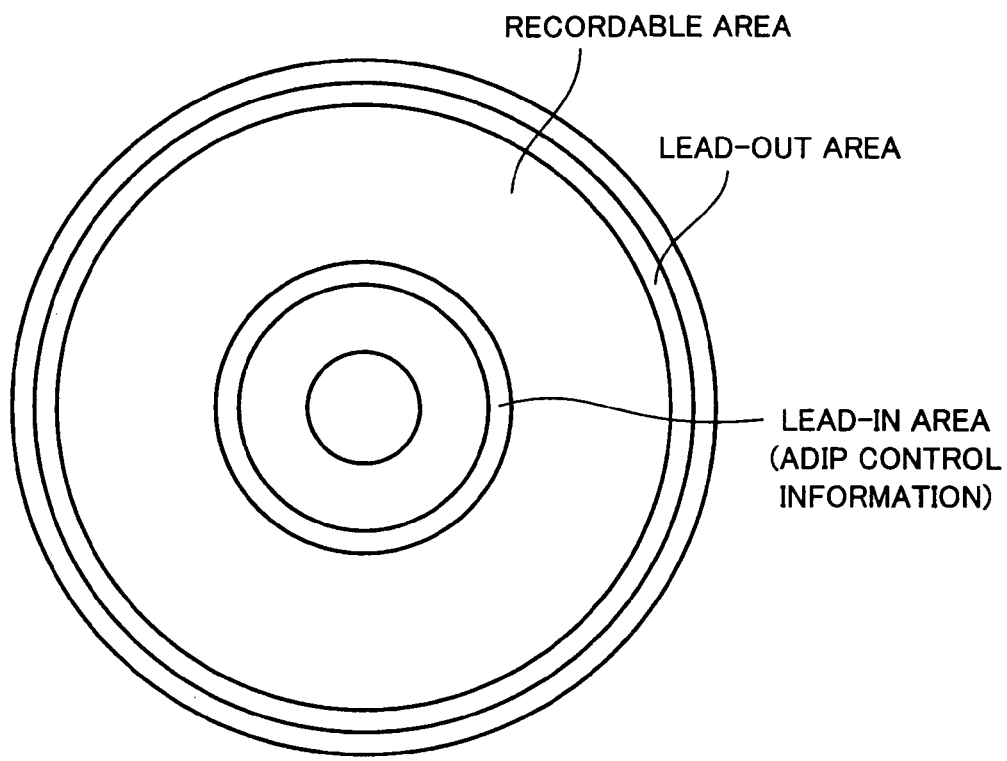
FIG. 3A and FIG. 3B are schematic diagrams describing a disc in accordance with the specifications of a next generation MD 2 system.

Next, an embodiment of the present invention will be described. Before describing the embodiment of the present invention, the following ten sections describe a disc system according to the present invention.

1. Outline of recording'systems
2. About discs
3. Signal formats
4. Structure of recording and reproducing apparatus
5. About initializing processes for disc of next generation MD 1 and disc of next generation MD 2
6. About first managing system for music data
7. Second example of managing system for music data
8. Operations of disc systems when connected to personal computer
9. Copy restriction of audio data recorded on disc
10. About synchronization with library
1. Outline of Recording Systems According to the embodiment of the present invention, a magneto-optical disc is used as a recording medium. Physical properties such a form factor of discs according to the embodiment are substantially the same as discs in accordance with the so-called MD (Mini-Disc) system. However, data on the discs according to the embodiment and arrangement of data on the discs are different from those of the conventional MD.

In reality, the apparatus according to the present invention uses the FAT (File Allocation Table) system as a file managing system to record and reproduce content data such as audio data. Thus, the apparatus can assure the compatibility with the file systems that the conventional personal computers use.

In this example, as described above, terms "FAT" or "FAT system" in this specification are generally used to represent various PC based file systems. Thus, these terms are not intended to represent a predetermined FAT based file system used in DOS (Disk Operating System), VFAT (Virtual FAT) used in Windows 95/98 (registered trademark), FAT 32 used in Windows 98/ME/2000 (registered trademark), and NTFS (NT File System (also called New Technology File System). The NTFS is a file system used in the Windows NT (registered trademark) operating system or (optionally) Windows 2000. The NTFS records and reads a file when reading/writing data from/to a disc.

In addition, according to the present invention, the error correcting system and modulating system of the current MD system are modified so that the recording capacity and reliability of data are improved. Moreover, according to the present invention, content data is encrypted and prevented from being illegally copied so as to protect the copyright of the content data.

As the recording/reproducing formats, there are specifications of next generation MD 1 system and specifications of next generation MD 2 system. The specifications of the next generation MD 1 system use the same disc (namely, a physical medium) as a disc of the current MD system. The specifications of the next generation MD 2 system use a disc whose form factor and outer shape are the same as a disc of the current MD system but whose recording density in the linear recording direction is increased using the magnetic super resolution (MSR). These systems have been developed by the inventor of the present patent application.

The current MD system uses as a recording medium a 64-mm diameter magneto-optical disc contained in a cartridge. The thickness of the disc is 1.2 mm. A center hole having a diameter of 11 mm is formed at the center of the disc. The cartridge is 68 mm long, 72 mm wide, and 5 mm thick.

The shapes of the disc and its cartridge in accordance with the specifications of the next generation MD 1 system are the same as those in accordance with the specifications of the next generation MD 2 system. In both the discs in accordance with the specifications of the next generation MD 1 system and the next generation MD 2 system, the lead-in area starts at 29 mm from the their center like the disc of the current MD system.

The next generation MD 2 system will prescribe that the track pitch be 1.2 µm to 1.3 µm (for example, 1.25 µm). In contrast, the next generation MD 1 system using the disc of the current MD system prescribes that the track pitch be 1.6 µm. The next generation MD 1 system prescribes that the bit length be 0.44 µm/bit. The next generation MD 2 system will prescribe that the bit length be 0.16 µm/bit. The next generation MD 1 system prescribes and the next generation MD 2 system will prescribe that the redundancy be 20.50%.

The recording capacity in the line density direction of the disc of the next generation MD 2 system will be increased using the magnetic super resolution technology. The magnetic super resolution technology uses a phenomenon of which when a cut layer is heated at a predetermined temperature, since the cut layer becomes a magnetically neutral state and a magnetic wall transferred to a reproduction layer is moved, a small mark appears as a large beam spot.

In other words, the disc in accordance with the specifications of the next generation MD 2 system has at least a magnetic layer as a recording layer in which information is recorded, a cut layer, and another magnetic layer from which information is reproduced, these layers being formed on a transparent substrate. The cut layer is a layer for which exchange bonding force is adjusted. When the cutting layer is heated at a predetermined temperature, the cutting layer becomes a magnetically neutral state. A magnetic wall that has been transferred to the recording layer 101 is transferred to the magnetic layer for information that is reproduced. As a result, a small mark appears in a beam spot. When data is recorded, using a technology of which laser pulses are modulated with a magnetic field, a fine mark can be generated.

The disc in accordance with the specifications of the next generation MD 2 system has grooves that are more deeply and sharply formed than the conventional MD disc so as to improve a de-track margin and suppress a crosstalk from a land, a crosstalk of a wobble signal, and focus leakage. The grooves formed on the disc in accordance with the specifications of the next generation MD 2 system have a depth in the range for example from 160 nm to 180 nm. The grooves of this disc have an inclination in the range for example from 60 degrees to 70 degrees. The grooves of this disc have a width in the range for example from 600 nm to 700 nm.

As optical specifications, the next generation MD 1 system prescribes that the wave length λ of a laser be 780 nm and that the numerical aperture NA of an objective lens of an optical head be 0.45. Likewise, as the optical specifications, the next generation MD 2 system will prescribe that the wave length λ of a laser be 780 nm and that the numerical aperture NA of an optical head be 0.45.

As the specifications, the next generation MD 1 system and the next generation MD 2 system prescribe that the groove recording system be used as the recording system. In other words, these systems use grooves formed on a disc surface as tracks to and from which data is recorded and reproduced.

The current MD system prescribes that a convolutional code based on ACIRC (Advanced Cross Interleave Reed-Solomon Code) be used as an error correction code encoding system. In contrast, the next generation MD 1 system and the next generation MD 2 system prescribe that a block completion type code of which RS-LDC (Reed Solomon—Long Distance Code) and BIS (Burst Indicator Subcode) are combined be used as an error correction code encoding system. With the block-completion type error correction code, a linking sector does not need to be used. In the error correction system of which the LDC and the BIS are combined, if a burst error takes place, an error location can be detected with the BIS. An erasure correction can be performed with the LDC code corresponding to the error location.

As an addressing system, a wobbled groove system is used. In the wobbled groove system, single spiral grooves are formed and wobbles as address information are formed on both sides of the grooves. This addressing system is referred to as ADIP (Address in Pregroove). The current MD system, the next generation MD 1 system, and the next generation MD 2 system differ in their line densities. While the current MD system uses a convolutional code called ACRC as an error correction code, the next generation MD 1 system and the next generation MD 2 system uses a block-completion type code of which the LDC and the BIS are combined. Thus, the current MD system is different from the next generation MD 1 system and the next generation MD 2 system in their redundancies and relative positions of ADIP and data. Thus, the specifications of the next generation MD 1 system deals with an ADIP signal different from the specifications of the current MD system. The next generation MD 2 system prescribes an ADIP signal in accordance with the specifications thereof.

While the current MD system uses the EFM (8 to 14 Modulation) system as a modulating system, the specifications of the next generation MD 1 system and the next generation MD 2 system prescribes RLL (1, 7) PP (RLL; Run Length Limited, PP; Parity Preserve/Prohibit rmtr (repeated minimum transition runlength) referred to as 1-7 pp modulating system. The next generation MD 1 system prescribes Viterbi decoding system with partial response PR (1, 2, 1) for a data detecting system, whereas the next generation MD 2 system prescribes Viterbi decoding system with partial response PR (1, −1) ML for a data detecting system.

The specifications of the current MD system, the next generation MD 1 system, and the next generation MD2 system prescribe CLV (Constant Linear Verocity) or ZCAV (Zone Constant Angular Verocity) for a disc driving system. The specifications of the next generation MD 1 system prescribes that the standard linear velocity be 2.4 m/sec. The specifications of the next generation MD 2 system prescribes that the standard linear velocity be 1.98 m/sec. On the other hand, the specifications of the current MD system prescribes that the standard linear velocities for a 60-minute disc and a 74-minute disc be 1.2 m/sec and 1.4 m/sec, respectively.

The specifications of the next generation MD 1 system that uses the disc of the current MD system prescribes that the total data recording capacity per 80-minute disc be around 300 Mbytes. Since the specifications of the next generation MD 1 system prescribes the 1-7 pp modulating system instead of the EFM system for a modulating system, the window margin of the disc of the new generation MD 1 system is 0.666 rather than 0.5 of the disc of the current MD system. As a result, the disc of the new generation MD 1 system accomplishes a high density 1.33 times higher than the disc of the current MD system. In addition, since the next generation MD 1 system prescribes the combination of BIS and LDC for an error correction system, instead of the ACIRC system, since the data efficiency of the next generation MD 1 system improves, the system can accomplish a recording density 1.48 times as high as the current MD system. In total, the next generation MD 1 system can accomplish a data capacity twice as high as the current MD system.

The disc in accordance with the specifications of the next generation MD 2 system, which uses the magnetic super resolution technology, has a higher density than the current MD system and the next generation MD 2 system. The total recording capacity of the disc in accordance with the specifications of the next generation MD 2 system is as large as around 1 Gbytes.

The next generation MD 1 system prescribes that the data rate as a standard linear velocity be at 4.4 Mbits/second. The next generation MD 2 system prescribes that the data rate be at 9.8 Mbits/second.

2. About Discs

FIG. 1 shows the structure of the disc of the next generation MD 1 system. The disc of the next generation MD 1 system uses the disc of the current MD system. In other words, the disc of the next generation MD 1 system is composed of a transparent polycarbonate substrate, a dielectric film, a magnetic film, another dielectric film, and a reflection film. These films are successively formed on the transparent polycarbonate substrate. Above the reflection film, a protection film is formed.

As shown in FIG. 1, on the disc of the next generation MD 1 system, a P-TOC (Pre-mastered TOC (Table Of Contents) area is formed in a lead-in area on the innermost periphery of a recording area of the disc. The innermost periphery of the recording area represents the most inner side in the radial direction from the center of the disc. This area becomes a pre-mastered area as a physical structure. In other words, with embossed pits, control information and so forth are recorded as for example P-TOC information.

The outer periphery of the lead-in area for the P-TOC area is a recordable area. In the recordable area, grooves are formed as guide grooves for recording tracks. A U-TOC (user TOC) is formed on the inner periphery of the recordable area. In this example, the outer periphery represents an outer periphery in the radial direction from the center of the disc.

The U-TOC has the same structure as the U-TOC for management information of the disc of the current MD system. The U-TOC of the current MD system is management information that is rewritten in accordance with the order, recording, erasing, and so forth of tracks. With the U-TOC, the start position, end position, mode of each track, and each part that composes each track are managed. In this example, a track generally represents an audio track and/or a data track.

An alert track is formed on the outer periphery of the U-TOC. In this track, an alarm sound is recorded. The alarm sound is output by the MD player of the current MD system when the disc of the next generation MD 1 system is loaded into the MD player. The alarm sound represents that the disc can be used in the next generation MD 1 system, not reproduced in the current MD system. The rest of the recordable area extends in the radial direction to the lead-out area. FIG. 2 shows the rest of the recordable area in detail.

FIG. 2 shows the structure of the recordable area of the disc in accordance with the specifications of the next generation MD 1 system shown in FIG. 1. As shown in FIG. 2, at the beginning on the inner periphery side of the recordable area, the U-TOC and the alert track are formed. In the area for the U-TOC and the alert track, data that has been modulated in accordance with the EFM system is recorded so that the data can be reproduced by the player of the current MD system. On the outer periphery of the area for the data that has been modulated in accordance with the EFM system, an area for data that has been modulated in accordance with the 1-7 pp modulating system for the next generation MD 1 system is formed. The area for data that has been modulated in accordance with the EFM system and the area for data that has been modulated in accordance with the 1-7 pp modulating system are spaced by a predetermined distance referred to as "guard band." With the guard band, when the disc in accordance with the specifications of the next generation MD 1 system is loaded into the player of the current MD system, the player can be prevented from malfunctioning.

At the beginning of the area for the data that has been modulated in accordance with the 1-7 pp modulating system, a DDT (Disc Description Table) and a reserved track are formed. The DDT area is formed for a substituting process for a physically defective area. In the DDT area, an identification code unique to the disc is recorded. The identification code unique to the disc is referred to as UID (Unique ID). In the next generation MD 1, the UID is generated in accordance with a random number that is generated in a predetermined manner. When the disc is initialized, the UID is recorded as will be described later. With the UID, the security of the recorded content of the disc can be managed. On the reserved track, information for protecting contents is stored.

The area for the data that has been modulated in accordance with the 1-7 pp modulating system has an FAT (File Allocation Table) area. The FAT area is an area for which data is managed in accordance with the FAT system. The FAT system manages data on the basis of the FAT system used in general-purpose personal computers. The FAT system manages files with an FAT chain using an FAT table that describes a file in a root directory, a directory that represents entry points of files, and connection information of FAT clusters. The term "FAT" is generally used in various different file management methods for PC operating systems.

On the disc in accordance with the specifications of the next generation MD 1 system, in the U-TOC area, information for the start position of the alert track and information for the start position of the area for the data that has been modulated in accordance with the 1-7 pp modulating system are recorded.

When the disc of the next generation MD 1 system is loaded into the player of the current MD system, the U-TOC area is read from the disc. With the information of the U-TOC, the position of the alert track is obtained. Thereafter, the alert track is accessed and data is reproduced therefrom. An alarm sound that represents that data cannot be reproduced by the player of the current MD system has been recorded in the alert track. The user can know that the disc cannot be used for the player of the current MD system with the alarm sound.

The alarm sound may be a vocal alarm such as "This disc cannot be used by this player." Of course, the alarm sound may be a simple beep sound, a tone, or another alarm signal.

When the disc of the next generation MD 1 system is loaded into the player of the next generation MD 1 system, the U-TOC area is read. With information of the U-TOC area, the start position of the area for data that has been modulated in accordance with the 1-7 pp modulating system is detected. From the area, the DDT, the reserved track, and the FAT area are read. In the area for the data that has been modulated in accordance with the 1-7 pp modulating system, data is managed in accordance with the FAT system instead of the U-TOC.

Figure 3B:
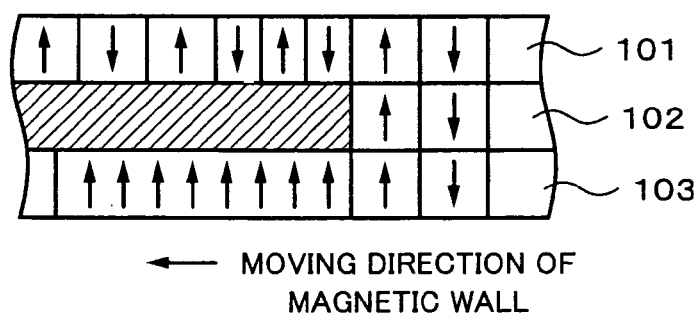

FIG. 3A and FIG. 3B show the disc of the next generation MD 2. The disc is composed of a transparent polycarbonate substrate, a dielectric film, a magnetic film, another dielectric film, and a reflection film. These films are successively formed on the polycarbonate substrate. Above the reflection film, a protection film is formed.

As shown in FIG. 3A, control information of an ADIP signal is recorded in a lead-in area formed in the radial direction from the center of the disc on the inner periphery thereof. On the disc of the next generation MD 2, a P-TOC of embossed pits is not formed in the lead-in area. Instead, the control information of the ADIP signal is used. A recordable area starts from the outer periphery of the lead-in area. The recordable area is a recordable/reproducible area in which grooves are formed as guide grooves of recording tracks. In the recordable area, data that has been modulated in accordance with the 1-7 pp modulating system is recorded.

As shown in FIG. 3B, the disc in accordance with the specifications of the next generation MD 2 is composed of a magnetic layer 101 made of a magnetic film as a recording layer for information, a cut layer 102, and another magnetic layer 103 for information that is reproduced. The cut layer 102 is a layer for which exchange bonding force is adjusted. When the cut layer is heated at a predetermined temperature, the cut layer 102 becomes a magnetically neutral state. The magnetic wall transferred to the recording layer 101 is transferred to the magnetic layer 103 for information that is reproduced. Thus, a microscopic mark in the recording layer 101 appears as an enlarged mark in a beam spot in the magnetic layer 103 for data that is reproduced.

On the disc of the next generation MD 2, the foregoing UID has been recorded in an area on the inner periphery of the recordable area. The area for the UID is a reproducible and non-recordable area for, a consumer's recording and reproducing apparatus on the disc of the next generation MD 2, the UID is recorded in accordance with the same technology as the BCA (Burst Cutting Area) technology used for a DVD (Digital Versatile Disc) and so forth when the disc is produced. When the disc has been produced, since the UID has been generated and recorded thereon, the UID can be managed. Thus, the security of the disc of the next generation MD 2 can be more improved than the disc of the next generation MD 1 of which the UID is generated in accordance with a random number for example when the disc is initialized. The details of the format and so forth of the UID will be described later.

For preventing the description from becoming complicated, the pre-recorded area for the UID of the disc of the next generation MD 2 is referred to as BCA.

Information of the lead-in area can distinguish the disc of the next generation MD 1 from the disc of the next generation MD 2. In other words, when a P-TOC of embossed pits is detected in the lead-in area, the detected result represents the disc of the current MD system or the disc of the next generation MD 1. When control information of an ADIP signal rather than a P-TOC of embossed pits is detected from the lead-in area, the detected result represents the disc of the next generation MD 2. Alternatively, depending on the UID recorded in the BCA, the disc of the next generation MD 2 can be distinguished from the disc of the next generation MD 1. The disc of the next generation MD 1 and the disc of the next generation MD 2 can be distinguished by other than the foregoing method.

FIG. 4 shows the structure of the recordable area of the disc in accordance with the specifications of the next generation MD 2. As shown in FIG. 4, data that has been modulated in accordance with the 1-7 pp modulating system is recorded in the recordable area. On the inner periphery of the area for the data that has been modulated in accordance with the 1-7 pp modulating system, a DDT area and a reserved track are formed. The DDT area is formed for data with which a substitute area for a physically defective area is managed.

In reality, in the DDT area is recorded a management table for which a substitute area including a recordable area substituted for a physically defective area is managed. In the management table is recorded logical clusters determined as defective clusters. Moreover, in the management table is recorded one or more logical clusters assigned as substitute logical clusters. In the DDT area is recorded the foregoing UID. In the reserved track is stored information for which contents are protected.

In addition, the area for the data that has been modulated in accordance with the 1-7 pp modulating system has an FAT area. The FAT area is an area for which data is managed in accordance with the FAT system. The FAT system manages data in accordance with the FAT system used in general-purpose personal computers.

The disc of the next generation MD 2 does not have the U-TOC area. When the disc of the next generation MD 2 is loaded into the player of the next generation MD 2, the DDT, reserved track, and FAT area formed at predetermined positions are read and data is managed in accordance with the FAT system.

The disc of the next generation MD 1 and the disc of the next generation MD 2 do not need an initializing operation that takes a lot of time. In other words, the disc in accordance with the specifications of the next generation MD 1 and the disc in accordance with the specifications of the next generation MD 2 do not need an initializing operation, but creating a minimum number of tables such as the DDT, reserved track, and FAT table. Thus, when the disc in accordance with the specifications of the next generation MD 1 or the next generation MD 2 system is an unused disc, data can be directly recorded in the recordable area thereof and reproduced therefrom.

As described above, when the disc of the next generation MD 2 has been produced, the UID has been created and recoded thereon. Thus, the disc of the next generation MD 2 can be more securely managed than the disc of the current MD system. However, the number of layers of the disc of the next generation MD 2 is larger than that of the disc of the current MD system. The cost of the disc of the next generation MD 2 is more expensive than that of the disc of the current MD system. Thus, a disc called next generation MD 1.5 has been proposed. The disc of the next generation MD 1.5 has the same recordable area, lead-in area, and lead-out area as the disc of the next generation MD 1. In addition, the disc of the next generation MD 1.5 has a UID that is the BCA used for the DVD like the disc of the next generation MD 2.

Hereinafter, unless otherwise needed, the description of the next generation MD 1.5 system will be omitted. In other words, with respect to the UID, the next generation MD 1.5 is based on the next generation MD 2. On the other hand, with respect to recording and reproducing of audio data, the next generation MD 1.5 is based on the next generation MD 1.

Figure 5:
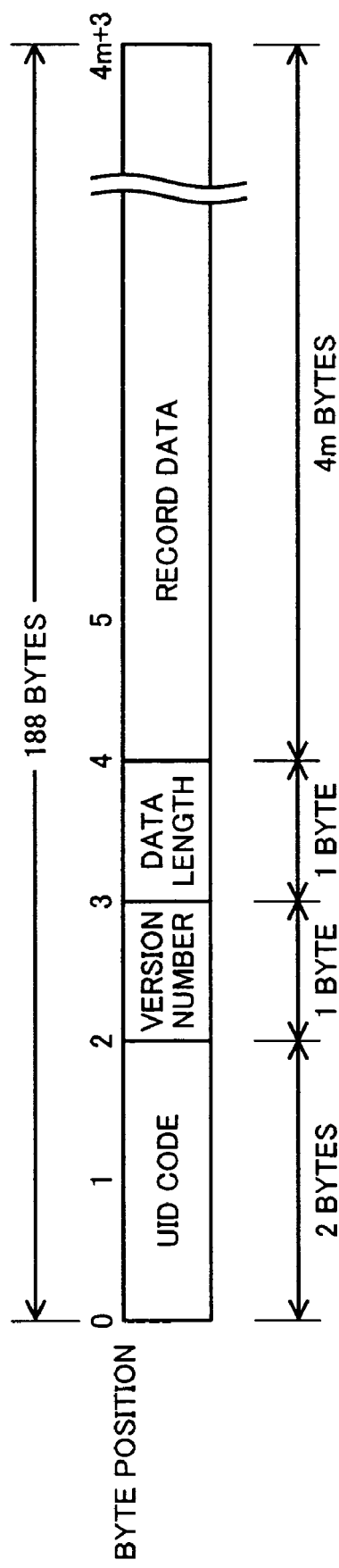
FIG. 5 is a schematic diagram showing an example of an outlined format of an UID.

Next, the UID will be described in detail. As described above, when the disc has been produced, the UID has been recorded on the disc of the next generation MD 2 using technology referred to as BCA used for the DVD. FIG. 5 shows an example of an outlined format of the UID. The whole UID is referred to as UID record block.

In the UID block, the first two bytes is a field for the UID code. The high order four bits of two bytes, namely 16 bits, of the UID code is used for determining the disc. When the four bits is [0000], it represents the disc of the next generation MD 2. When the four bits is [0001], it represents the disc of the next generation MD 1.5. The other values are reserved for future extensions. The low order 12 bits of the UID code is an application ID that can distinguish 4096 types of services.

The UID code is followed by a version number field of one byte. The version number field is followed by a data length field of one byte. The data length field represents the data length of a UID record data field preceded by the data length field. The UID record data field is assigned 4 m (where m=0, 1, 2, . . . ) bytes that does not exceed 188 bytes. The UID record data field can store a unique ID created by a predetermined method. The unique ID can identify the disc itself.

On the disc of the next generation MD 1, in the UID record data field can be recorded an ID created in accordance with an random number.

A plurality of UID record blocks whose data length does not exceed 188 bytes can be created.

3. Signal Formats

Next, signal formats of the next generation MD 1 system and the next generation MD 2 system will be described. The current MD system uses an ACIRC, which is a convolutional code, as an error correcting system. In the current MD system, a sector composed of 2352 bytes corresponding to the data amount of a sub code block is used as a record/reproduction access unit. When a convolutional code is used, an error correction code sequence extends over a plurality of sectors. Thus, when data is rewritten, it is necessary to form a linking sector between adjacent sectors. As an addressing system, the ADIP is used as a wobbled groove system of which single spiral grooves ate formed and wobbles as address information are formed on both sides of the grooves. In the current MD system, an ADIP signal is arranged so that sectors composed of 2352 bytes each can be optimally accessed.

On the other hand, the specifications of the next generation MD 1 system and the specifications of the next generation MD 2 system prescribe that a block-completion type code of which the LDC and the BIS are combined be used and that a record/reproduction access unit be 64 kbytes. A block-completion type code does not need a linking sector. Thus, the specifications of the next generation MD 1 that uses the current MD system prescribes that the ADIP signal be changed in accordance with the new recording system. The specifications of the next generation MD 2 prescribes that the ADIP signal be changed in accordance therewith.

Figure 6:
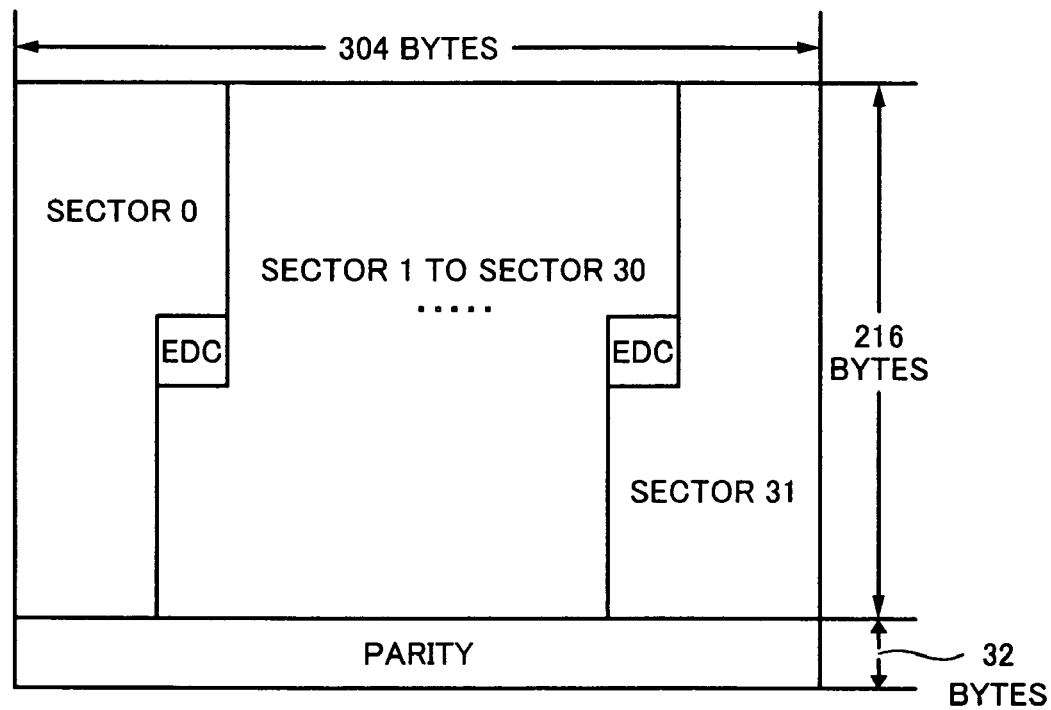
FIG. 6 is a schematic diagram describing an error correction code encoding process for the next generation MD 1 and the next generation MD 2.
Figure 7:
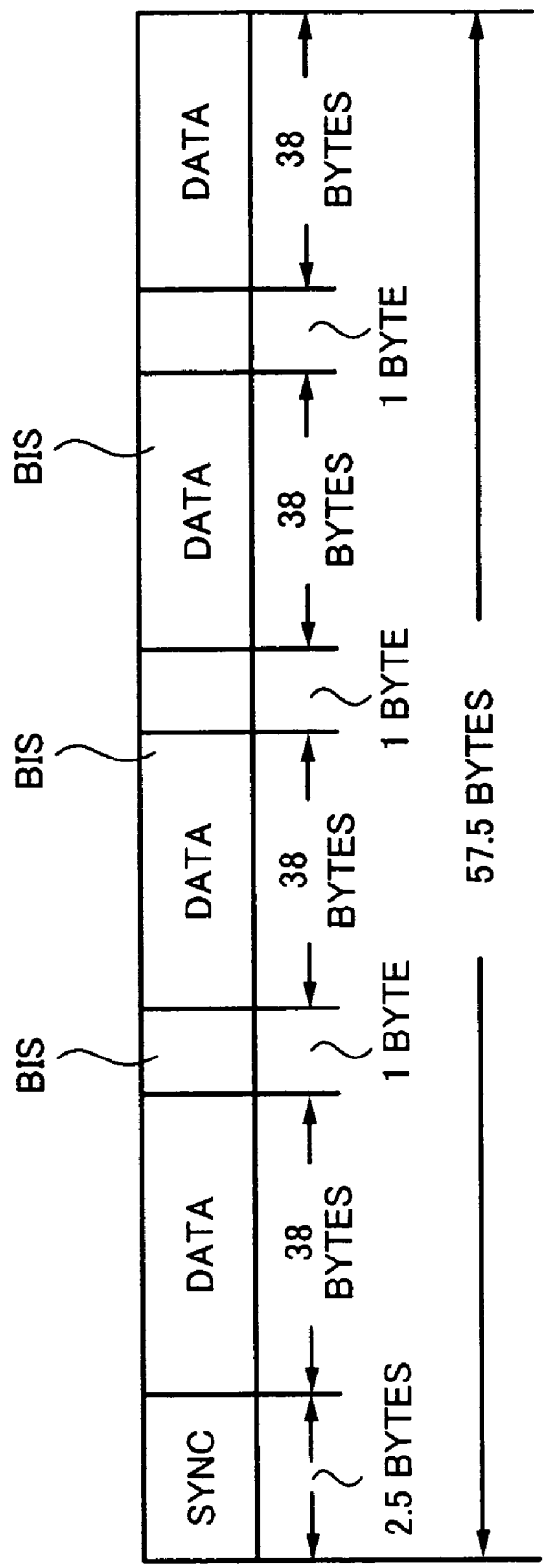
FIG. 7 is a schematic diagram describing the error correction code encoding process for the next generation MD 1 and the next generation MD 2.
Figure 8:
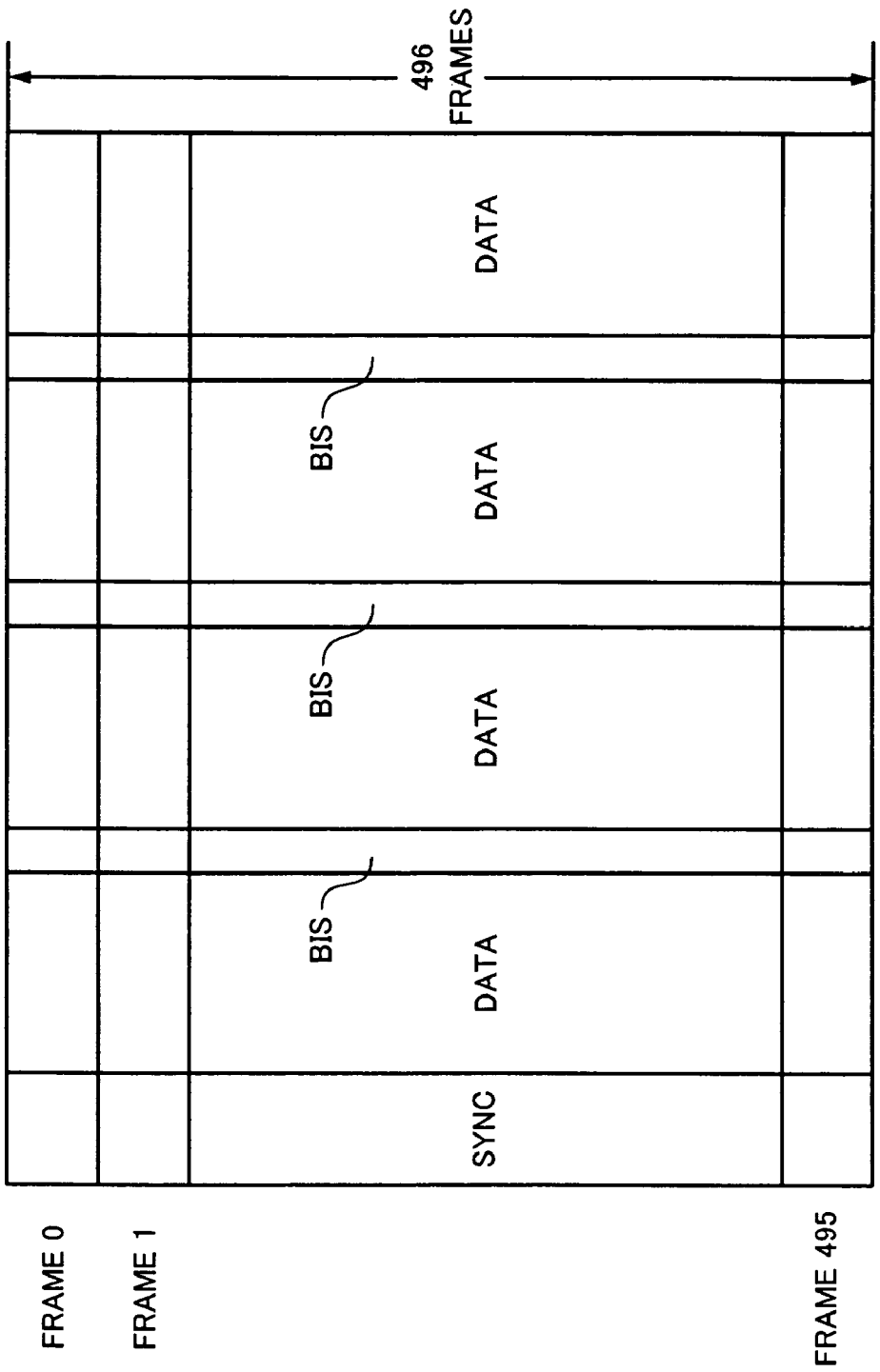
FIG. 8 is a schematic diagram describing the error correction code encoding process for the next generation MD 1 and the next generation MD 2.

With reference to FIG. 6, FIG. 7, and FIG. 8, an error correcting system used in the next generation MD 1 system and the next generation MD 2 system will be described. In the next generation MD 1 system and the next generation MD 2 system, the error correction code encoding system using the LDC shown in FIG. 6 and the BIS system shown in FIG. 7 and FIG. 8 are combined.

FIG. 6 shows the structure of a block encoded with an error correction code in accordance with the LDC. As shown in FIG. 6, the block is two-dimensionally composed of 304 bytes (in the horizontal direction)×216 bytes (in the vertical direction). The block has 32 sectors each of which is composed of 2 kbytes. An error detection code EDC of four bytes is added to each sector. A parity of a Reed-Solomon code of 32 bytes is added in the vertical direction of the block.

FIG. 7 and FIG. 8 show the structure of a BIS. As shown in FIG. 7, a BIS of one byte is placed every 38 bytes of data. Data of (38×4=152 bytes), BIS data of three bytes, and a frame sync of 2.5 bytes, namely a total of 157.5 bytes, compose one frame.

As shown in FIG. 8, one BIS block is composed of 496 frames each of which has the foregoing structure. BIS data (3×496=1488 bytes) contains user control data of 576 bytes, an address unit number of 144 bytes, and an error correction code of 768 bytes.

Since the BIS data is composed of data of 1488 bytes and an error correction code of 768 bytes, errors can be strongly corrected. When a BIS code is embedded every 38 bytes, if a burst error takes place, the error location thereof can be detected. In accordance with the error location, an erasure correction can be performed with an LDC code.

Figure 9:
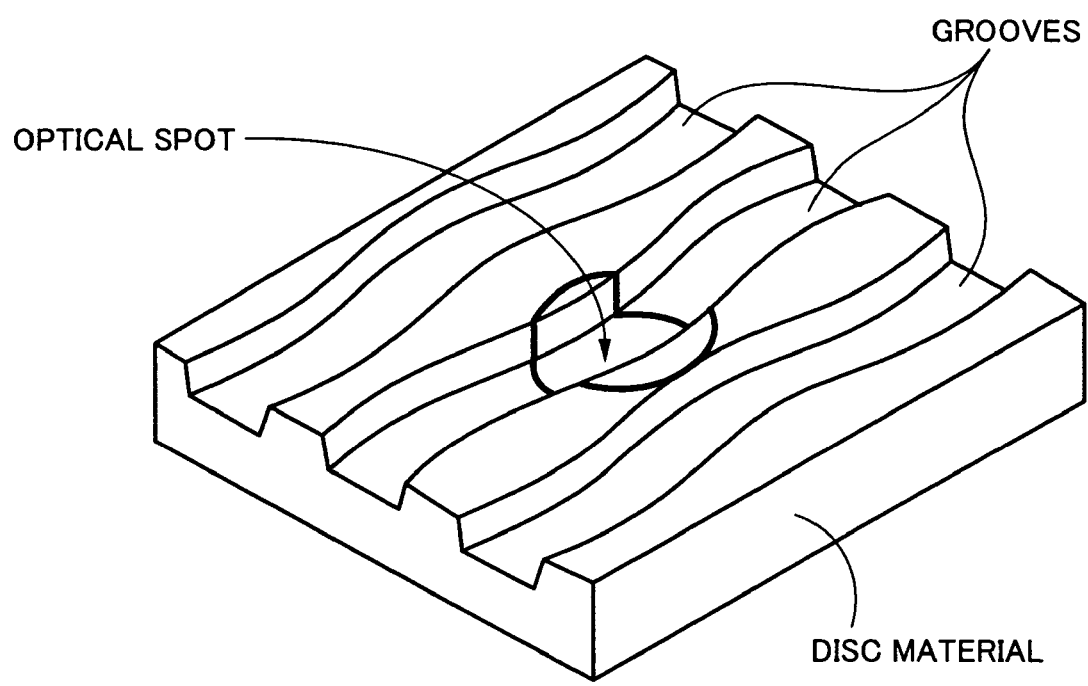
FIG. 9 is a perspective view describing the generation of an address signal using wobbles.

As shown in FIG. 9, the ADIP signal is recorded as wobbles formed on both sides of single spiral grooves. In other words, the ADIP signal has address data that has been FM-modulated. The ADIP signal is recorded as grooved wobbles of the disc material.

Figure 10:
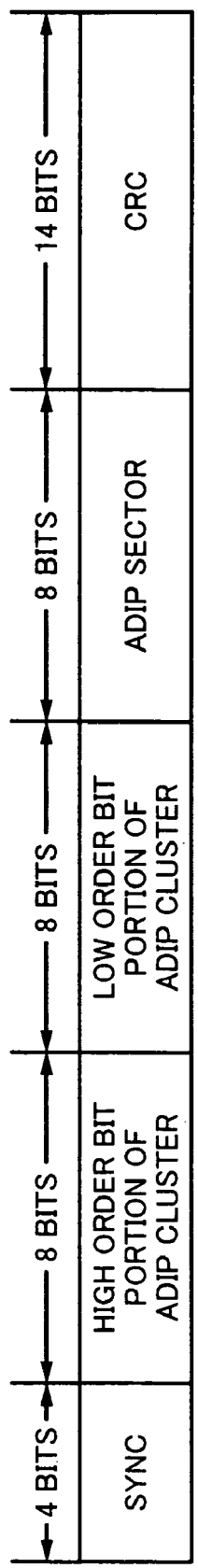
FIG. 10 is a schematic diagram describing an ADIP signal for the current MD system and the next generation MD 1 system.

FIG. 10 shows a sector format of the ADIP signal of the next generation MD 1.

As shown in FIG. 10, an ADIP sector corresponding to one sector of the ADIP signal is composed of a sync of four bits, a high order bit portion of an ADIP cluster number of eight bits, a low order bit portion of the ADIP cluster number of eight bits, an ADIP sector number of eight bits, and an error detection code CRC of 14 bits.

The sync is a signal having a predetermined pattern with which the beginning of an ADIP sector is detected. Since the current MD system uses a convolutional code, the system needs a linking sector. A linking sector number has negative values "FCh," "FDh," "FEh," and "FFh" (where h represents a hexadecimal number). On the other hand, since the next generation MD 1 uses the disc of the current MD system, the format of the ADIP sector of the next generation MD 1 is the same as that of the current MD system.

Figure 11:
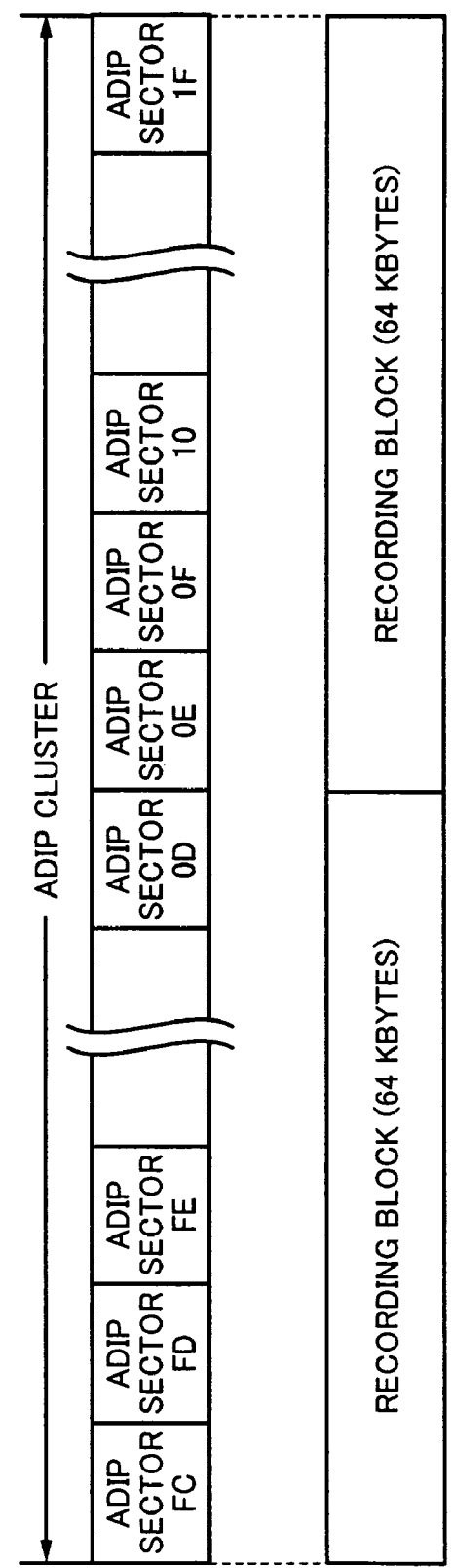
FIG. 11 is a schematic diagram describing the ADIP signal for the current MD system and the next generation MD 1 system.

As shown in FIG. 11, the next generation MD 1 system prescribes that an ADIP cluster be composed of 36 sectors of ADIP sector numbers "FCh" to "FFh" and "0Fh" to "1Fh. As shown in FIG. 10, data of two recording blocks (64 kbytes each) are arranged in one ADIP cluster.

Figure 12:
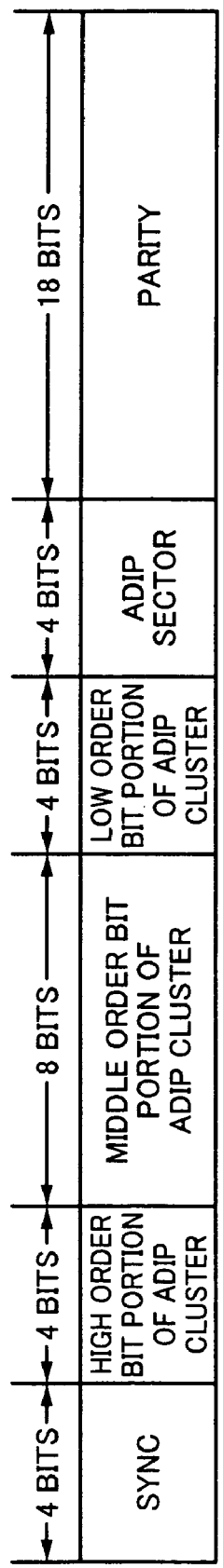
FIG. 12 is a schematic diagram describing the ADIP signal for the next generation MD 2 system.

FIG. 12 shows the structure of an ADIP sector of the next generation MD 2. The specifications of the next generation MD 2 prescribes that an ADIP sector be composed of 16 sectors. Thus, the ADIP sector number can be represented with four bits. Since the next generation MD system uses a block-completion error correction code, the system does not need a linking sector.

As shown in FIG. 12, an ADIP sector of the next generation MD 2 is composed of a sync of four bits, a high order bit portion of an ADIP cluster number of four bits, a middle order bit portion of the ADIP cluster number of eight bits, a low order bit portion of the ADIP cluster number of four bits, an ADIP sector number of four bits, and an error correction parity of 18 bits.

Figure 13:
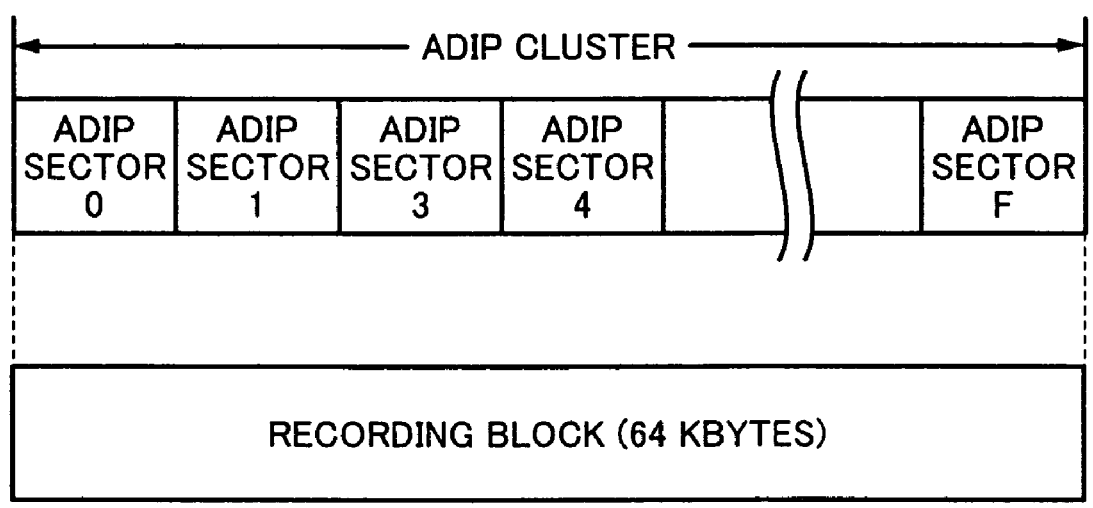
FIG. 13 is a schematic diagram describing the ADIP signal for the next generation MD 2 system.

The sync is a signal with which the beginning of an ADIP sector is detected. As an ADIP cluster number, 16 bits of high order four bits, middle order eight bits, and low order four bits are described. Since an ADIP cluster is composed of 16 ADIP sectors, the ADIP sector number is composed of four bits. The current MD system prescribes that an error detection code be composed of 14 bits and that an error correction parity be composed of 18 bits. As shown in FIG. 13, the specifications of the next generation MD 2 system prescribes that data of one recording block (64 kbytes) be allocated to one ADIP cluster.

Figure 14:
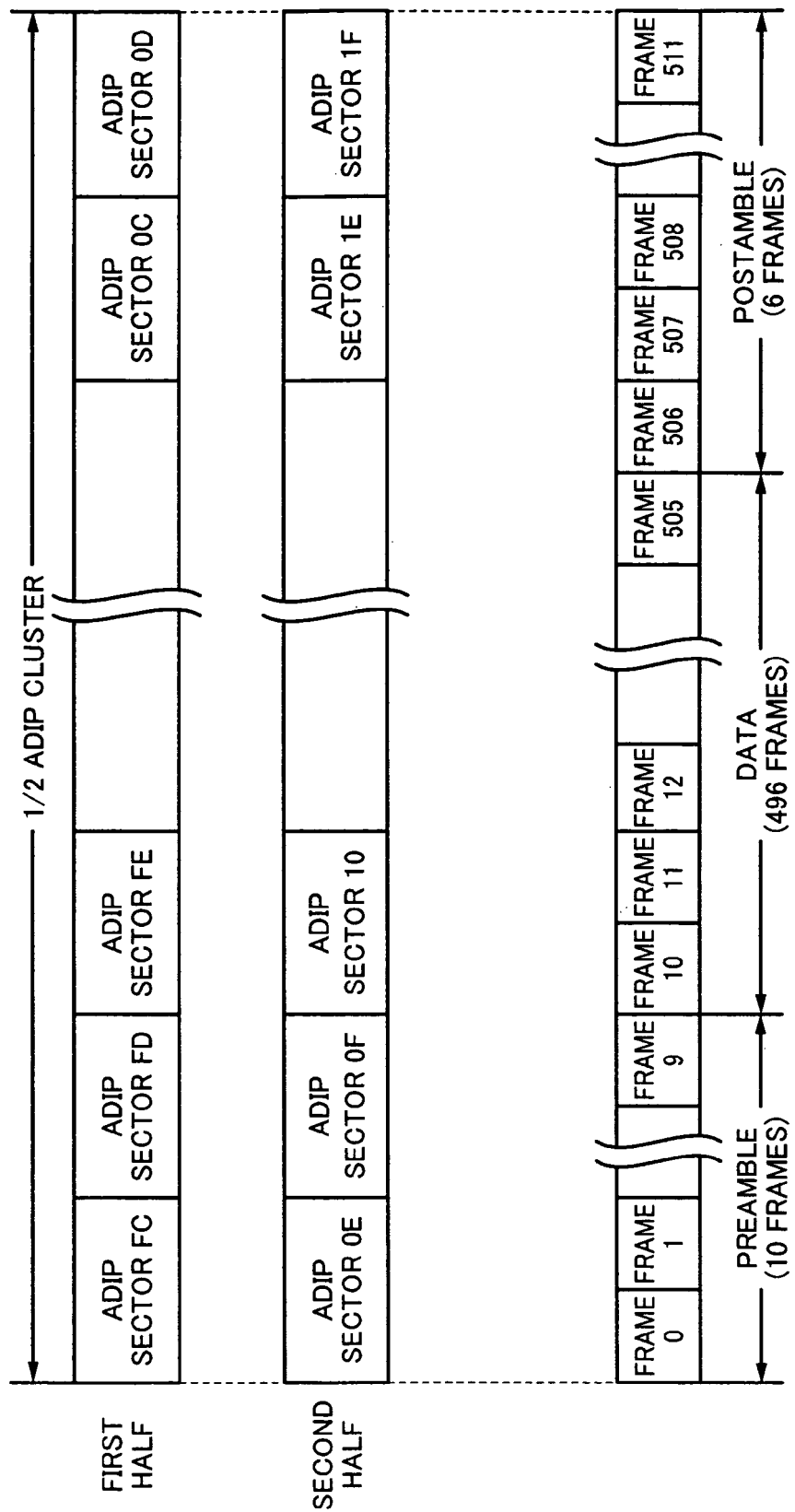
FIG. 14 is a schematic diagram showing the relation between the ADIP signal and frames for the current MD system and the next generation MD 1 system.

FIG. 14 shows the relation of an ADIP cluster and BIS frames in accordance with the next generation MD 1.

As shown in FIG. 11, the specifications of the next generation MD 1 prescribes that one ADIP cluster be composed of 36 ADIP sectors of "FC" to "FF" and "00" to "1F." Two recording blocks (64 kbytes each) are allocated to one ADIP cluster. One recording block corresponds to a record/reproduction unit.

As shown in FIG. 14, one ADIP sector is divided into a first half portion of 18 sectors and a second half portion of 18 sectors.

Data of one recording block as a record/reproduction unit are allocated to a BIS block composed of 496 frames. Before 496 data frames (frame "10" to frame "505") corresponding to the BIS block, a preamble of 10 frames (frame "0" to frame "9") is added. After the frames, a postamble of six frames (frame 506 to frame 511) is added. Data of a total of 512 frames are allocated in a first half portion of the ADIP cluster of ADIP sector "FCh" to ADIP sector "0Dh." The frame of the preamble before the data frame and the frame of the postamble are used to protect data linked with an adjacent recording block. For example, the preamble is used to operate the PLL for data, control the amplitude of the signal, and control the signal offset.

A physical address to and from which data of a recording block are recorded and reproduced is designated by an ADIP cluster and the first half or second half thereof. When a physical address is designated for data that are recorded or reproduced, an ADIP sector is read from the ADIP signal. An ADIP cluster number and an ADIP sector number are read from a signal reproduced from the ADIP sector. As a result, the first half of the ADIP cluster is distinguished from the second half thereof.

Figure 15:
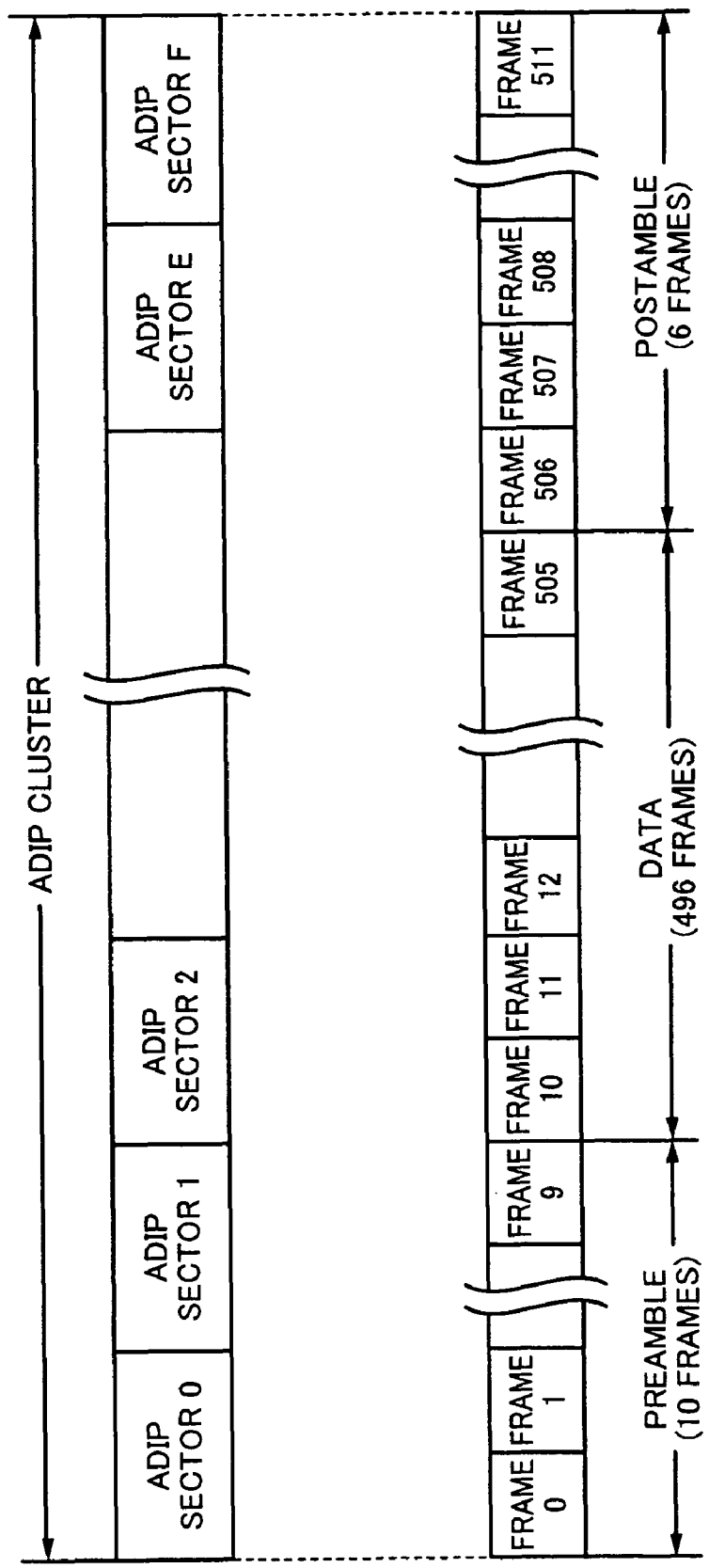
FIG. 15 is a schematic diagram showing the relation between the ADIP signal and frames for the next generation MD 1 system.

FIG. 15 shows the relation of an ADIP cluster and BIS frames in accordance with the specifications of the next generation MD 2. As shown in FIG. 13, the specifications of the next generation MD 2 prescribes that one ADIP cluster be composed of 16 ADIP sectors and that data of one recording block (64 kbytes) be allocated in one ADIP cluster.

As shown in FIG. 15, data of one recording block (64 kbytes) as a record/reproduction unit is allocated to a BIS block composed of 496 frames. Before 496 frames (frame "10" to frame "505") corresponding to a BIS block, a preamble of 10 frames (frame "0" to frame "9") is added. After the frames of the data, a postamble of six frames (frame 506 to frame 511) are added. In total, data of 512 frames are allocated to an ADIP cluster of ADIP sector "0h" to ADIP sector "Fh."

A frame as a preamble of data frames and a frame as a postamble of the data are used to protect data that are linked to the adjacent recording block. For example, the preamble is used to operate the PLL for data, control the amplitude of the signal, and control the offset of the signal.

A physical address to and from which data of a recording block is recorded and reproduced is designated by an ADIP cluster. When a physical address is designated for data that is recorded or reproduced, an ADIP sector is read from an ADIP signal. An ADIP cluster number is read from a signal reproduced from the ADIP sector.

When data is recorded or reproduced onto or from such a disc, various types of control information is required to control the laser power. The disc in accordance with the specifications of the next generation MD 1 has a P-TOC in the lead-in area as shown in FIG. 1. Various types of control information are obtained from the P-TOC.

The disc in accordance with the specifications of the next generation MD 2 does not have a P-TOC made of emboss pits. Control information is recorded as an ADIP signal in the lead-in area. On the other hand, since the disc in accordance with the specifications of the next generation MD 2 uses the magnetic super resolution technology, it is important to control the power of the laser. The disc in accordance with the specifications of the next generation MD 2 has a calibration area for adjusting the power of the laser in the lead-in area and the lead-out area.

Figure 16:
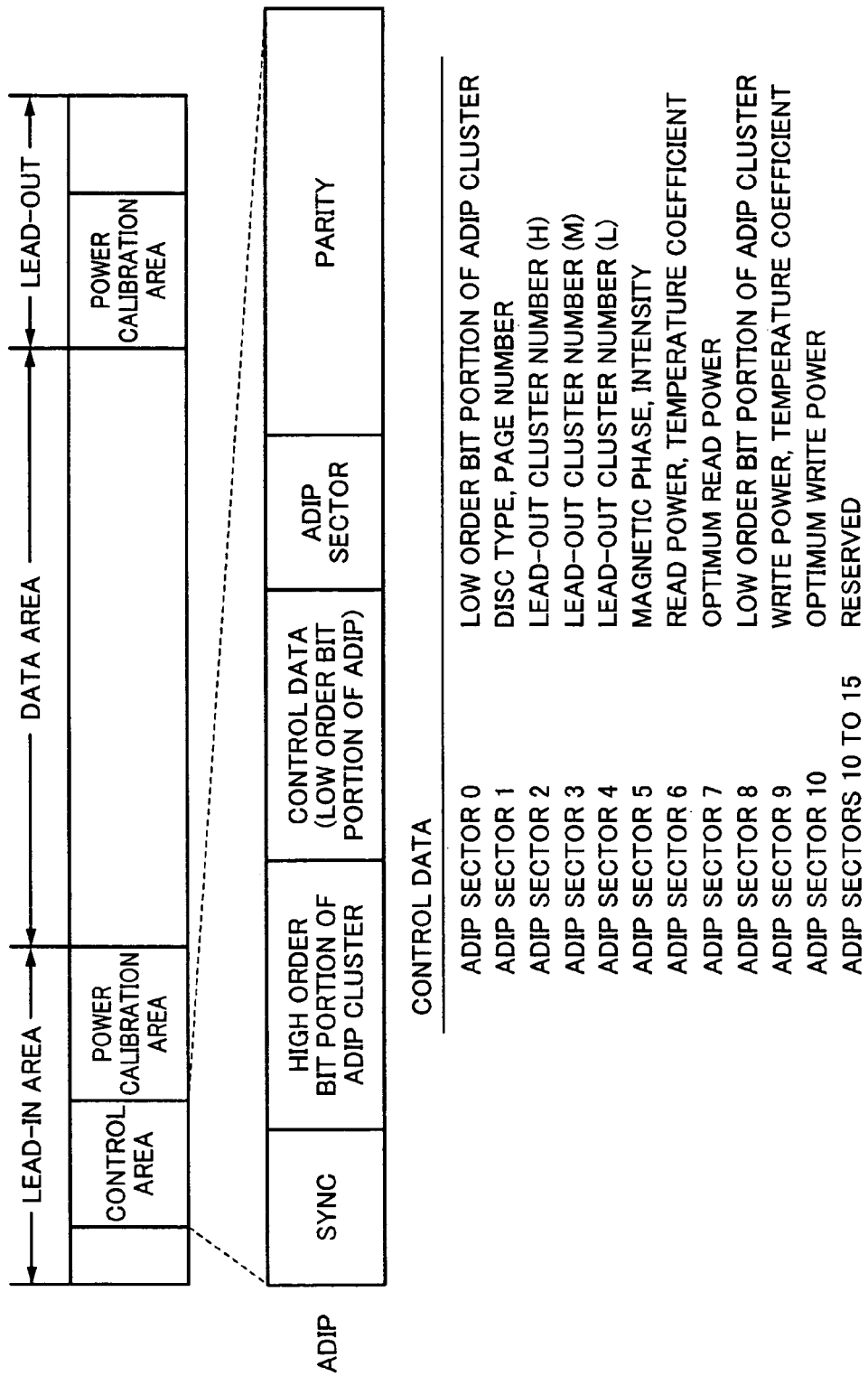
FIG. 16 is a schematic diagram describing a control signal for the next generation MD 2 system.

FIG. 16 shows the structure of a lead-in area and a lead-out area of the disc in accordance with the specifications of the next generation MD 2. As shown in FIG. 16, the lead-in area and the lead-out area of the disc have power calibration areas as laser beam power control areas.

In addition, the lead-in area has a control area for ADIP control information. Control information of the ADIP is recorded with an area assigned as a low order bit portion of an ADIP cluster number.

In other words, an ADIP cluster number starts with the start position of a recordable area. The ADIP cluster number in the lead-in area is a negative value. As shown in FIG. 16, the ADIP sector of the next generation MD 2 is composed of a sync of four bits, a high order bit portion of an ADIP cluster number of eight bits, control data (a low order bit portion of the ADIP cluster number) of eight bits, an ADIP sector number of four bits, and an error correction parity of 18 bits. As shown in FIG. 16, control information such as disc type, magnetic phase, intensity, and read power are described in eight bits assigned as the low order bit portion of the ADIP cluster number.

Since the high order bits of the ADIP cluster are kept left, the current position can be detected with sufficient accuracy. When the low order eight bits of the ADIP cluster number are kept left, with the ADIP sectors "0" and "8," the ADIP clusters can be accurately detected.

The control information recorded with the ADIP signal is disclosed in the specification of Japanese Patent Application No. 2001-123535 that the applicant of the present patent application has filed.

4. Structure of Recording and Reproducing Apparatus

Next, with reference to FIG. 17 and FIG. 18, as an example of the disc drive device that can record and reproduce data onto and from the disc of the next generation MD 1 and the disc of the next generation MD 2 will be described.

Figure 17:
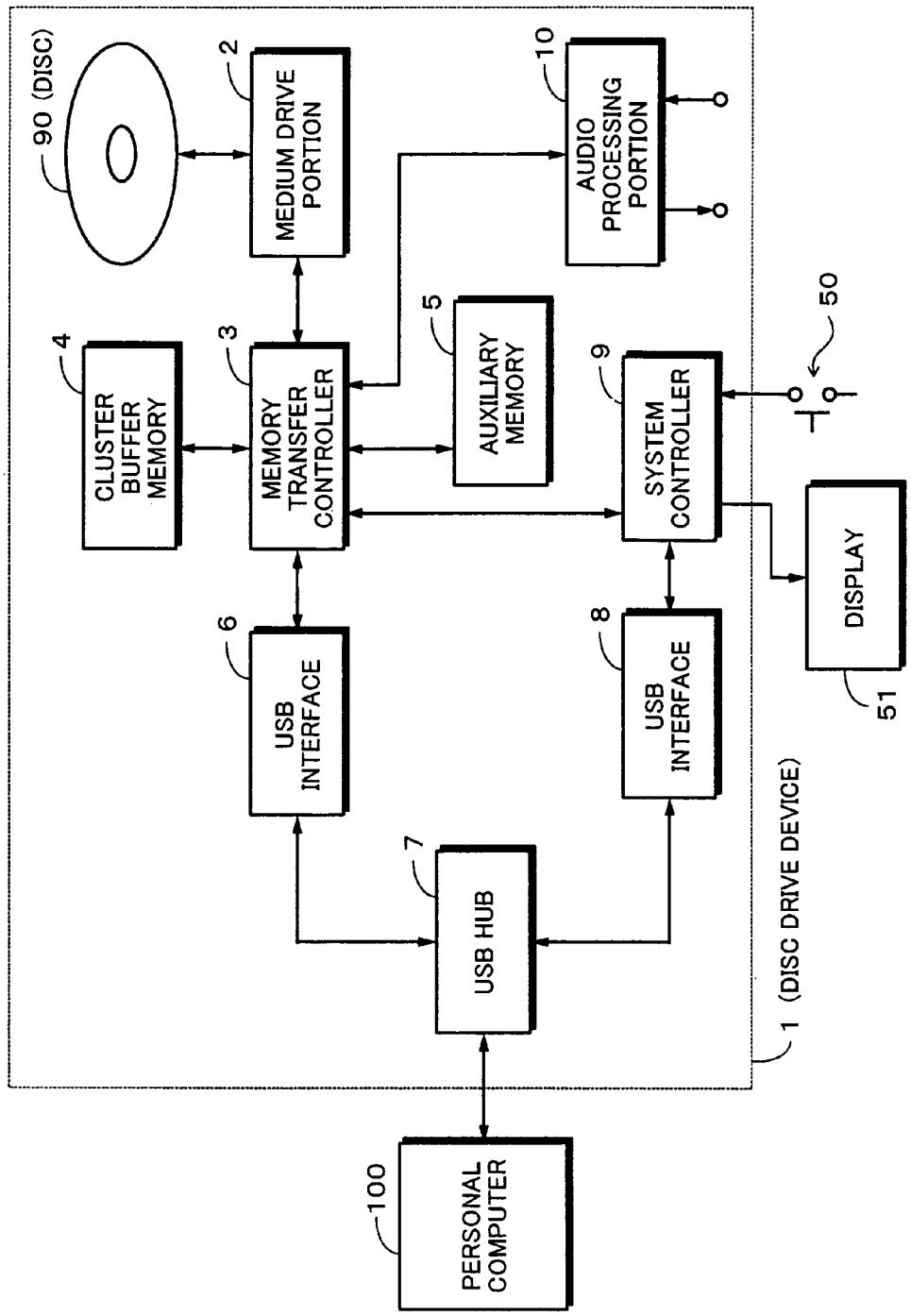
FIG. 17 is a block diagram showing a disc drive device.

FIG. 17 shows a disc drive device 1 that can be connected to for example a personal computer 100.

The disc drive device 1 comprises a medium drive portion 2, a memory transfer controller 3, a cluster buffer memory 4, an auxiliary memory 5, USB (Universal Serial Bus) interfaces 6 and 8, a USB hub 7, a system controller 9, and an audio processing portion 10.

The medium drive portion 2 reads/reproduces data onto/from a loaded disc 90. The disc 90 is one of the disc of the next generation MD 1, the disc of the next generation MD 2, and the disc of the current MD. The internal structure of the medium drive portion 2 will be described later with reference to FIG. 18.

The memory transfer controller 3 controls data reproduced from the medium drive portion 2 and data supplied to the medium drive portion 2.

The cluster buffer memory 4 buffers data that is read in the unit of a recording block from data tracks of the disc 90 by the medium drive portion 2 under the control of the memory transfer controller 3.

The auxiliary memory 5 stores various types of management information and special information that are read by the medium drive portion 2 from the disc 90 under the control of the memory transfer controller 3.

The system controller 9 controls the entire disc drive device 1. In addition, the system controller 9 controls the communication with a personal computer 100 connected thereto.

In other words, the system controller 9 can communicate with the personal computer 100 connected thereto through the USB interface 8 and the USB hub 7. The system controller 9 receives commands such as a write request, a read request, and so forth from the personal computer 100 and transmits status information and other necessary information to the personal computer 100.

When the disc 90 is loaded into the medium drive portion 2, the system controller 9 commands the medium drive portion 2 to read management information and so forth from the disc 90 and causes the memory transfer controller 3 to store the management information and so forth to the auxiliary memory 5.

When the personal computer 100 has issued a read request for a particular FAT sector, the system controller 9 causes the medium drive portion 2 to read a recording block that contains the requested FAT sector. The memory transfer controller 3 writes the data of the recording block that has been read to the cluster buffer memory 4.

The system controller 9 causes data of the requested FAT sector to be read from the data of the recording block written in the cluster buffer memory 4 and the data to be transmitted to the personal computer 100 through the USB interface 6 and the USB hub 7.

When the personal computer 100 has issued a write request for a particular FAT sector, the system controller 9 causes the medium drive portion 2 to read a recording block that contains the FAT sector. The memory transfer controller 3 writes the recording block, which has been read, to the cluster buffer memory 4.

The system controller 9 supplies data (record data) of the FAT sector received from the personal computer 100 to the memory transfer controller 3 through the USB interface 6. The system controller 9 causes the memory transfer controller 3 to rewrite the data of the FAT sector in the cluster buffer memory 4.

The system controller 9 causes the memory transfer controller 9 to transfer data of the recording block of which the required FAT sector has been rewritten and that has been stored in the cluster buffer memory 4 as record data to the medium drive portion 2. The medium drive portion 2 modulates the record data of the recording block and writes the modulated record data to the disc 90.

A switch 50 is connected to the system controller 9. The switch 50 selects the next generation MD 1 system or the current MD system as an operation mode of the disc drive device 1. In other words, the disc drive device 1 can record audio data onto the disc 90 of the current MD system in accordance with one of the formats of the current MD system and the next generation MD 1 system. The switch 50 explicitly represents the operation mode of the disc drive device 1 for the user. Although the switch shown in the drawing is a mechanical switch, the switch may be an electrical or magnetic switch or a hybrid type switch.

A display 51 composed of for example an LCD (Liquid Crystal Display) is disposed in the disc drive device 1. The display 51 can display text data, simple icons, and so forth. The display 51 displays information about the status of the disc drive device 1, a message for the user, and so forth in accordance with a display control signal supplied from the system controller 9.

The audio processing portion 10 has as input systems for example an analog audio signal input portion such as a line input circuit/microphone input circuit, an A/D converter, and a digital audio data input portion. The audio processing portion 10 has an ATRAC compression encoder/decoder and a buffer memory for compressed data. In addition, the audio processing portion 10 has as output systems a digital audio data output portion, a D/A converter, and an analog audio signal output portion such as a line output circuit/head set output circuit.

When the disc 90 is the disc of the current MD system and an audio track is recorded on the disc 90, digital audio data (or analog audio signal) is input to the audio processing portion 10. Linear PCM digital audio data that is input or linear PCM audio data that is input as an analog audio signal and converted by the A/D converter is encoded in accordance with the ATRAC compression encoding system and stored in the buffer memory. The data is read from the buffer memory at predetermined timing (in the unit of data corresponding to an ADIP cluster) and transferred to the medium drive portion 2. The medium drive portion 2 modulates the transferred compressed data in accordance with the EFM system and writes the modulated data as an audio track to the disc 90.

When the disc 90 is the disc of the current MD system and a audio track is reproduced from the disc 90, the medium drive portion 2 demodulates reproduction data, obtains ATRAC compressed data, and transfers the demodulated data to the audio processing portion 10 through the memory transfer controller 3. The audio processing portion 10 decodes the demodulated data, obtains linear PCM audio data, and outputs the linear PCM audio data to a digital audio data output portion. Alternatively, the D/A converter converts the digital audio signal into an analog audio signal for a line output/head set output.

The disc drive device 1 may be connected to the personal computer 100 not through the USB, but another external interface for example IEEE (Institute of Electrical and Electronics Engineers) 13.94 or the like.

The record data and reproduction data are managed in accordance with the FAT system. The conversion between a recording block and an FAT sector is described in the specification of Japanese Patent Application No. 2001-289380 that the applicant of the present patent application has filed.

Next, with reference to FIG. 18, the structure of the medium drive portion 2 will be described assuming that it has a function for recording and reproducing both a data track and an audio track.

Figure 18:
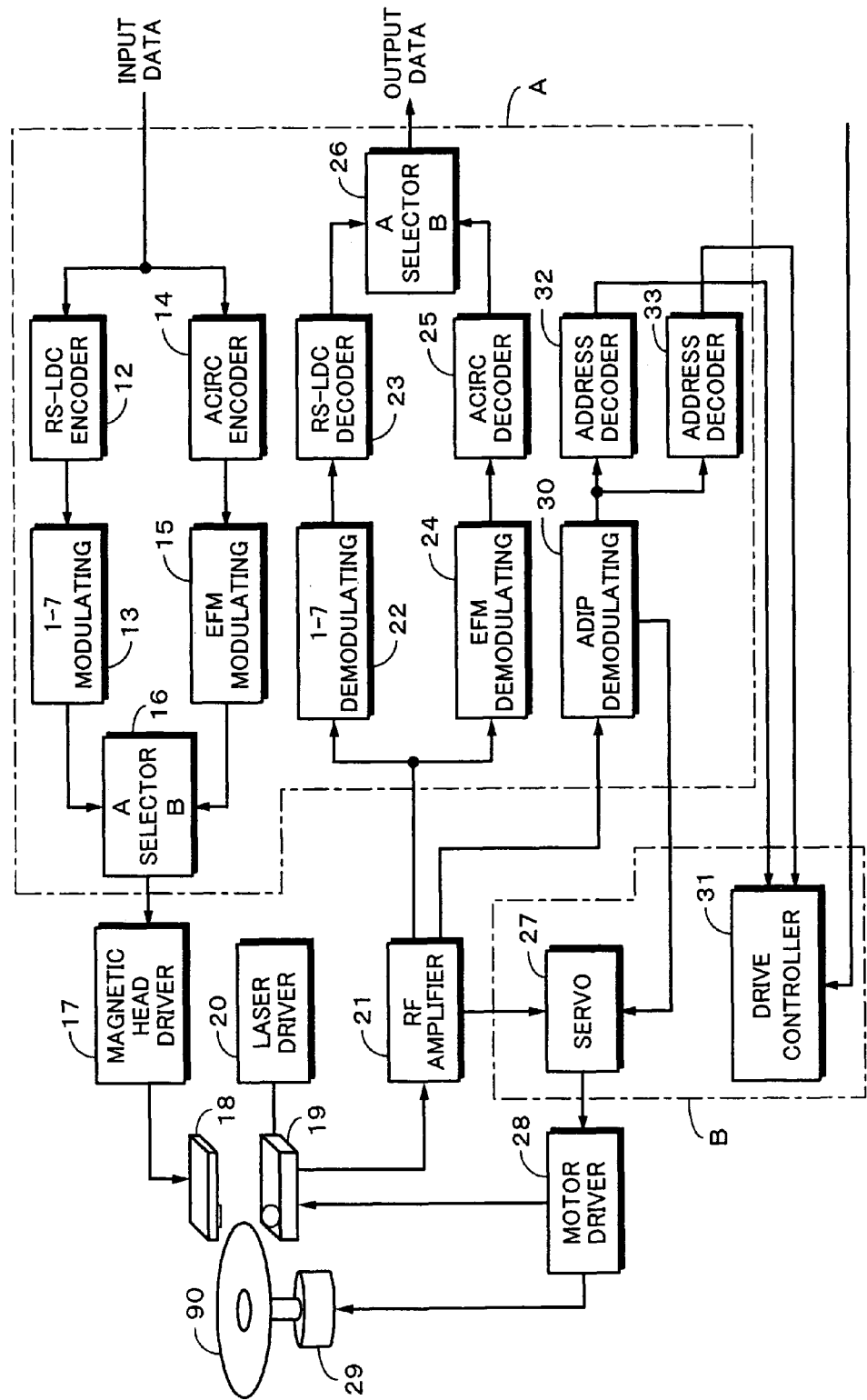
FIG. 18 is a block diagram showing the structure of a medium drive portion.

FIG. 18 shows the structure of the medium drive portion 2. The medium drive portion 2 has a turn table on which the disc of the current MD system, the disc of the next generation MD 1, and the disc of the next generation MD 2 is placed. The medium drive portion 2 causes a spindle motor 29 to drive the rotations of the disc 90 placed on the turn table in accordance with the CLV system. When data is recorded/reproduced onto or from the disc 90, an optical head 19 emits laser light to the disc 90.

When data is recorded onto the disc 90, the optical head 19 outputs high level laser light so as to heat a recording track up to the Curie temperature. In contrast, when data is reproduced from the disc 90, the optical head 19 outputs low level laser light so as to detect data from reflected light by the Kerr effect. Although details are not shown in the drawing, the optical head 19 has a laser diode as laser output means, an optical system composed of a deflected beam splitter and an objective lens, and a detector that detects reflected light. The objective lens that the optical head 19 has is held by for example two-axis mechanism that is movable in the radius direction of the disc and the directions of which the objective lens approaches the disc and goes away from the disc.

In addition, a magnetic head 18 is disposed on the opposite side of the optical head 19 through the disc 90. The magnetic head 18 applies a magnetic field modulated with the record data to the disc 90. In addition, a thread motor and a thread mechanism (not shown) that move the entire optical head 19 and the magnetic head 18 in the radius direction of the disc are disposed.

When the disc 90 is the disc of the next generation MD 2, the optical head 19 and the magnetic head 18 perform a pulse driven magnetic field modulation so as to form a fine mark. In contrast, when the disc 90 is the disc of the current MD system or the disc of the next generation MD 1, the optical head 19 and the magnetic head 18 perform a magnetic field modulation with DC emitted light.

In addition to the recording/reproducing head system using the optical head 19 and the magnetic head 18 and the disc rotation driving system using the spindle motor 29, the medium drive portion 2 has a record processing system, a reproduction processing system, a servo system, and so forth.

The disc 90 that is loaded may be the disc of the current MD system, the disc of the next generation MD 1, or the disc of the next generation MD 2. These discs differ in line velocities. The spindle motor 29 can rotate at rotation velocities corresponding to a plurality of types of discs that differ in linear velocities. The disc 90 placed on the turn table is rotated at the linear velocity for the disc in accordance with the specifications of the current MD system, the disc in accordance with the specifications of the next generation MD 1, or the disc in accordance with the specifications of the next generation MD 2.

The record processing system has a portion for the disc of the current MD system and a portion for the disc of the next generation MD 1 or the disc of the next generation MD 2. The portion for the disc of the current MD system encodes an audio track in accordance with an error correction code using the ACIRC, modulates the encoded data in accordance with the EFM system, and records the modulated data onto the disc. The portion for the disc of the next generation MD 1 system or the disc of the next generation MD 2 encodes an audio track in accordance with a combined system of the BIS and the LDC, modulates the encoded data in accordance with the 1-7 pp modulating system, and records the modulated data onto the disc.

The reproduction processing portion has a portion for the disc of the current MD system and a portion for the disc of the next generation MD 1 or the disc of the next generation MD 2. The portion for the disc of the current MD system demodulates data reproduced from the disc in accordance with the EFM demodulating system and corrects an error in accordance with the CIRC system. The portion for the disc of the next generation MD 1 or the disc of the next generation MD 2 demodulates data reproduced from the disc in accordance with partial response and Viterbi decoding system and corrects an error in accordance with the BIS and LDC.

In addition, the reproduction processing portion has a portion that decodes an address of an ADIP signal in accordance with the current MD system and the next generation MD 1 and a portion that decodes an address of an ADIP signal in accordance with the next generation MD 2.

Reflected light of laser radiation of the optical head 19 against the disc 90 is detected as information (an optical current detected as laser reflected light by a photo detector) and supplied to an RF amplifier 21.

The RF amplifier 21 performs a current voltage conversion, an amplification, a matrix calculation, and so forth for the detected information and obtains a reproduction RF signal as reproduction information, a tracking error signal TE, a focus error signal FE, and groove information (ADIP information recorded as wobbles of tracks on the disc 90).

When data is reproduced from the disc of the current MD system, the reproduction RF signal obtained by the RF amplifier is processed by an EFM demodulating portion 24 and an ACIRC decoder 25. In other words, the EFM demodulating portion 24 digitizes the reproduction RF signal, obtains an EFM signal sequence, and demodulates the EFM signal sequence. The ACIRC decoder 25 performs an error correcting process and a deinterleaving process for the demodulated signal. In other words, at this point, ATRAC compressed data has been obtained.

When data is reproduced from the disc of the current MD system, a selector 26 has been placed on a B contact side. As a result, the ATRAC compressed data that has been demodulated is output as reproduction data of the disc 90.

On the other hand, when data is reproduced from the disc of the next generation MD 1 or the disc of the next generation MD 2, a reproduction RF signal obtained by the RF amplifier is processed by an RLL (1-7) PP demodulating portion 22 and an RS-LDC decoder 23. In other words, the RLL (1-7) PP demodulating portion 22 detects reproduction data as an RLL (1-7) code sequence with PR (1, 2, 1) ML or PR (1, −1) ML and a Viterbi code and performs the RLL (1-7) demodulating process for the RLL (1-7) code sequence. In addition, the RS-LDC decoder 23 performs an error correcting process and a de-interleaving process for the demodulated data.

On the other hand, when data is reproduced from the disc of the next generation MD 1 or the disc of the next generation MD 2, the selector 26 has been placed on an A contact side. Thus, the demodulated data is output as reproduction data of the disc 90.

The tracking error signal TE and the focus error signal FE that are output from the RF amplifier 21 are supplied to a servo circuit 27. The groove information is supplied to an ADIP demodulating portion 30.

The ADIP demodulating portion 30 causes a band pass filter to eliminate a band of the groove information and extract wobble components from the band pass filter. Thereafter, the ADIP demodulating portion 30 performs an FM demodulation and a bi-phase demodulation for the wobble components and obtains the ADIP signal. The obtained ADIP signal is supplied to an address decoder 32 and an address decoder 33.

As shown in FIG. 10, the ADIP sector number of the disc of the current MD system and the disc of the next generation MD 1 is eight bits. In contrast, as shown in FIG. 12, the ADIP sector number is four bits. The address decoder 32 decodes the ADIP address of the current MD system or the next generation MD 1. The address decoder 33 decodes the address of the next generation MD 2.

The ADIP address decoded by the address decoder 32 or the address decoder 33 is supplied to a drive controller 31. The drive controller 31 executes a predetermined control process in accordance with the ADIP address. The groove information is supplied to the servo circuit 27 that controls a spindle servo.

The servo circuit 27 generates a spindle error signal with which CLV servo control or CAV servo control is performed in accordance with an error signal that is obtained by integrating the phase difference between for example groove information and a reproduction clock (PLL system clock with which data is decoded).

In addition, the servo circuit 27 generates various types of servo control signals (tracking control signal, focus control signal, thread control signal, spindle control signal, and so forth) in accordance with the spindle error signal, the tracking error signal and focus error signals supplied from the RF amplifier 21, or a track jump command, access command, and so forth received from the drive controller 31 and outputs the generated signals to a motor driver 28. In other words, the servo circuit 27 performs required processes such as a phase compensating process, a gain process, and a target value setting process against the foregoing servo error signal and commands and generates various types of, servo control signals.

The motor driver 28 generates predetermined servo drive signals in accordance with the servo control signals supplied from the servo circuit 27. The servo drive signals are two-axis drive signals with which the two-axis mechanism is driven (two signals for focus direction and tracking direction), a thread motor drive signal with which the thread mechanism is driven, and a spindle motor drive signal with which the spindle motor 29 is driven. With these servo drive signals, the focus control and tracking control for the disc 90 and the CLV control or CAV control for the spindle motor 29 are performed.

When audio data is recorded onto the disc of the current MD system, a selector 16 is connected to a B contact. Thus, an ACIRC encoder 14 and an EFM modulating portion function. In this case, compressed data received from the audio processing portion 10 is supplied to the ACIRC encoder 14. The ACIRC encoder 14 interleaves the compressed data and adds an error correction code thereto. Thereafter, the EFM modulating portion modulates the encoded data in accordance with the EFM modulating system.

The EFM modulated data is supplied to a magnetic head driver 17 through the selector 16. The magnetic head 18 applies a magnetic field to the disc 90 in accordance with the EFM modulated data. As a result, an audio track is recorded on the disc 90.

When data is recorded on the disc of the next generation MD 1 or the disc of the next generation MD 2, the selector 16 is connected to an A contact. Thus, an RS-LDC encoder 12 and an RLL (1-7) PP modulating portion 13 function. In this case, high density data is supplied from the memory transfer controller 3 to the RS-LDC encoder 12. The RS-LDC encoder 12 interleaves the high density data and adds an error correction code in accordance with the RS-LDC system to the interleaved data. Thereafter, the RLL (1-7) PP modulating portion 13 modulates the encoded data in accordance with the RLL (1-7) modulating system.

Record data as an RLL (1-7) code sequence is supplied to the magnetic head driver 17 through the selector 16. The magnetic head 18 applies a magnetic field to the disc 90 in accordance with the modulated data. As a result, a data track is recorded on the disc 90.

When data is reproduced or recorded, a laser driver/APC 20 causes the laser diode to emit laser light. In addition, the laser driver/APC 20 performs so-called APC (Automatic Lazer Power Control) operation.

In other words, the optical head 19 has a detector (not shown) that monitors a laser power. A monitor signal that is output from the detector is fed back to the laser driver/APC 20. The laser driver/APC 20 compares the current laser power obtained as the monitor signal with the pre-set laser power and affects the difference to the laser drive signal so that the laser power that is output from the laser diode is stable with the pre-set value.

As the laser power, a value of for example a reproduction laser power or a record laser power is set to an internal register of the laser driver/APC 20 by the drive controller 31.

The drive controller 31 is controlled in accordance with a command received from a system controller 9 so that the foregoing access operations, various servo operations, data write operation, and data read operation are performed.

Blocks surrounded by dotted lines and denoted by portions A and B shown in FIG. 18 are structured as single-chip circuit portions.

5. About Initializing Processes for Disc of Next Generation MD 1 and Disc of Next Generation MD 2

On the disc of the next generation MD 1 and the disc of the next generation MD 2, as described above, in addition to the FAT, the UID (Unique ID) is recorded. With the recorded UID, the security is managed. Generally, on the disc of the next generation MD 1 and the disc of the next generation MD 2, the UID has been recorded in their predetermined positions when they have been shipped. On the disc of the next generation MD 1, the UID is recorded in for example the lead-in area. The position in which the UID is recorded is not limited to the lead-in area. When the UID is recorded in a fixed position after the disc is initialized, the UID can be pre-recorded in the fixed position. On the disc of the next generation MD 2 and the disc of the next generation MD 1.5, the UID is pre-recorded in the foregoing BCA.

In contrast, on the disc of the next generation MD 1, the disc of the current MD system can be used. Thus, many discs of the current MD system have been widespread, they are used as the discs of the next generation MD 1.

Thus, for the discs of the current MD system that have been widespread without the UID, an area prescribed in accordance with the standard is formed. When the disc is initialized, the disc drive device 1 records a random number signal to the area and uses it as the UID. In addition, the standard prohibits the user from accessing the area for the UID. The UID is not limited to a random number signal. For example, the UID can be created by a combination of a maker code, a machine code, a machine serial number, and a random number. In addition, the UID may be created by a combination of at least one of a maker code, a machine code, and a machine serial number and a random number.

Figure 19:
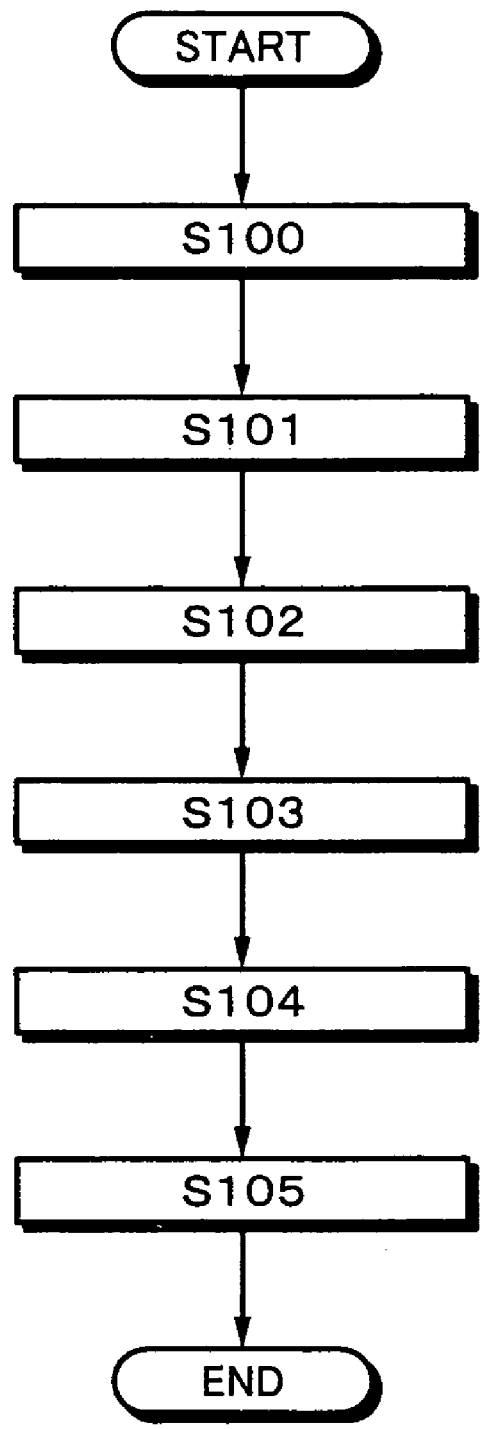
FIG. 19 is a flow chart showing an example of an initializing process for the disc of the next generation MD 2 system.

FIG. 19 is a flow chart showing an example of an initializing process for the disc of the next generation. MD 1. At the first step, S100, a predetermined position of the disc is accessed. It is determined whether or not the UID has been recorded at the predetermined position. When the determined result represents that the UID has been recorded, the UID is read. The UID, which has been read, is temporarily stored to the auxiliary memory 5.

The position accessed at step S100 is for example the lead-in area, which is not the FAT area of the format of the next generation MD 1 system. When the disc 90 has the DDT like a disc that has been initialized, the area thereof may be accessed. The process at step S100 may be omitted.

At step S101, the U-TOC is recorded in accordance with the EFM modulating system. Information that allocates an alert track and tracks after the DDT shown in FIG. 2, namely an area in which data modulated in accordance with the 1-7 pp modulating system is recorded, is written to the U-TOC. At the next step, step S102, an alert track modulated in accordance with the EFM modulating system is recorded in the area allocated in the U-TOC at step S101. At step S103, the DDT is modulated in accordance with the 1-7 pp modulating system and recorded.

At step S104, the UID is recorded in an area other than the FAT, for example in the DDT. When the UID has been read from the predetermined position of the disc and stored in the auxiliary memory 5 at step S100, the UID is recorded. When the determined result at step S100 represents that the UID has not been recorded at the predetermined position of the disc or the process of step S100 is omitted, the UID is created in accordance with the random number signal. The created UID is recorded. The UID is created by for example the system controller 9. The created UID is supplied to the medium drive 2 through the memory transfer controller 3 and recorded onto the disc 90.

Next, at step S105, data such as the FAT are modulated in accordance with the 1-7 pp modulating system. In other words, the area for the UID is an area other than the FAT. As described above, the disc of the next generation MD 1 does not always need to initialize the recordable area managed in accordance with the FAT.

Figure 20:
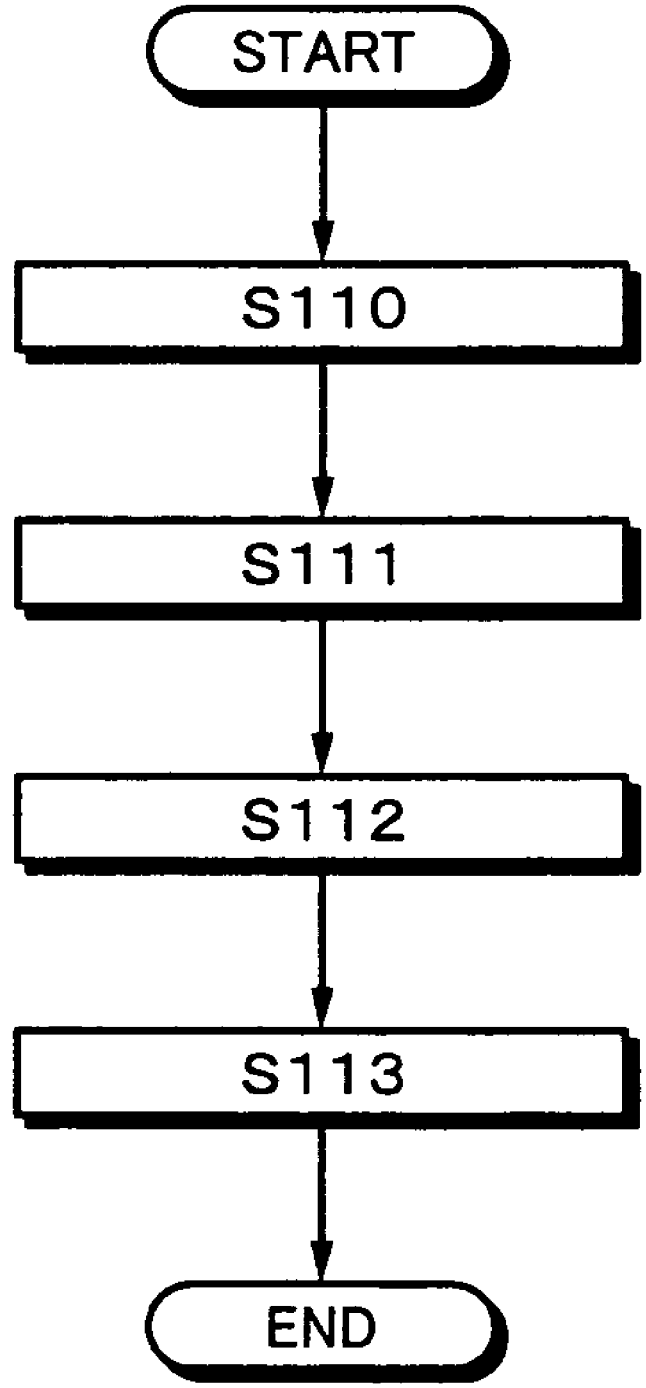
FIG. 20 is a flow chart showing an example of an initializing process for the disc of the next generation MD 2 system.

FIG. 20 is a flow chart showing an example of the initializing process for the disc of the next generation MD 2 and the disc of the next generation MD 1.5. At the first step, S110, an area for the BCA on the disc is accessed. It is determined whether or not the UID has been recorded. When the determined result represents that the UID has been recorded, the UID is read and temporarily recorded in for example the auxiliary memory 5. Since the record position of the UID is fixed in the format, the UID can be directly accessed without reference to other management information of the disc. This applies to the process described with reference to FIG. 19.

At the next step, S111, the DDT is modulated in accordance with the 1-7 pp modulating system and recorded. Thereafter, at step S112, the UID is recorded in an area other than the FAT, for example in the DDT. At that point, the UID, which has been read and stored in the auxiliary memory 5 at step S110, is used. When the determined result at step S110 represents that the UID has not been recorded at the predetermined position of the disc, the UID is created in accordance with the random number signal. The created UID is recorded. The UID is created by for example the system controller 9. The created UID is supplied to the medium drive 2 through the memory transfer controller 3 and recorded onto the disc 90.

At step S113, the FAT and so forth are recorded. In other words, the area for the UID is an area rather than the area for, the FAT. In addition, as described above, for the disc of the next generation MD 2, the recordable area managed in accordance with the FAT is not initialized.

6. About First Managing System for Music Data

As described above, the next generation MD 1 system and the next generation MD 2 system according to the embodiment of the present invention manage data in accordance with the FAT system. In addition, audio data that is recorded is compressed in accordance with a desired compressing system. Moreover, to protect the rights of the copyright owner, the audio data is encrypted. The compressing system for the audio data may be for example ATRAC3, ATRAC5, or the like. Of course, another compressing system such as MP3 (MPEG1 Audio Layer-3), AAC (MPEG2 Advanced Audio Coding), or the like may be used. Besides audio data, still picture data and moving picture data can be handled. Of course, since the FAT system is used, general-purpose data can be recorded and reproduced. In addition, commands that a computer can read and execute can be encoded and recorded on the disc. Thus, the next generation MD 1 or the next generation MD 2 can contain executable files.

Next, the managing system in which audio data is recorded and reproduced onto and from the disc in accordance with the specifications of the next generation MD 1 and the disc in accordance with the specifications of the next generation MD 2 will be described.

Since the next generation MD 1 system and the next generation MD 2 system allow high quality music data to be reproduced for a long time, they manage many songs on one disc. In addition, since the next generation MD 1 and next generation MD 2 systems manage many songs in accordance with the FAT system, these systems have compatibility with computers. The inventor of the present patent application recognizes that although these systems have user-friendliness they have a risk of which music data is illegally copied and therefore the rights of the copyright owner cannot be protected. The managing system according to the present invention considers such points.

Figure 21:
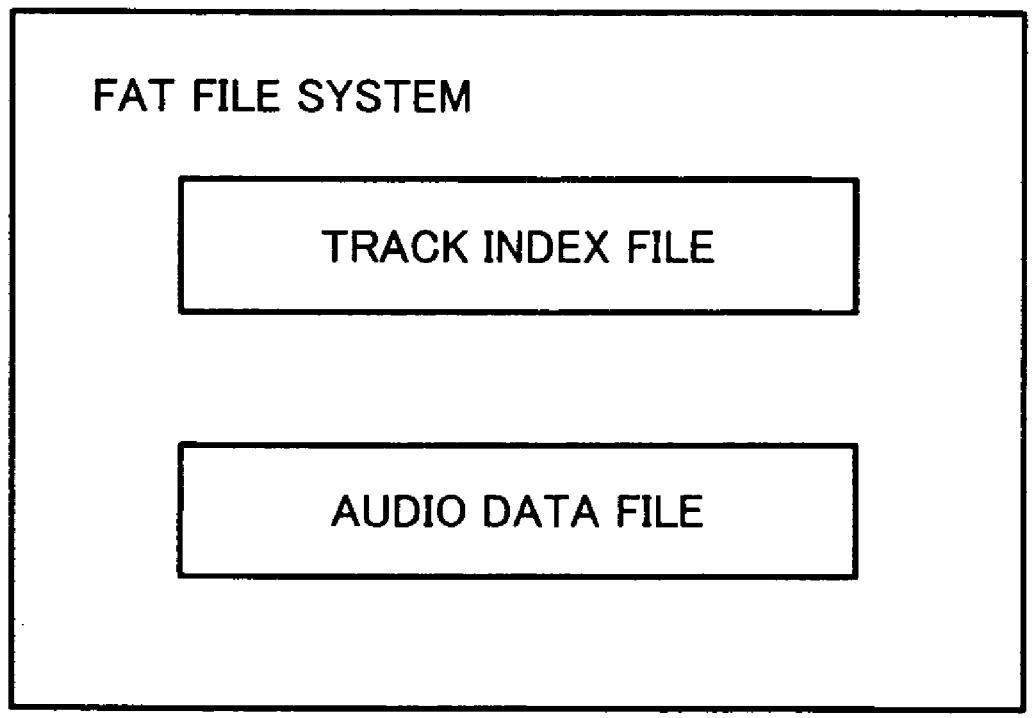
FIG. 21 is a schematic diagram describing a first example of an audio data managing system.

FIG. 21 show a first example of the managing system for audio data. As shown in FIG. 21, in the first example of the managing system, a track index file and an audio data file are created on a disc. The track index file and the audio data file are files managed in accordance with the FAT system.

Figure 22:
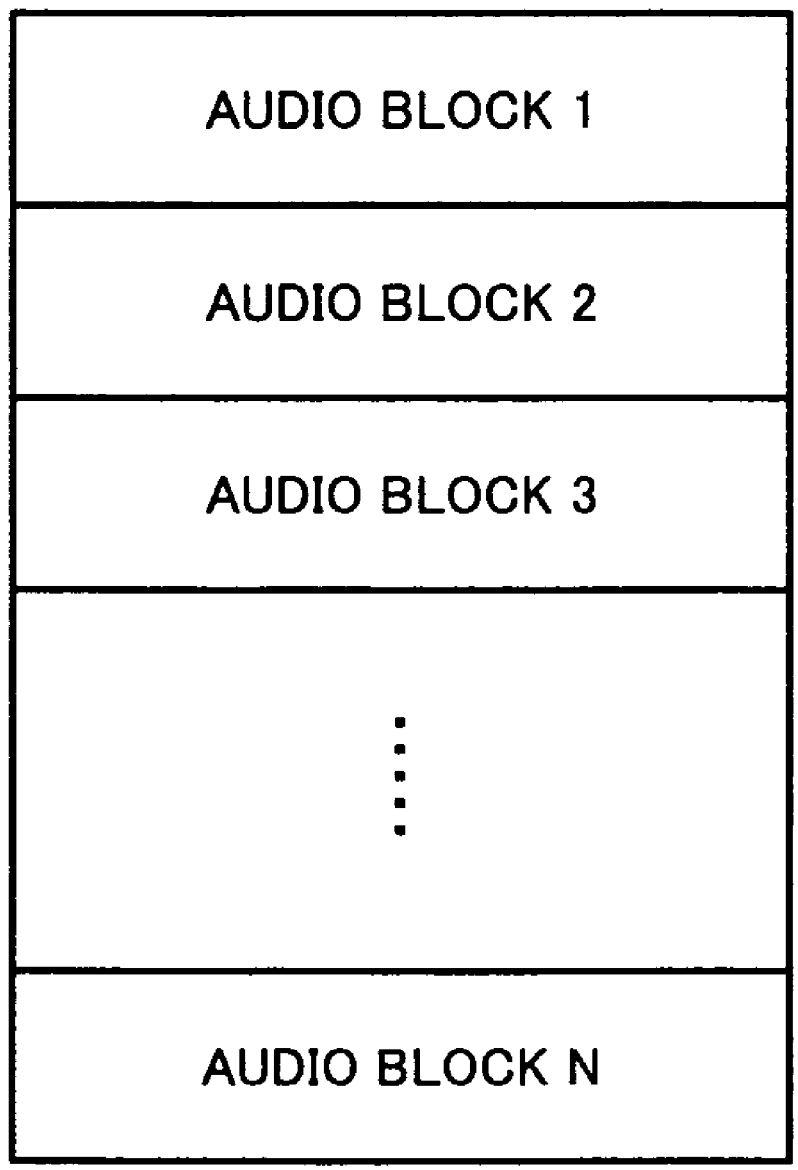
FIG. 22 is a schematic diagram describing an audio data file in accordance with the first example of the audio data managing system.

As shown in FIG. 22, the audio data file stores a plurality of songs of music data as one file. The FAT system handles the audio data file as a jumbo file. The audio data file is divided into parts. Audio data is treated as a set of parts.

Figure 23:
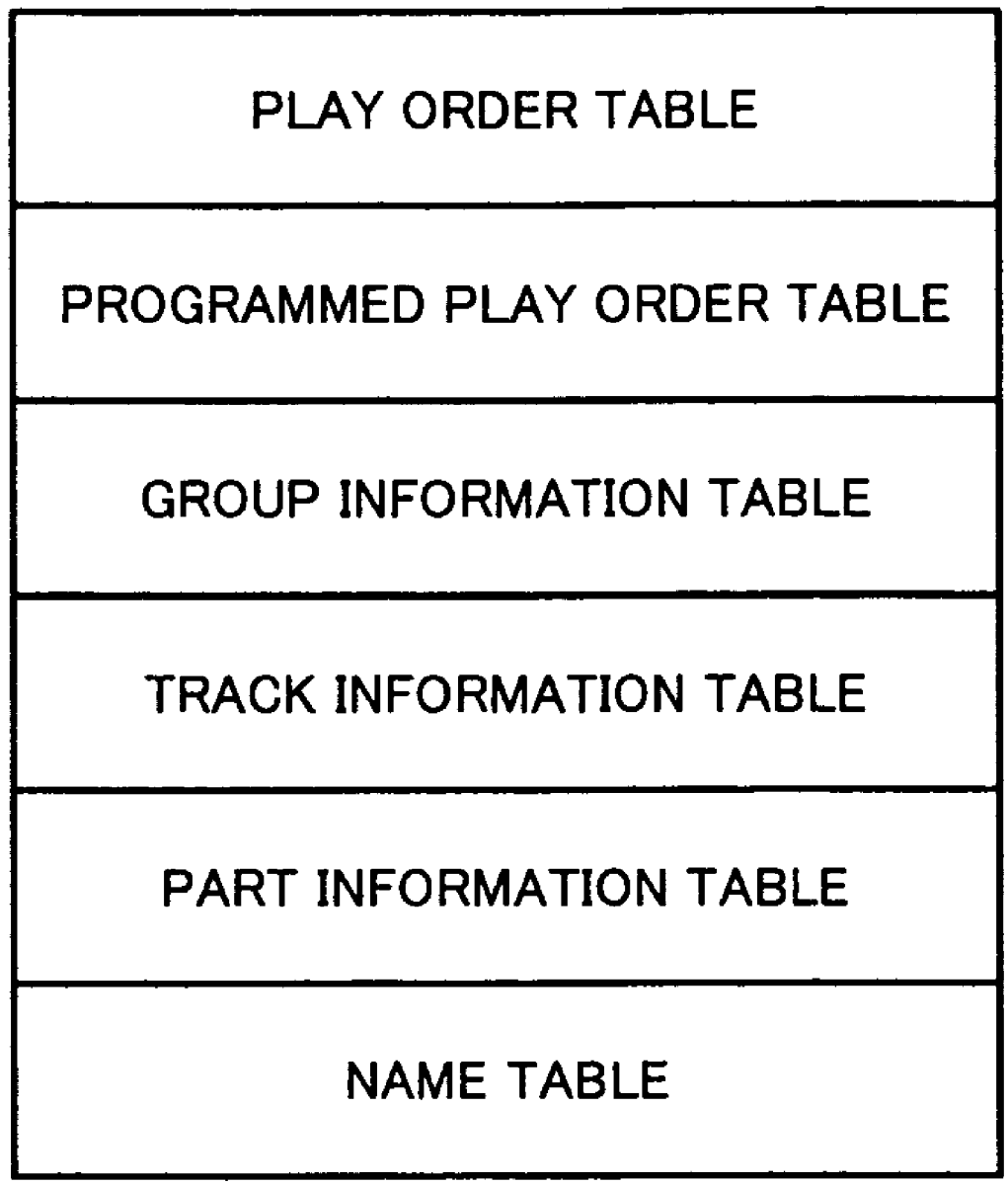
FIG. 23 is a schematic diagram describing a track index file in accordance with the first example of the audio data managing system.

The track index file is a file that describes various types of information with which music data contained in an audio data file is managed. As shown in FIG. 23, the track index file has a play order table, a programmed play order table, a group information table, a track information table, a part information table, and a name table.

Figure 24:
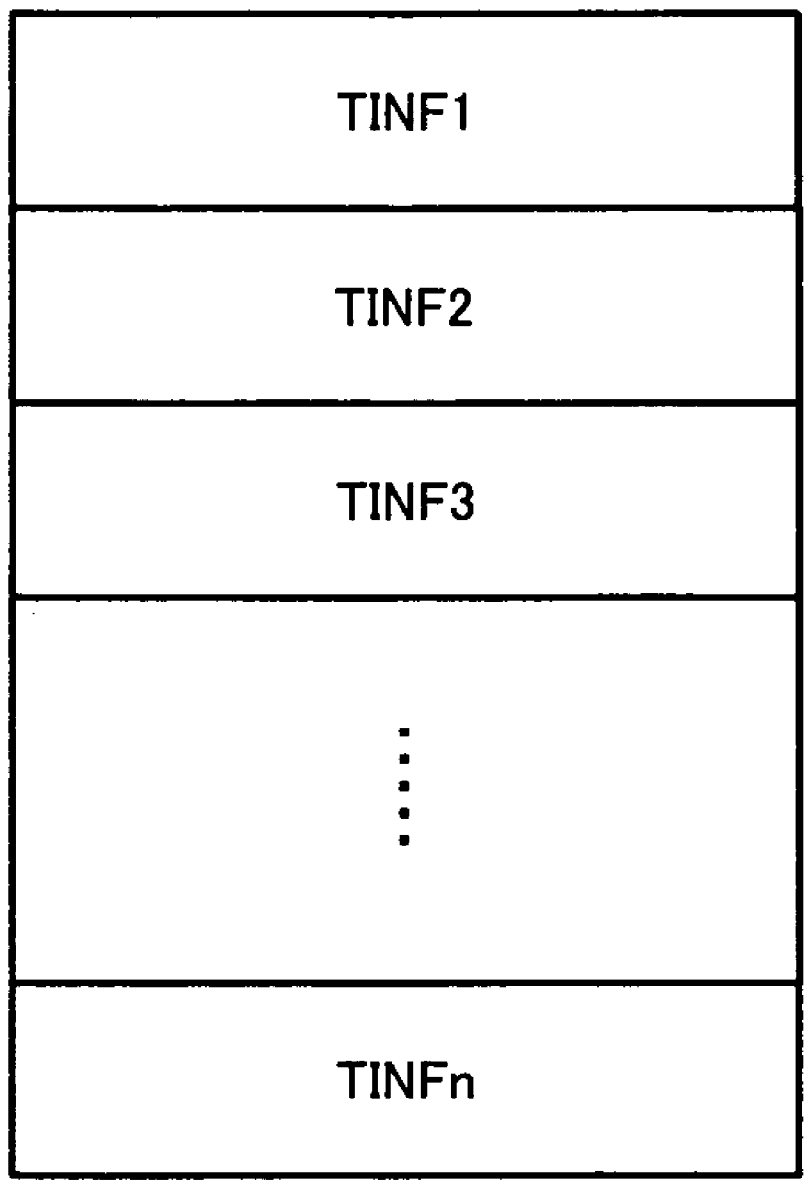
FIG. 24 is a schematic diagram describing a play order table in accordance with the first example of the audio data managing system.

The play order table is a table that represents the reproduction order defined in default. As shown in FIG. 24, the play order table stores information TINF1, TINF2, . . . that represent links to track descriptors (FIG. 27A and FIG. 27B) on the track information table for track numbers (song numbers). The track numbers are numbers starting from for example "1".

Figure 25:
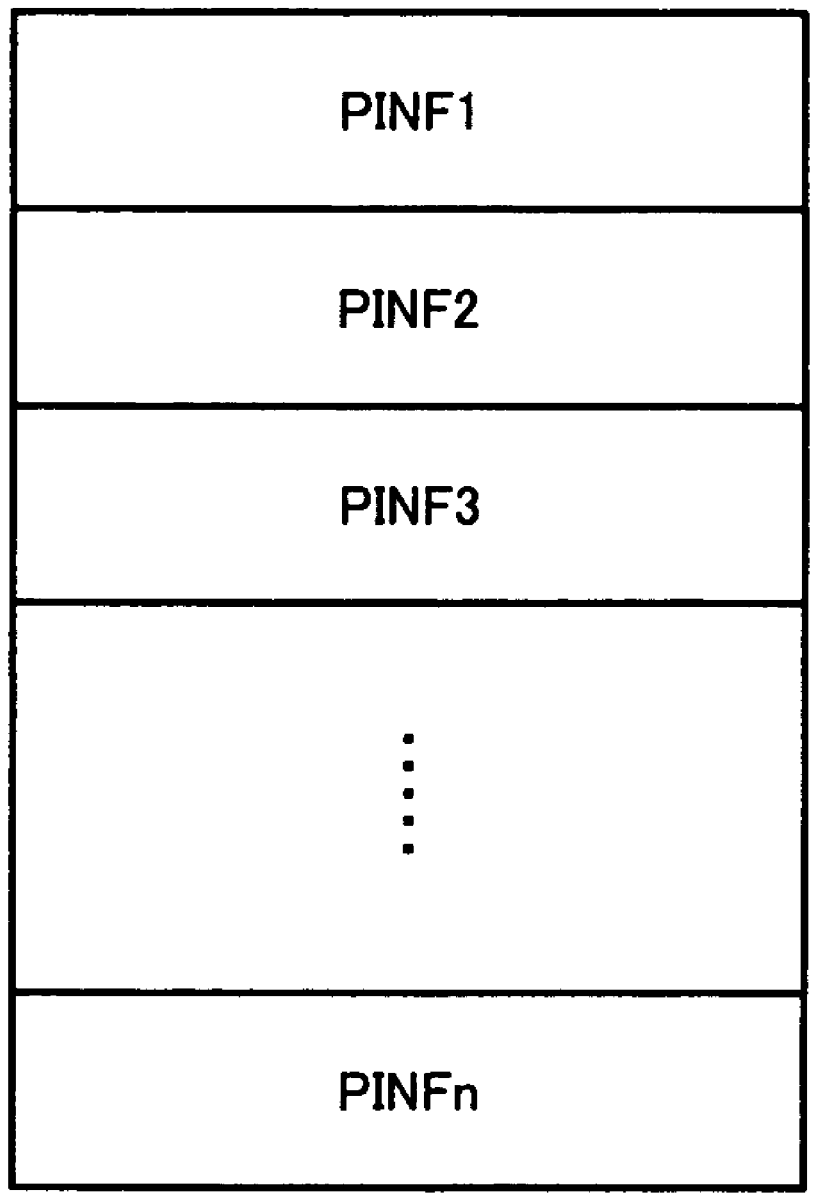
FIG. 25 is a schematic diagram describing a programmed play order table in accordance with the first example of the audio data managing system.

The programmed play order table is a table that each user has defined the play order. As shown in FIG. 25, the programmed play order table contains track information PINF1, PINF2, . . . that describe links to track descriptors of track numbers.

Figures 26A, 26B:
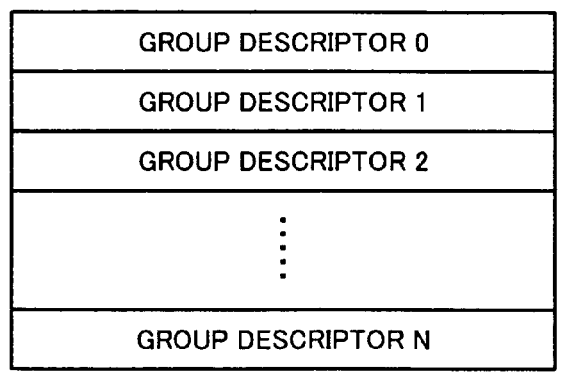
FIG. 26B are schematic diagrams describing a group information table in accordance with the first example of the audio data managing system.

As shown in FIG. 26A and FIG. 26B, the group information table contains information with respect to groups. A group is a set of tracks having successive track numbers (or a track having a track number) or a set of tracks having successive programmed track numbers (or a track having a programmed track number). As shown in FIG. 26A, the group information table contains group descriptors of groups. As shown in FIG. 26B, a group descriptor describes a track start number, a track end number, a group name, and a flag.

As shown in FIG. 27A and FIG. 27B, the track information table contains information about each song. As shown in FIG. 27A, the track information table is composed of track descriptors of tracks (songs). As shown in FIG. 27B, each track descriptor describes an encoding system, copyright management information, content's decryption key information, pointer information to a part number as an entry with which the song starts, an artist name, a title name, original song order information, record duration information, and so forth. As the artist name and the title name, their names are not contained, but pointer information to the name table. The encoding system represents a codec system and becomes decoding information.

Figure 28A:
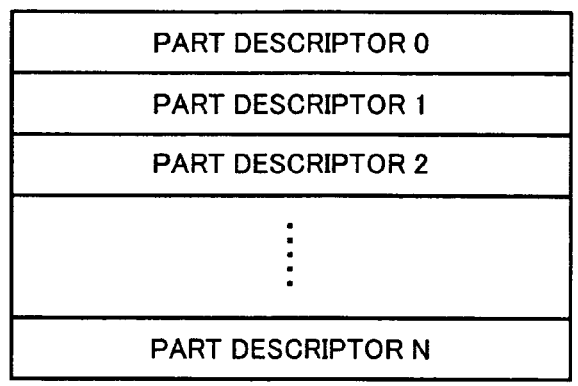
FIG. 28A and FIG. 28B are schematic diagrams describing a part information table in accordance with the first example of the audio data managing system.
Figure 28B:

As shown in FIG. 28A and FIG. 28B, the part information table contains pointers that access the positions of real songs in accordance with part numbers. As shown in FIG. 28A, the part information table is composed of part descriptors of parts. A part is a whole track (song) or each part into which one track is divided. FIG. 28B shows entries of a part descriptor of the part information table. As shown in FIG. 28B, each part descriptor describes a part start address of an audio data file, an end address thereof, and a link to the next part.

As addresses of the pointer information of a part number, the pointer information of the name table, and pointer information that represents the position of an audio file, a byte offset of the file, a part descriptor number, a cluster number of the FAT, a physical address of a disc used as a recording medium, and so forth can be used. The byte offset of the file is an offset method according to an embodiment of the present invention. The part pointer information is an offset value with which the audio file starts. The value of the part pointer information is represented in a predetermined unit (for example, byte, bit, or n-bit block).

Figure 29A:
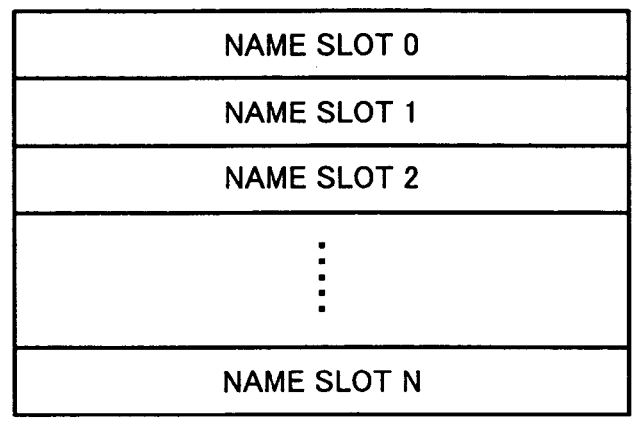
FIG. 29A and FIG. 29B are schematic diagrams describing a name table in accordance with the first example of the audio data managing system.
Figure 29B:
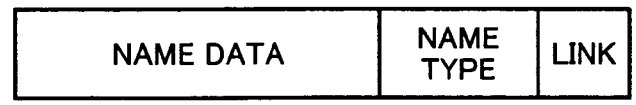

The name table is a table that represents characters as an entity of a name. As shown in FIG. 29A, the name table is composed of a plurality of name slots. Each name slot is linked and called from each pointer that represents a name. Pointers that call names are an artist name and a title name of the track information table, a group name of the group information table, and so forth. Each name slot can be called from a plurality of pointers. As shown in FIG. 29B, each name slot is composed of name data as character information, a name type as an attribute of character information, and a link. A long name that cannot be contained in one name slot can be divided into a plurality of portions so that they can be contained in a plurality of name slots. When a name cannot be contained in one name slot, a link to a name slot that contains the rest of the name is contained.

Figure 30:
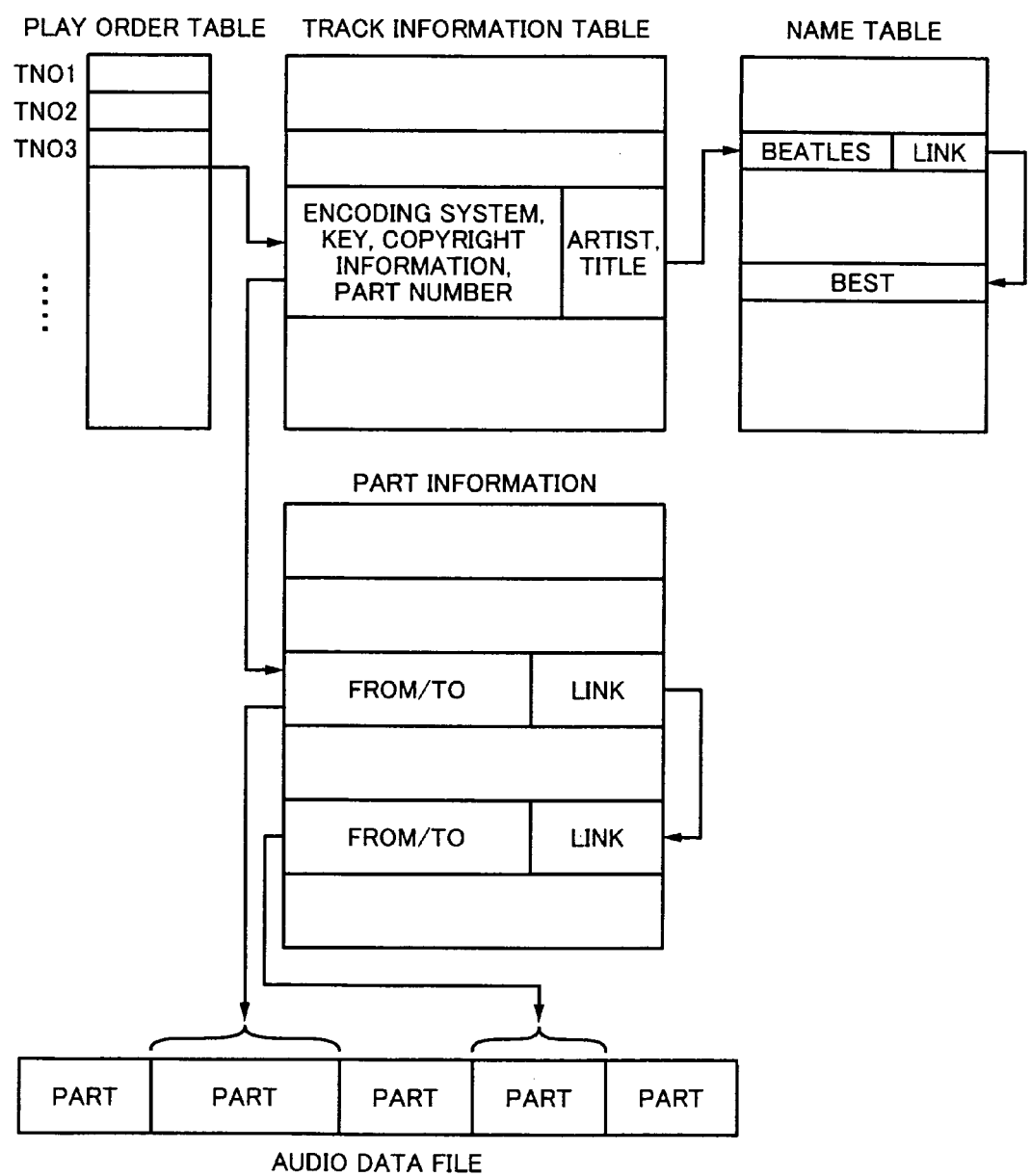
FIG. 30 is a schematic diagram describing an example of a process in accordance with the first example of the audio data managing system.

As shown in FIG. 30, in the first example of the managing system for audio data of the system according to the present invention, when a track number to be reproduced is designated on the play order table (FIG. 24), a linked track descriptor (FIG. 27A and FIG. 27B) is read from the track information table. From the track descriptor, an encoding system, copyright management information, content's decryption key information, pointer information to a start part number of the song, pointers to an artist name and a title name, original song order information, record duration information, and so forth are read.

The part information table (FIG. 28A and FIG. 28B) is linked in accordance with part number information that is read from the track information table. An audio data file is accessed at the part position corresponding to the track (song) start position from the part information table. When data of the part at the position designated on the part information table of the audio data file is accessed, the reproduction of the audio data is started from the position. At that point, the audio data is decoded in accordance with the decoding system that is read from the track descriptor of the track information table. When the audio data has been encrypted, the key information that is read from the track descriptor is used.

When the part is followed by another part, a link thereof is described in the part descriptor. In accordance with the link, part descriptors are successively read. The links of the part descriptors are traced and audio data of parts at positions designated by the part descriptors are reproduced. As a result, audio data of a desired track (song) can be reproduced.

A name slot (FIG. 29A and FIG. 29B) is called from the name table in accordance with the artist name pointer and title name pointer that are read from the track information table. Name data is read from the name slot. The name pointer information may be for example a name slot number, a cluster number of the FAT system, or a physical address of a recording medium.

Figure 31:
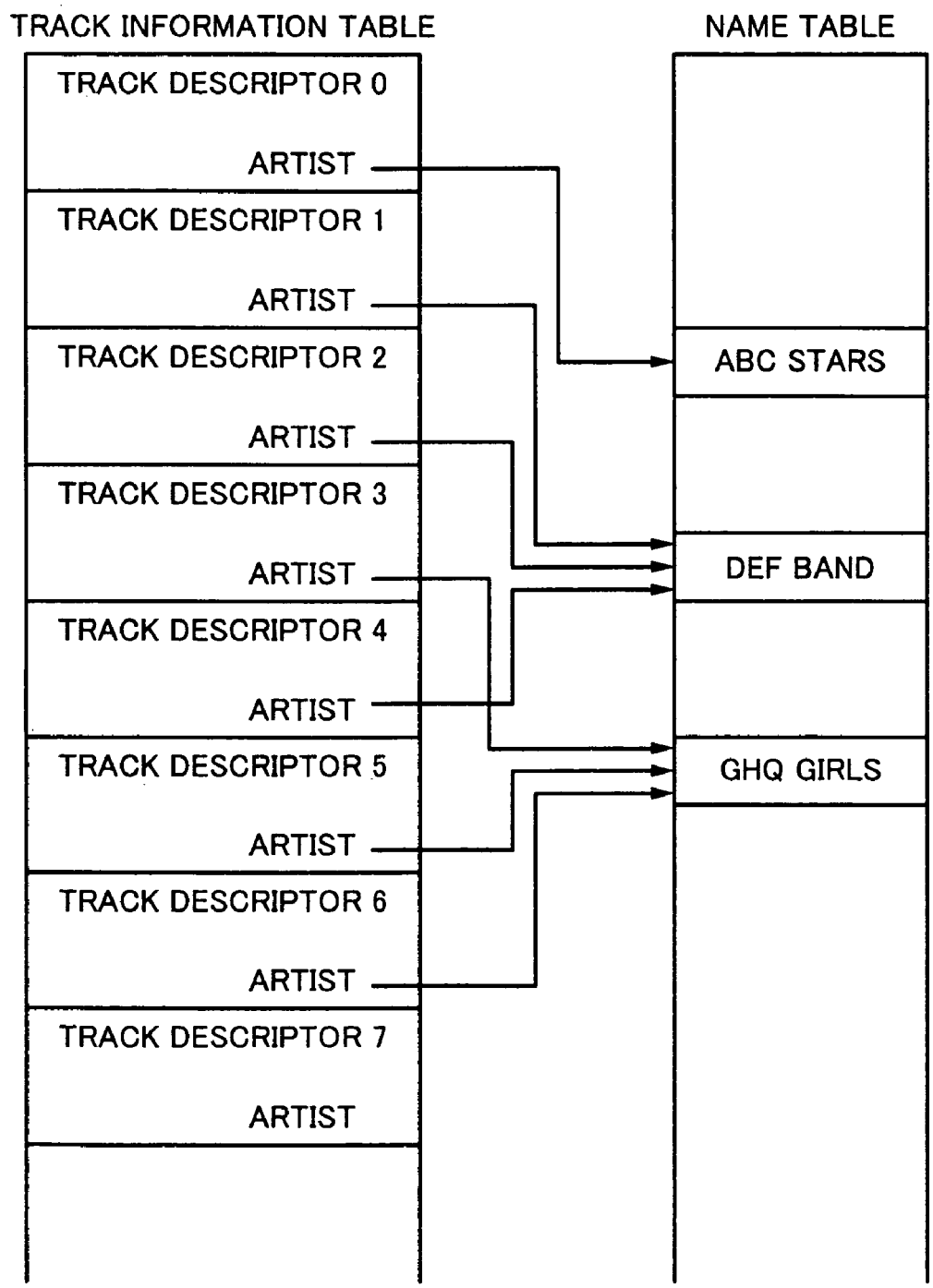
FIG. 31 is a schematic diagram describing that a plurality of name slots of the name table can be referenced.

As described above, a name slot of the name table can be referenced from a plurality of pointers. For example, a plurality of songs of the same artist may be recorded. In this case, as shown in FIG. 31, the name table as an artist name is referenced from a plurality of track information tables. In the example shown in FIG. 31, track descriptor "1," track descriptor "2," and track descriptor "4" are songs of the same artist "DEF BAND." As artist names, the same name slot is referenced. On the other hand, track descriptor "3," track descriptor "5," and track descriptor "6" are songs of the same artist "GHQ GIRLS." As artist names, the same name slot is referenced. When a name slot of the name table can be referenced from a plurality of pointers, the capacity of the name table can be decreased.

In addition, information of the same artist name can be displayed with a link to the name table. For example, to display a list of songs of the artist name "DEF BAND," track descriptors that reference the address of the name slot "DEF BAND" are traced back. In this example, when track descriptors that reference the address of the name slot "DEF BAND" are traced back, information of track descriptor "1," track descriptor "2," and track descriptor "4" is obtained. Thus, a list of songs of the artist name "DEF BAND" can be displayed. Since the name table can be referenced from a plurality of pointers, there is no link that allows the track information table to be traced back from the name table.

When new audio data is recorded, an unused area for a desired number of recording blocks, for example four or more successive blocks, is allocated on the FAT table. When an area for a desired number of successive recording blocks of audio data is allocated, it can be accessed without loss.

When an area for audio data has been allocated, a new track descriptor is assigned on the track information table. In addition, a content key with which the audio data is encrypted is created. The input audio data is encrypted. The encrypted audio data is recorded in the allocated unused area. The area for the audio data is connected to the last end of the audio data file on the FAT file system.

As the new audio data is connected to the audio file, information about the connected position is created. Position information of the newly created audio data is recorded in a newly assigned part description. Key information and part number are described in a newly assigned track descriptor. In addition, when necessary, an artist name, a title name, and so forth are described in a name slot. Pointers that link the artist name and title name are described in the track descriptor. The track descriptor number is registered to the play order table. In addition, the copyright management information is updated.

When audio data is reproduced, information corresponding to the designated track number is obtained from the play order table. A track descriptor of the track to be reproduced is obtained.

Key information is obtained from a track descriptor of the track information table. In addition, a part description that represents the area for the data of the entry is obtained. The start position of the part for desired audio data of the audio data file is obtained from the part description. The data is obtained from the position. The data reproduced from the position is decrypted with the obtained key information. As a result, the audio data is reproduced. When the part description describes a link to another part, it is linked and the same process is repeatedly performed.

When a song having track number "n" is changed to track number "n+m" on the play order table, track descriptor Dn that describes information of the track is obtained from track information TINFn of the play order table. Values of track information TINFn+1 to TINFn+m (track descriptor numbers) are decremented by one each. The number of track descriptor Dn is stored in track information TINFn+m.

When a song having track number "n" is deleted from the play order table, track descriptor Dn that describes information of the track is obtained from track information TINFn of the play order table. All effective track descriptor numbers after entry TINFn+1 of the play order table are decremented by 1 each. In addition, since track "n" needs to be deleted, all entries of track information after track "n" are decremented by 1 each in the play order table. An encoding system and a decryption key are obtained from the track information table in accordance with track descriptor Dn obtained as the track is erased. In addition, the number of part descriptor Pn that represents an area for the first music data is obtained. Audio blocks designated by part descriptor Pn are separated from the audio data file in the FAT file system. In addition, track descriptor Dn of the track is deleted from the track information table. Moreover, the part descriptor is deleted from the part information table. The part description is deallocated from the file system.

Figure 32A:
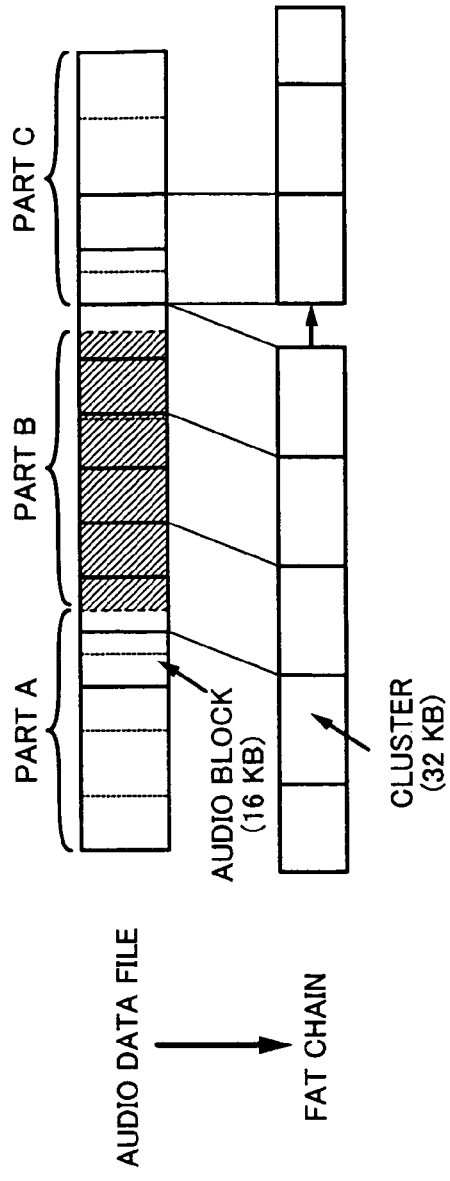
FIG. 32A and FIG. 32B are schematic diagrams describing a process for deleting a part from an audio data file in accordance with the first example of the audio data managing system.

For example, in FIG. 32A, it is assumed that part A, part B, and part C are connected and that part B is to be deleted. Part A and part B share the same audio block (and the same FAT cluster) and that the FAT chain is successive. In addition, it is assumed that although part C is immediately preceded by part B in the audio data file, these parts are apart in the FAT table.

Figure 32B:
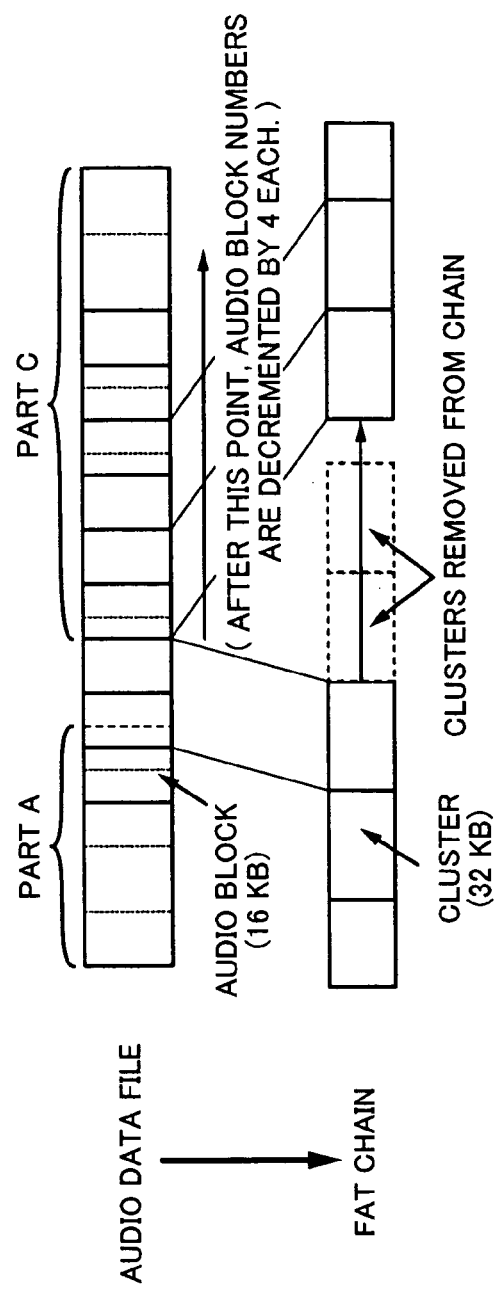

In the example, as shown in FIG. 32B, when part B is deleted, two FAT clusters that do not share clusters with the current part can be deallocated from the FAT chain (to a blank area). In other words, the audio data file is decreased to four audio blocks. As a result, the audio block numbers recorded after part C are decremented by 4 each.

A part of a track, not a whole track, can be deleted. When a part of a track is deleted, information of the rest of the track can be decrypted in accordance with a decrypting system and a decryption key obtained from part descriptor Pn on the track information table.

When track n and track n+1 are connected in the play order table, track descriptor number Dn that describes information of the track n is obtained from track information TINFn in the play order table. In addition, track descriptor number Dm that describes information of track n+1 is obtained from track information TINFn+1 in the play order table. All values (track descriptor numbers) of valid TINFs after TINFn+1 in the play order table are decremented by 1 each. The programmed play order table is searched for all tracks that reference track descriptor Dm and the obtained tracks are deleted. A new encryption key is created. A list of part descriptors is extracted from track descriptor Dn. The list of part descriptors extracted from track descriptor Dm is connected to the last end of the list of the part descriptors extracted from track descriptor Dn.

When tracks are connected, it is necessary to compare their track descriptors so as to check whether there is no problem on copyright management. In addition, it is necessary to obtain part descriptors from the track descriptors and determine whether the rule for fragment is satisfied when the tracks are connected in the FAT table. Moreover, if necessary, it is necessary to update pointers to the name table.

When track n is divided into track n and track n+1, track descriptor number Dn that describes information of track n is obtained from TINFn of the play order table. In addition, track descriptor number Dm that describes information of track n+1 is obtained from track information TINFn+1 of the play order table. Values of all valid track information TINFs (track descriptor numbers) after TINFn+1 of the play order table are incremented by 1 each. A new key for track descriptor Dn is created. A list of part descriptors is extracted from track descriptors Dn. A new part descriptor is assigned. The contents of the pre-divided part descriptor are copied to the new part descriptor. A part descriptor that describes a divide point is divided at the position of the divide point and the portion immediately after the divide point is deleted. Links of the part descriptor after the divide point are removed. A new part descriptor is assigned immediately after the divide point.

7. Second Example of Managing System for Music Data

Figure 33:
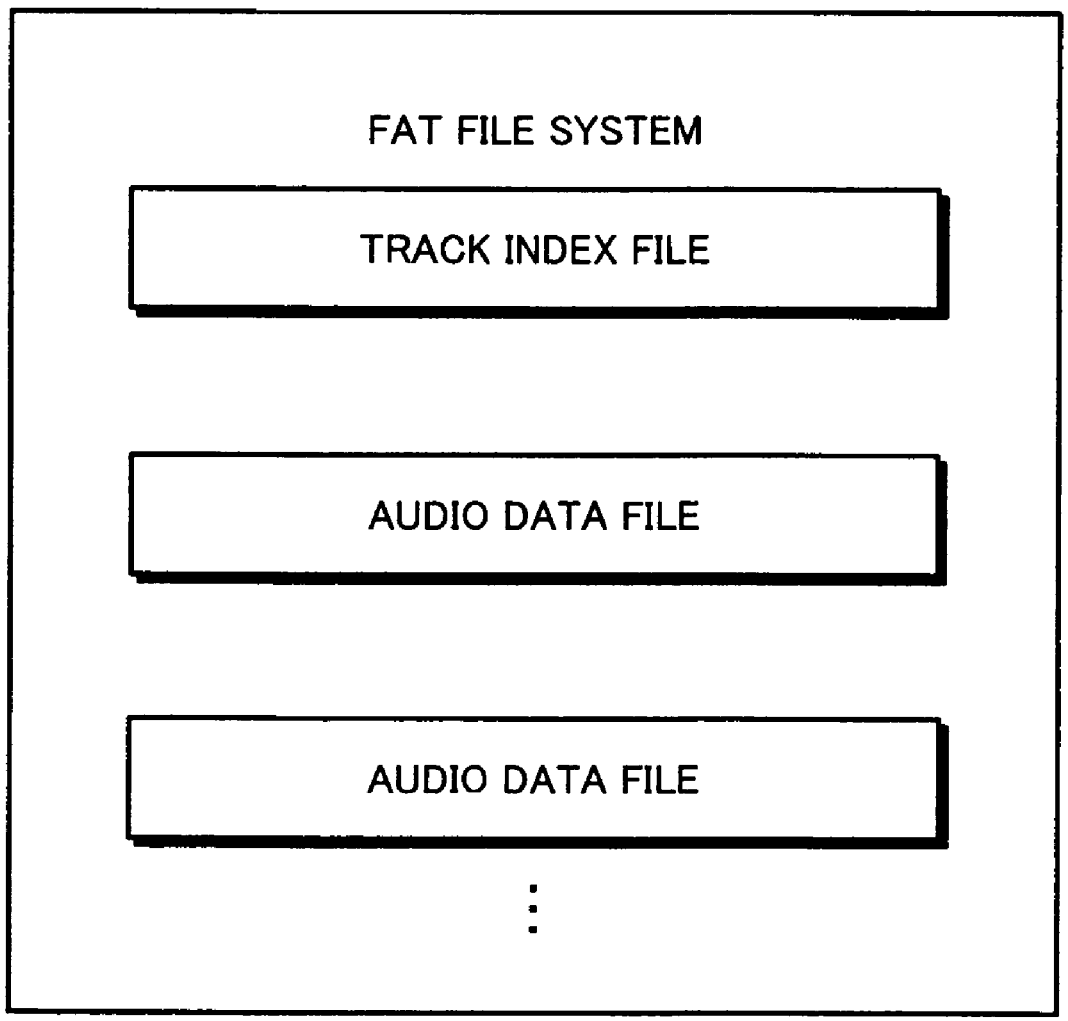
FIG. 33 is a schematic diagram describing a second example of the audio data managing system.

Next, a second example of the managing system for audio data will be described. FIG. 33 shows the second example of the managing system for audio data. As shown in FIG. 33, in the second example of the managing system for audio data, a track index file and a plurality of audio data files are created on a disc. The track index file and the plurality of audio data files are files managed in accordance with the FAT system.

Figure 34:
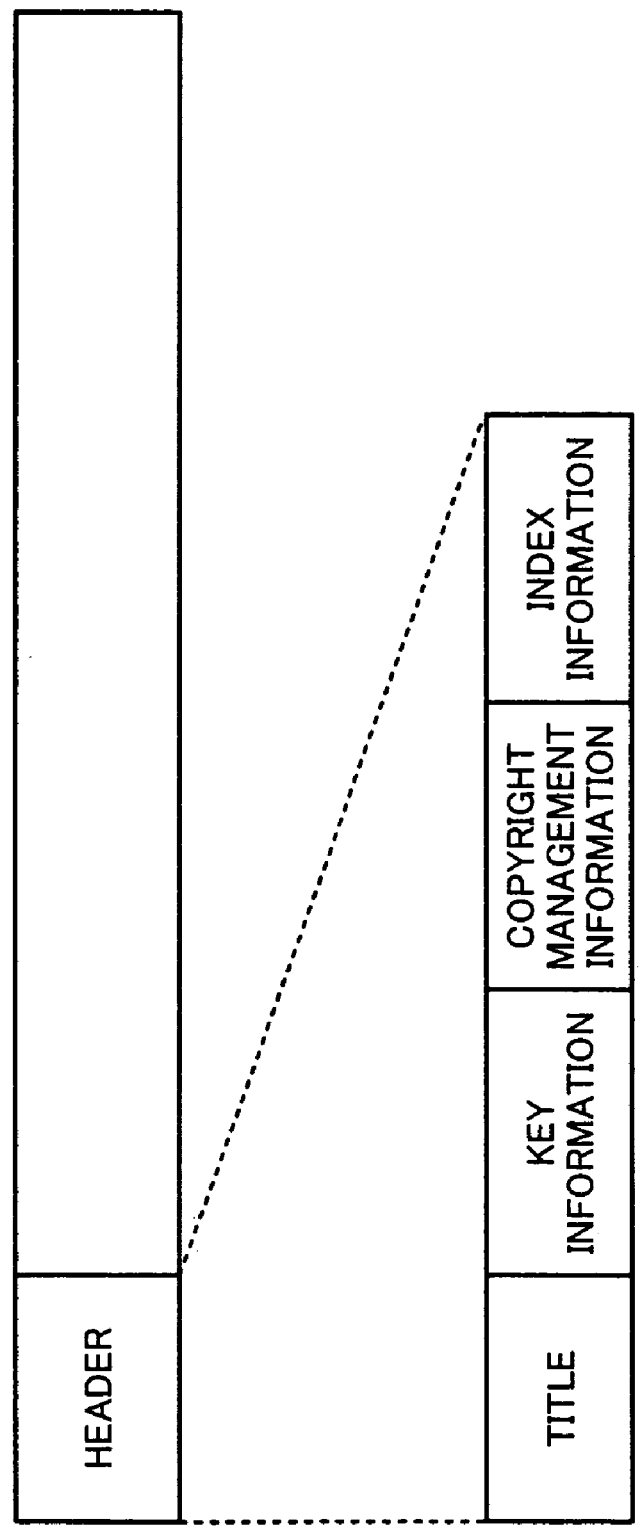
FIG. 34 is a schematic diagram showing the structure of an audio data file in accordance with the second example of the audio data managing system.

As shown in FIG. 34, an audio data file generally contains one song of music data in one file. The audio data file has a header. The header contains a title, decryption key information, and copyright management information. In addition, the header contains index information. An index divides a song of one track into a plurality of portions. The header contains positions of divided portions of a track corresponding to index numbers. The index can contain for example 255 index numbers.

Figure 35:
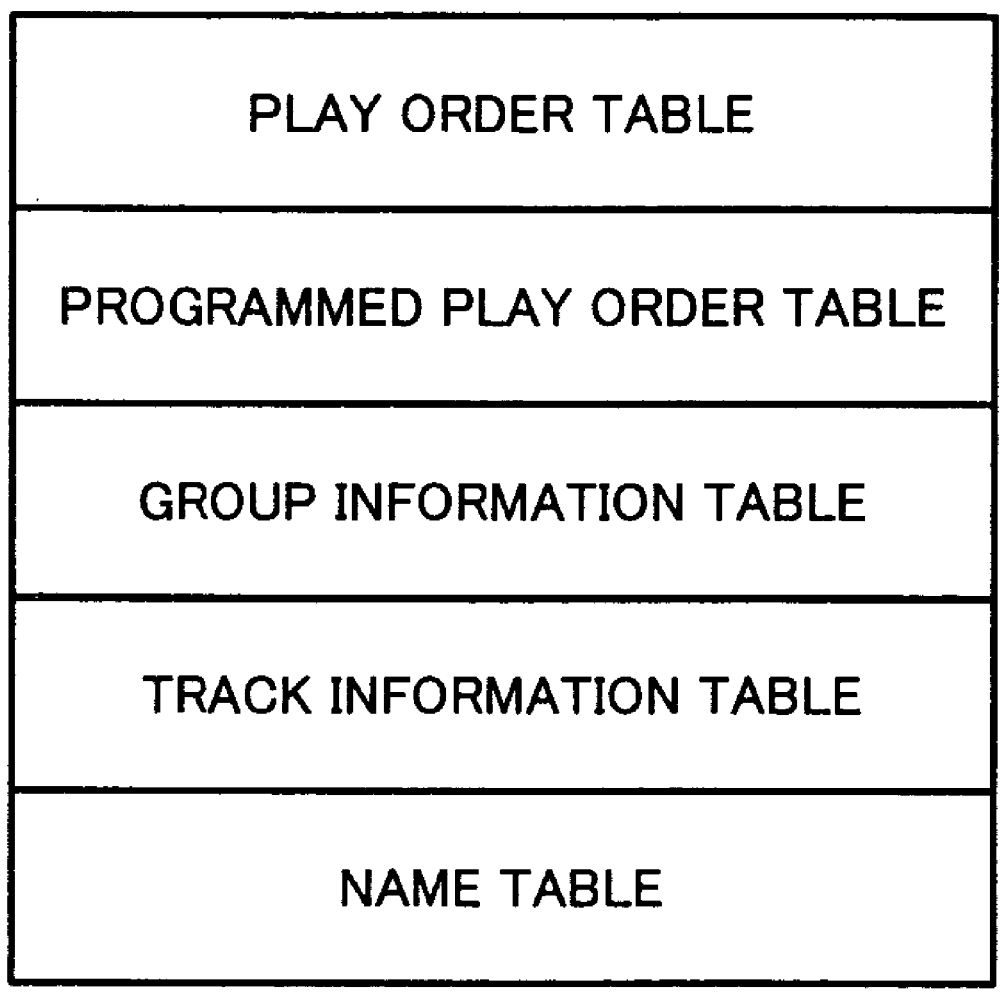
FIG. 35 is a schematic diagram describing a track index file in accordance with the second example of the audio data managing system.

The track index file is a file that contains various types of information with which music data stored in an audio data file is managed. As shown in FIG. 35, the track index file is composed of a play order table, a programmed play order table, a group information table, a track information table, and a name table.

Figure 36:
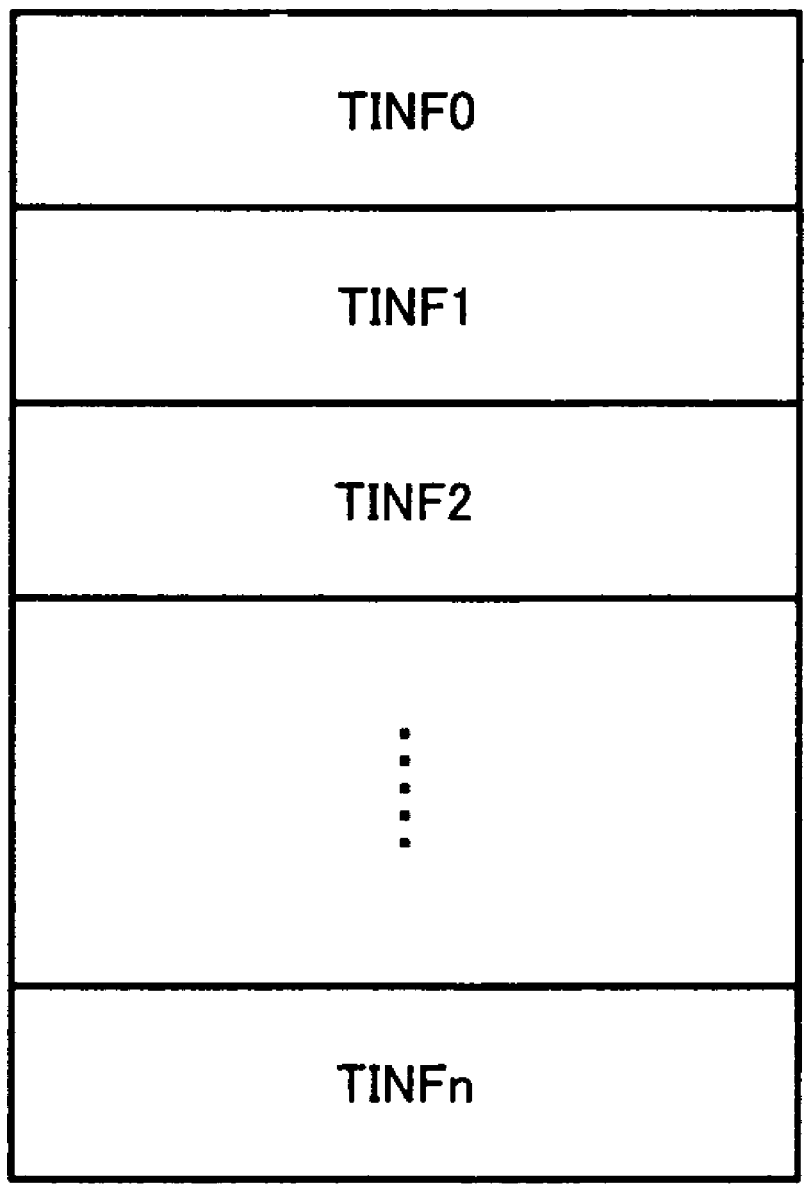
FIG. 36 is a schematic diagram describing a play order table in accordance with the second example of the audio data managing system.

The play order table is a table that represents the reproduction order defined in default. As shown in FIG. 36, the play order table stores, information TINF1, TINF2, . . . that represent links to track descriptors (FIG. 39A and FIG. 39B) on the track information table for track numbers (song numbers). The track numbers are numbers starting from for example "1."

Figure 37:
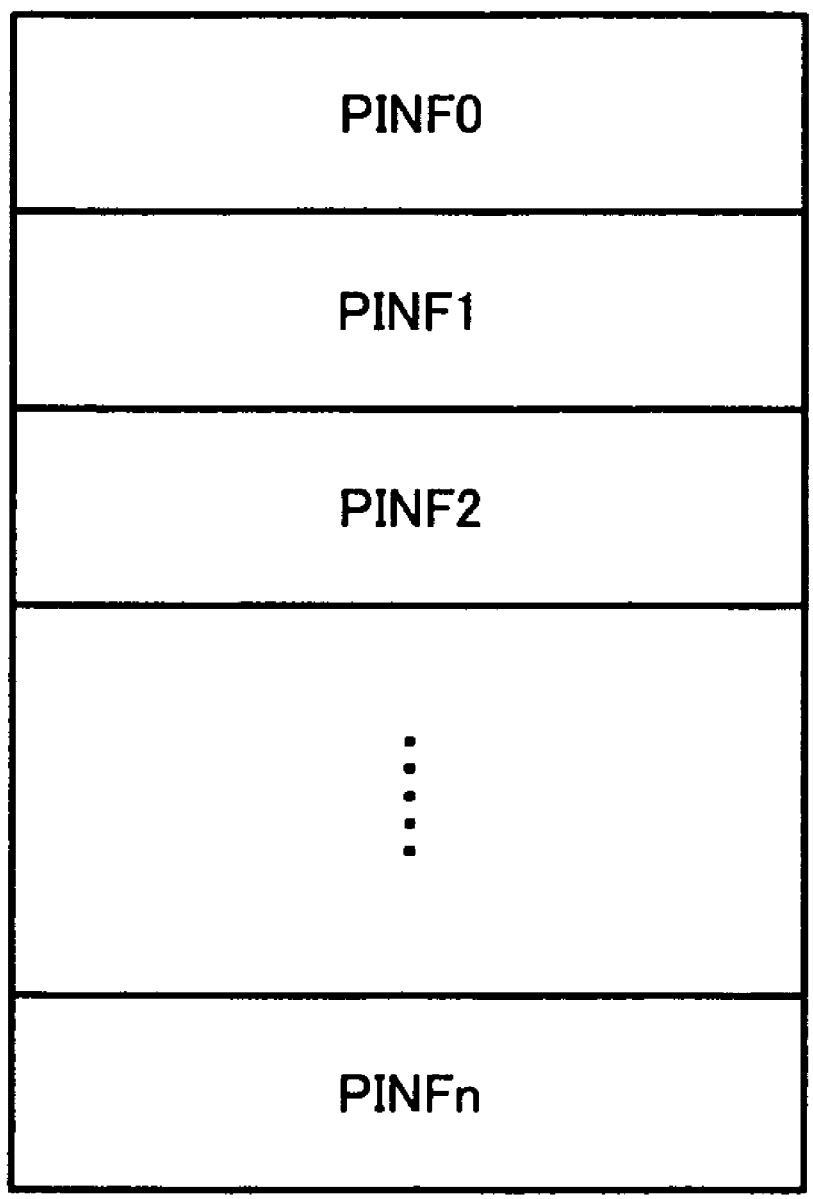
FIG. 37 is a schematic diagram describing a programmed play order table in accordance with the second example of the audio data managing system.

The programmed play order table is a table that each user has defined the play order. As shown in FIG. 37, the programmed play order table contains track information PINF1, PINF2, . . . that describe links to track descriptors of track numbers.

Figures 38A, 38B:
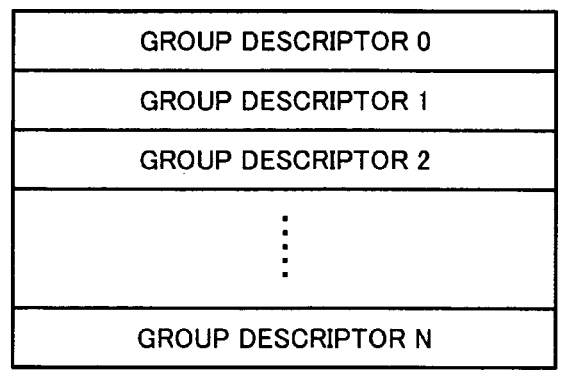
FIG. 38A and FIG. 38B are schematic diagrams describing a group information table in accordance with the second example of the audio data managing system.

As shown in FIG. 38A and FIG. 38B, the group information table contains information with respect to groups. A group is a set of tracks having successive track numbers (or a track having a track number) or a set of tracks having successive programmed track numbers (or a track having a programmed track number). As shown in FIG. 38A, the group information table contains group descriptors of groups. As shown in FIG. 38B, a group descriptor describes a track start number, a track end number, a group name, and a flag.

As shown in FIG. 39A and FIG. 39B, the track information table contains information about each song. As shown in FIG. 39A, the track information table is composed of track descriptors of tracks (songs). As shown in FIG. 39B, each track descriptor describes a pointer to an audio data file of a song, an index number, an artist name, a title name, original song order information, record duration information, and so forth. As the artist name and the title name, their names are not contained, but pointer information to the name table.

Figure 40A:
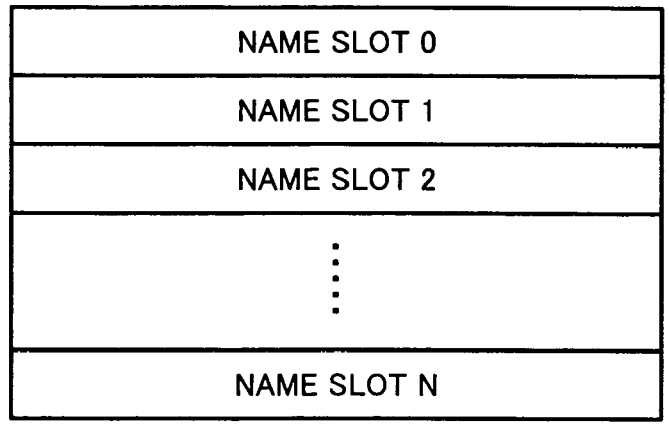
FIG. 40A and FIG. 40B are schematic diagrams describing a name table in accordance with the second example of the audio data managing system.
Figure 40B:

The name table is a table that represents characters as an entity of a name. As shown in FIG. 40A, the name table is composed of a plurality of name slots. Each name slot is linked and called from each pointer that represents a name. Pointers that call names are an artist name and a title name of the track information table, a group name of the group information table, and so forth. Each name slot can be called from a plurality of pointers. As shown in FIG. 40B, each name slot is composed of name data, a name type, and a link. A long name that cannot be contained in one name slot can be divided into a plurality of portions so that they can be contained in a plurality of name slots. When a name cannot be contained in one name slot, a link to a name slot that contains the rest of the name is contained.

Figure 41:
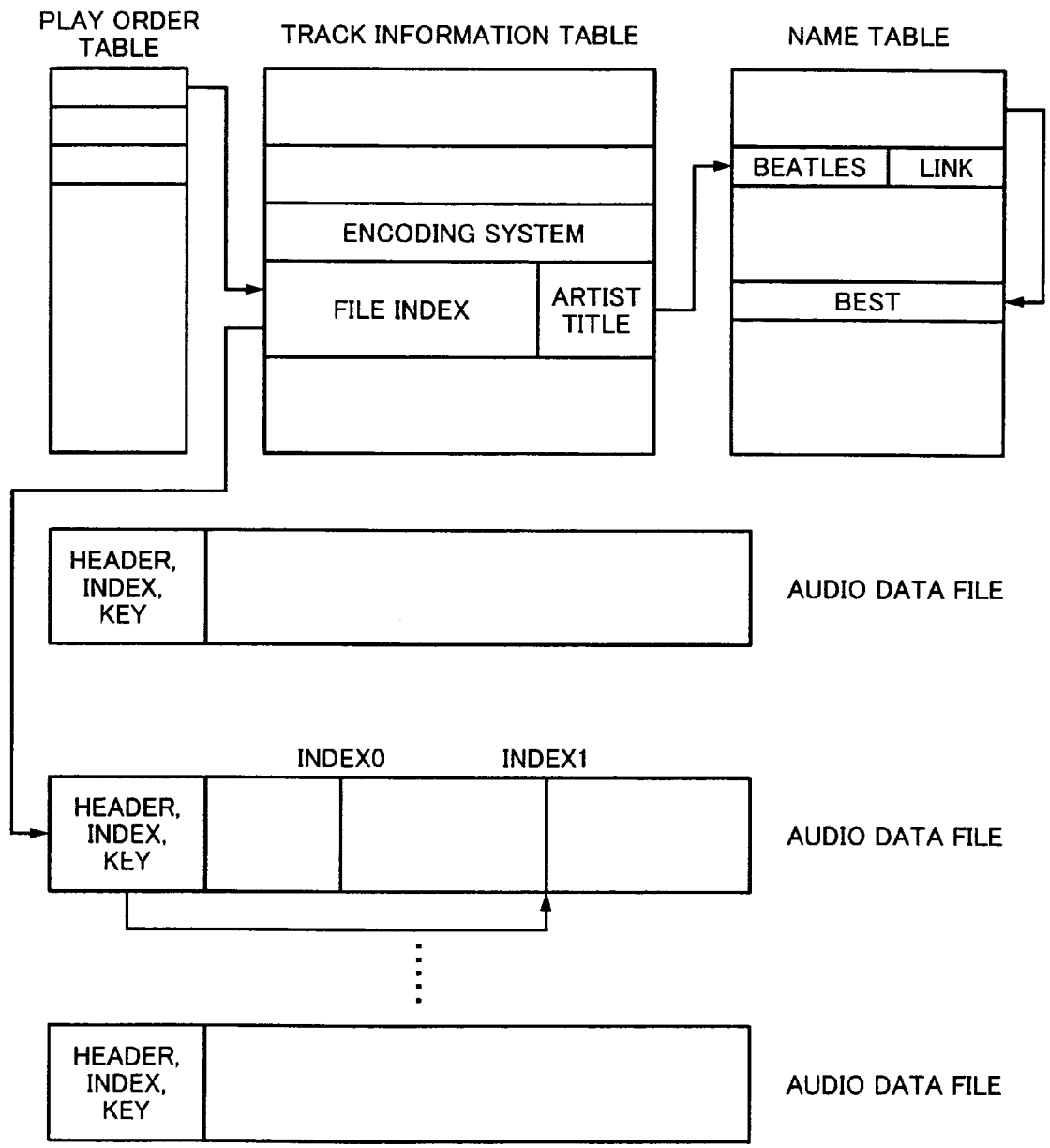
FIG. 41 is a schematic diagram describing an example of a process in accordance with the second example of the audio data managing system.

As shown in FIG. 41, in the second example of the managing system for audio data, when a track number to be reproduced is designated on the play order table (FIG. 36), a linked track descriptor (FIG. 39A and FIG. 39B) is read from the track information table. From the track descriptor, a file pointer to the song, an index number, pointers to an artist name and a title name, original song order information, record duration information, and so forth are read.

The audio data file is accessed from the pointer of the file of the song. Information of the header of the audio data file is read. When the audio data has been encrypted, key information that is read from the audio data file is used. The audio data file is reproduced. If an index number has been designated, the position of the designated index number is detected from the information of the header. The reproduction is started from the position of the index number.

A name slot is called from the name table in accordance with the artist name pointer and title name pointer that are read from the track information table. Name data is read from the name slot.

When new audio data is recorded, an unused area for a desired number of recording blocks, for example four or more successive blocks, is allocated on the FAT table.

When an area for audio data has been allocated, a new track descriptor is assigned on the track information table. In addition, a content key with which the audio data is encrypted is created. The input audio data is encrypted and an audio data file is created.

A pointer to the newly created audio file and key information are described in a newly assigned track descriptor. In addition, when necessary, an artist name, a title name, and so forth are contained in a name slot. Pointers that link the artist name and title name are described in the track descriptor. The track descriptor number is registered to the play order table. In addition, the copyright management information is updated.

When audio data is reproduced, information corresponding to the designated track number is obtained from the play order table. A track descriptor of the track to be reproduced is obtained from the track information table.

A file pointer of audio data as the music data and an index number are extracted from the track descriptor. The audio data file is accessed. Key information is obtained from the header of the file. The data of the audio data file is decrypted with the obtained key information and the audio data is reproduced. When the index number has been designated, the reproduction is started from the position of the designated index number.

When track n is divided into track n and track n+1, track descriptor number Dn that describes information of track n is obtained from TINFn of the play order table. In addition, track descriptor number Dm that describes information of track n+1 is obtained from track information TINFn+1 of the play order table. Values of all valid track information TINFs (track descriptor numbers) after TINFn+1 of the play order table are incremented by 1 each.

Figure 42:
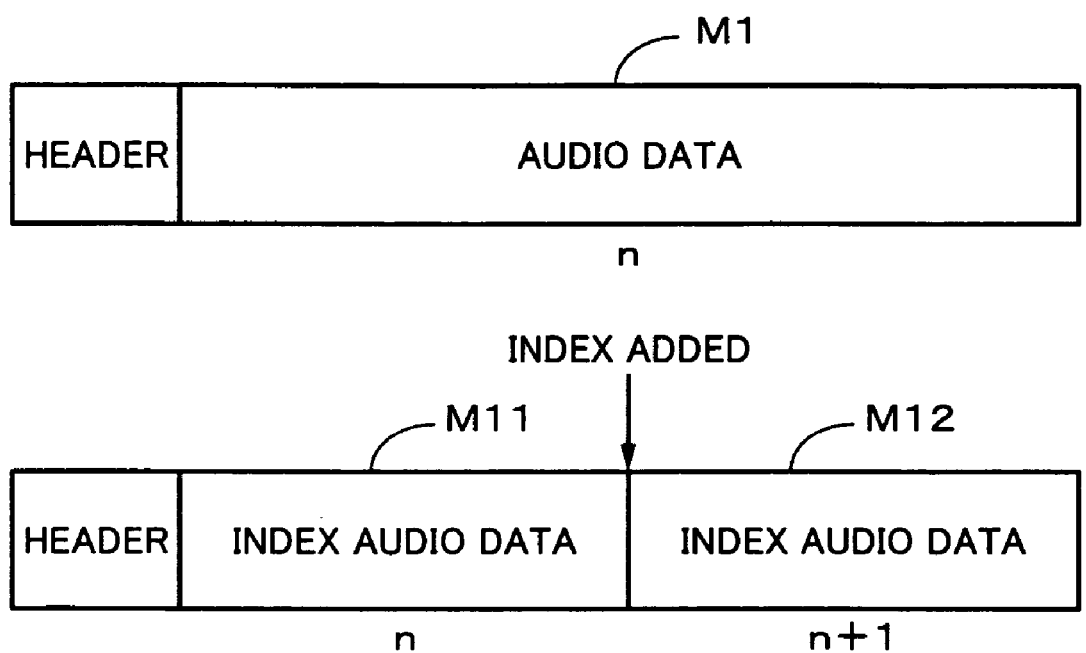
FIG. 42 is a schematic diagram describing that data of one file is divided into a plurality of index areas with indexes in accordance with the second example of the audio data managing system.

As shown in FIG. 42, when an index is used, data of one file can be divided into a plurality of index areas. An index number and the position of an index area are recorded on the header of the audio track file. A file pointer of audio data and an index number are described in track descriptor Dn. A file pointer of audio data and an index number are described in track descriptor Dm. Thus, song M1 of one track of an audio file is apparently divided into song M11 and song M12 of two tracks.

When track n and track n+1 are connected in the play order table, track descriptor number Dn that describes information of track n is obtained from track information TINFn in the play order table. In addition, track descriptor number Dm that describes information of track n+1 is obtained from track information TINFn+1 in the play order table. All values (track descriptor numbers) of valid TINFs after TINFn+1 in the play order table are decremented by 1 each.

Figure 43:
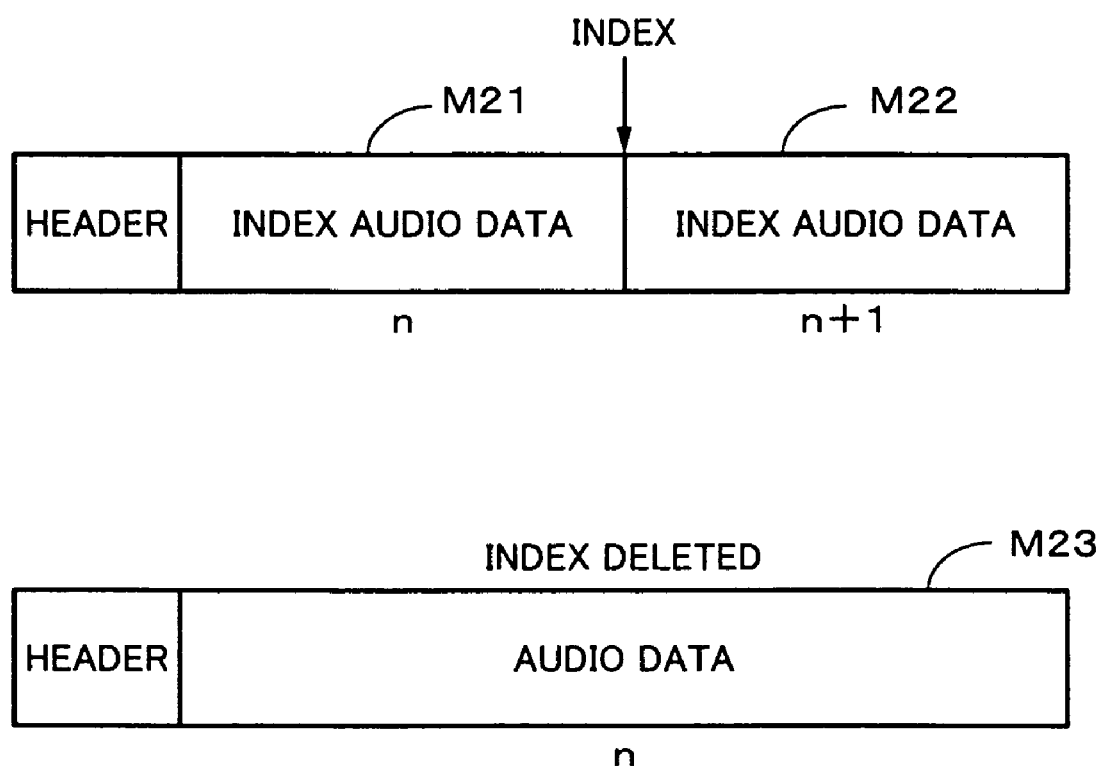
FIG. 43 is a schematic diagram describing a connection of tracks in accordance with the second example of the audio data managing system.

When track n and track n+1 are recorded in the same audio data file and divided by an index, as shown in FIG. 43, if index information of the header is deleted, they can be connected. Thus, songs M21 and M22 of two tracks are connected to song M23 of one track.

Figure 44:
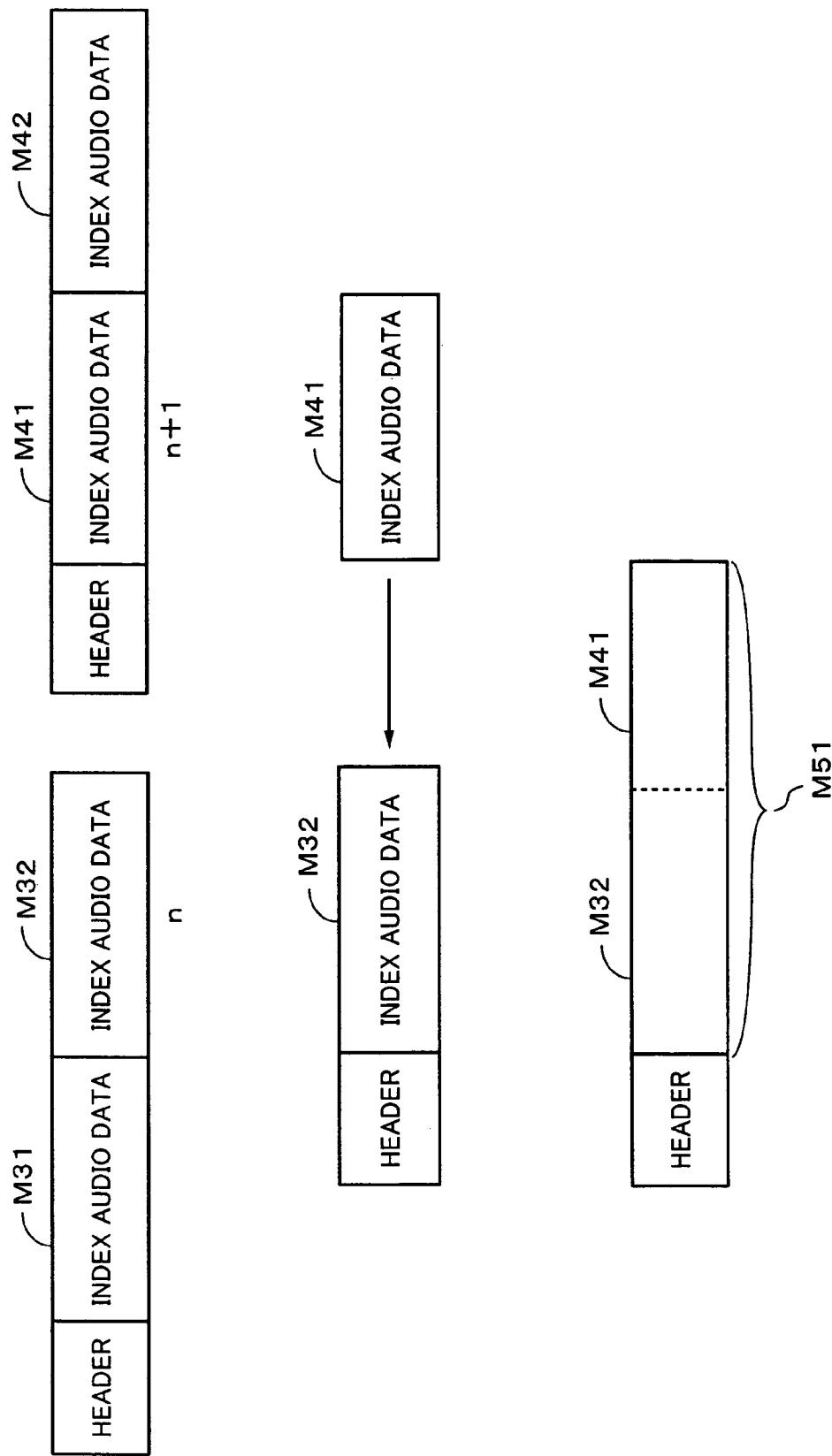
FIG. 44 is a schematic diagram describing a connection of tracks in accordance with another method of the second example of the audio data managing system.

When track n is a second half of which one audio data file is divided by an index and track n+1 is at the beginning of another audio data file, as shown in FIG. 44, a header is added to data of track n that has been divided by the index. As a result, an audio data file of song M32 is created. The header of the audio data file of track n+1 is removed and audio data of track n+1 of song M41 is connected to the audio data file of track n+1. Thus, songs M32 and M41 of the two tracks are connected as song M51 of one track.

To accomplish the foregoing processes, a function for adding a header to a track divided by an index, encrypting the track with another encryption key, and converting the audio data divided by the index into one audio data file and another function for removing the header of the audio data file and connecting the audio data file and another audio data file are provided.

8. Operations of Disc Systems when Connected to Personal Computer

To allow the next generation MD 1 and the next generation MD 2 to have compatibility with personal computers, these systems use the FAT system as a data managing system. Thus, the disc of the next generation MD 1 and the disc of the next generation MD 2 can deal with not only audio data, but computer data that is read and written by personal computers.

The disc drive device 1 reads and reproduces audio data from the disc 90. Thus, in consideration of the accessibility of the portable disc drive device 1, it is preferred to successively record audio data. On the other hand, when a personal computer writes data onto a disc, the personal computer allocates blank areas to the disc without consideration of the continuity.

Thus, in the recording and reproducing apparatus according to an embodiment of the present invention, the personal computer 100 and the disc drive device 1 are connected with the USB hub 7. When data is written from the personal computer 100 to the disc 90 loaded into the disc drive device 1, general computer data is written onto the disc 90 under the control of the file system on the disc drive device 1 side; audio data, under the control of the file system on the disc drive device 1 side.

Figure 45A:
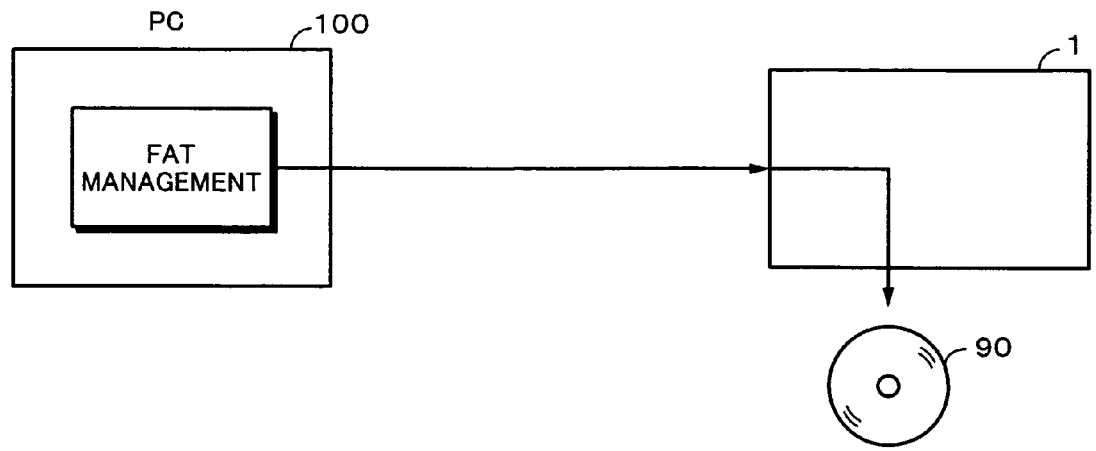
FIG. 45A and FIG. 45B are schematic diagrams describing that management power is transferred depending on the type of data to be written in the state that a personal computer and a disc drive device are connected.
Figure 45B:
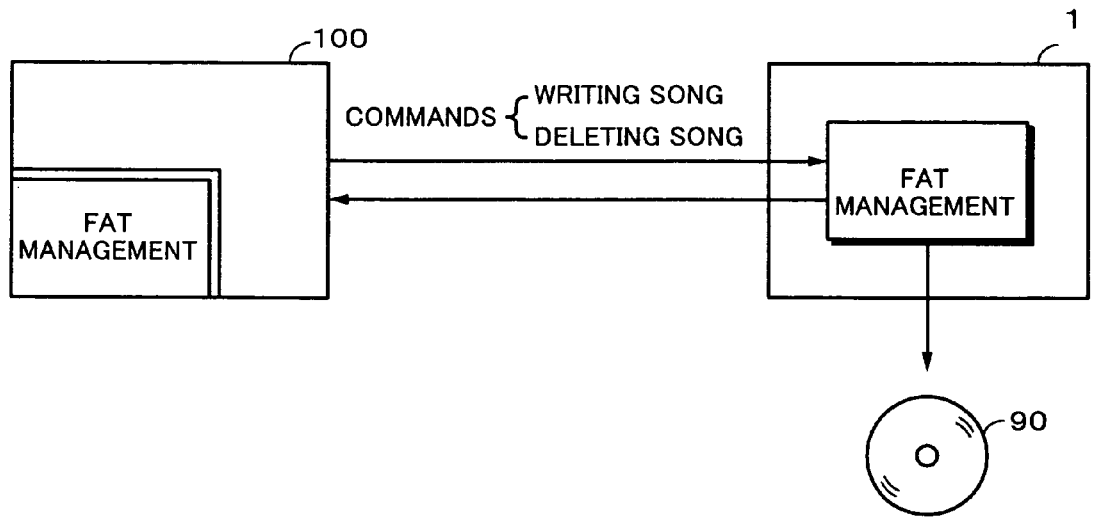

FIG. 45A and FIG. 45B are schematic diagrams describing that management power is transferred depending on the type of data to be written in the state that the personal computer 100 and the disc drive device 1 are connected with the USB hub 7 (not shown). FIG. 45A shows an example of which general computer data is transferred from the personal computer 100 to the disc drive device 1 and recorded onto the disc 90 loaded into the disc drive device 1. In this case, the FAT of the disc 90 is managed by the file system on a screen of the personal computer 100 side.

In this case, it is assumed that the disc 90 is a disc that has been formatted in accordance with either the next generation MD 1 or the next generation MD 2.

In other words, the personal computer 100 side handles the disc drive device 1 connected thereto like a removable disc managed by the personal computer 100. Thus, the personal computer 100 can read and write data from and onto the disc 90 loaded into the disc drive device 1 so that the personal computer 100 reads and writes data from and onto a flexible disc.

The file system on the personal computer 100 side can be provided as a function of an OS (Operating System) as basic software installed in the personal computer 100. As well known, the OS is recorded as a predetermined program file in for example a hard disk drive of the personal computer 100. When the personal computer 100 is started, the program file is read and executed so that each function of the OS is provided.

FIG. 45B shows an example of which audio data is transferred from the personal computer 100 to the disc drive device 1 and recoded onto the disc 90 loaded in the disc drive device 1. For example, audio data has been recorded in a recording medium that is for example a hard disk drive (HDD) of the personal computer 100.

It is assumed that utility software that causes the personal computer 100 to encode audio data in accordance with the ATRAC compressing system, write audio data onto the disc 90 loaded in the disc drive device 1, and delete audio data from the disc 90 has been installed in the personal computer 100. The utility software also has a function for referencing a track index file of the disc 90 loaded in the disc drive device 1 and browsing track information recorded on the disc 90. The utility software is recorded as a program file in for example the HDD of the personal computer 100.

For example, the case of which audio data recorded in the recording medium of the personal computer 100 is recorded on the disc 90 loaded in the disc drive device 1 will be described. In this case, it is assumed that the foregoing utility software has been started.

First of all, the user operates the personal computer 100 so as to record predetermined audio data (referred to as audio data A) recorded in the HDD to the disc 90 loaded in the disc drive device 1. According to the user's operation, a write request command that causes audio data A to be recorded on the disc 90 is output by the utility software. The write request command is transmitted from the personal computer 100 to the disc drive device 1.

Thereafter, audio data A is read from the HDD of the personal computer 100. The utility software installed in the personal computer 100 performs an encoding process for audio data A in accordance with the ATRAC compressing system and converts audio data A into ATRAC compressed data. Audio data A that has been converted into the ATRAC compressed data is transferred from the personal computer 100 to the disc drive device 1.

The disc drive device 1 side receives the write request command from the personal computer. As a result, the disc drive device 1 recognizes that audio data A converted into the ATRAC compressed data has been transferred from the personal computer 100 and the transferred data has been recorded as audio data onto the disc 90.

The disc drive device 1 receives audio data A from the personal computer 100 through the USB hub 7. The disc drive device 1 sends audio data A to the medium drive portion 2 through the USB interface 6 and the memory transfer controller 3. When the system controller 9 sends audio data A to the medium drive portion 2, the system controller 9 controls the medium drive portion 2 so that audio data A is written onto the disc 90 in accordance with the FAT managing method of the disc drive device 1. In other words, audio data A is successively written onto the disc 90 in accordance with the FAT system of the disc drive device 1 so that four recording blocks, namely 64 kbytes×4, of audio data A as the minimum recording length is written onto the disc 90 at a time.

Until data are completely written onto the disc 90, data, statuses, and commands are exchanged between the personal computer 100 and the disc drive device 1 in accordance with a predetermined protocol. Thus, the data transfer rate is controlled so that overflow and underflow do not take place in the cluster buffer 4 on the disc drive device 1 side.

Commands that can be used on the personal computer 100 side are for example a delete request command besides the foregoing write request command. The delete request command is a command that causes the disc drive device 1 to delete audio data recorded on the disc 90 loaded in the disc drive device 1.

When the personal computer 100 and the disc drive device 1 are connected and the disc 90 is loaded into the disc drive device 1, the foregoing utility software causes the disc drive device 1 to read a track index file from the disc 90. Data are read from the track index file and transmitted from the disc drive device 1 to the personal computer 100. The personal computer can display a list of titles of audio data recoded on the disc 90.

When the personal computer 100 tires to delete particular audio data (audio data B) from the list of titles displayed, information that represents audio data B to be deleted is transmitted to the disc drive device 1 along with the delete request command. When the disc drive device 1 receives the delete request command, the disc drive device 1 deletes the requested audio data B under the control of the disc drive device 1 itself.

Since audio data is deleted under the control of the FAT system of the disc drive device 1, a process for deleting audio data from a jumbo file composed of a plurality of songs of audio data can be performed.

9. Copy Restriction of Audio Data Recorded on Disc

To protect copyright of audio data recorded on the disc 90, a copy for audio data recorded on the disc 90 into another recording medium or the like should be restricted. It is considered that audio data recorded on the disc 90 is transferred from the disc drive device 1 to the personal computer 100 and recorded in the HDD or the like of the personal computer 100.

In this example, it is assumed that the disc 90 is a disc that has been formatted in accordance with the next generation MD 1 or the next generation MD 2. In addition, it is assumed that a check-out operation, a check-in operation, and so forth that will be described later are performed under the control of the foregoing utility software installed in the personal computer 100.

Figure 46:
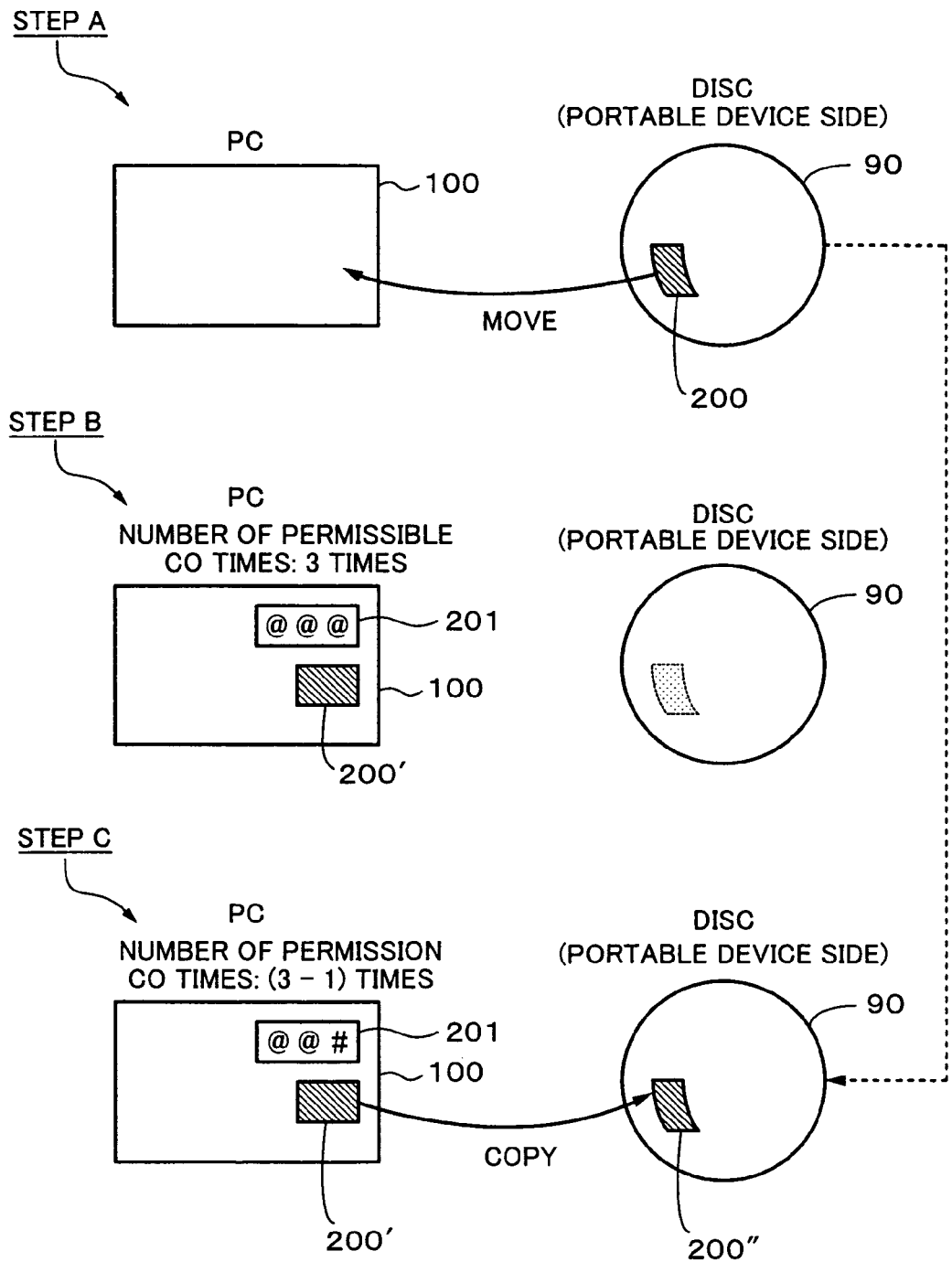
FIG. 46 is a schematic diagram describing steps of a checkout of a sequence of audio data.

At step A shown in FIG. 46, audio data 200 recorded on the disc 90 is moved to the personal computer (PC) 100. The term "move" means a sequence of operations of which objective audio data 200 are copied to the personal computer 100 and the objective audio data are deleted from the source recording medium (disc 90). In other words, when data are moved, the data are deleted from the source and the data are moved to the destination.

An operation of which data are copied from a recording medium to another recording medium and the number of permissible copy times is decremented by 1 is referred to as check-out. In contrast, an operation of which data are deleted from a checked-out destination and the number of permissible copy times of the check-out source is incremented by 1 is referred to as check-in.

When the audio data 200 are moved to the personal computer 100, the audio data 200 are moved (as audio data 200') to the recording medium, for example the HDD, of the personal computer 100 and the audio data 200 are deleted from the source disc 90. At step B shown in FIG. 46, the personal computer 100 sets the number of permissible check-out (CO) (or predetermined) times 201 to the moved audio data 200'. In this example, the number of permissible check-out (CO) times 201 has been set for 3 times as denoted by "@." In other words, the audio data 200' can be checked out from the personal computer 100 to external recording mediums by the number of permissible check-out times 201.

If the checked-out audio data 200 have been deleted from the source disc 90, the user may feel inconvenient about that. Thus, the audio data 200' checked out to the personal computer 100 are restored to the disc 90.

When the audio data 200' are re-written from the personal computer 100 to the source disc 90, at step C shown in FIG. 46, the number of permissible check-out times is consumed by 1. Thus, the resultant number of permissible check-out times becomes (3−1=2) times. At step C shown in FIG. 46, the consumed permissible check-out time is denoted by "#." Since the remaining number of permissible check-out times of the audio data 200' stored in the personal computer 100 is 2 times, the audio data 200' are not deleted from the personal computer 100. In other words, the audio data 200' stored in the personal computer 100 are copied from the personal computer to the disc 90. On the disc 90, audio data 200" as a copy of the audio data 200' are recorded.

The number of permissible check-out times 201 is managed by copyright management information of a track descriptor of the track information table (see FIG. 27B). Since a track descriptor is described for each track, the number of permissible check-out times 201 can be set for each track such as music data. A track descriptor copied from the disc 90 to the personal computer 100 is used as control information of audio data moved to the personal computer 100.

When audio data are moved from the disc 90 to the personal computer 100, a track descriptor corresponding to the moved audio data is copied to the personal computer 100. The personal computer 100 manages the audio data moved from the disc 90 in accordance with the track descriptor. When the audio data have been moved and recorded in the HDD or the like of the personal computer 100, the number of permissible check-out times 201 of the copyright management information in the track descriptor is set for the predetermined number of times (in this example, 3 times).

As the copyright management information, in addition to the number of permissible check-out times 201, a machine ID that identifies a source check-out machine and a content ID that identifies a content (audio data) that has been checked out are managed. At step C shown in FIG. 46, the machine ID of the copy destination machine is authenticated in accordance with the machine ID in the copyright management information corresponding to the audio data to be copied. When the machine ID of the copyright management information does not match the machine ID of the copy destination machine, the audio data can be prohibited from being copied.

In the sequence of check-out process at steps A to C shown in FIG. 46, audio data on the disc 90 is moved to the personal computer 100 and then re-written from the personal computer 100 to the disc 90. Thus, the user should perform complicated and troublesome steps. In addition, since the user needs a read time for which audio data is read from the disc 90 and a write time for which audio data is re-written to the disc 90, he or she may feel a loss of time. In addition, the user does not like audio data to be deleted from the disc 90.

Thus, when audio data recorded on the disc 90 are checked out, the foregoing intermediate step is omitted as if it has been performed so that only the result at step C shown in FIG. 46 is accomplished. Next, an example of this step will be described. This step is executed by a user's single command such as "check out audio data of audio file A recorded on the disc 90."

(1) Audio data recorded on the disc 90 are copied to the HDD of the personal computer 100. In addition, part of management data for the audio data is invalidated so as to delete the audio data on the disc 90. For example, link information TINFn to a track descriptor corresponding to the audio data is deleted from the play order table. In addition, link information PINFn to a track descriptor corresponding to the audio data is deleted from the programmed file order table. Alternatively, a track descriptor itself corresponding to the audio data may be deleted. Thus, the audio data cannot be used on the disc 90. As a result, the audio data has been moved from the disc 90 to the personal computer 100.

(2) When the audio data are copied to the personal computer 100 at step (1), a track descriptor corresponding to the audio data is also copied to the HDD of the personal computer 100.

(3) Next, the personal computer 100 sets the number of predetermined times for example three times to the number of permissible check-out times of the copyright management information in the track descriptor corresponding to the audio data that has been copied from the disc 90 and moved.

(4) Next, the personal computer 100 obtains a content ID for the moved audio data in accordance with the track descriptor copied from the disc 90. The content ID is recorded as a content ID that represents audio data that can be checked in.

(5) Next, the personal computer 100 decrements the number of permissible check-out times in the copyright management information of the track descriptor corresponding to the moved audio data by 1 from the number of predetermined times that has been set at step (3). In this example, the number of permissible check-out times becomes (3−1=2) times.

(6) Next, the disc drive device 1 (not shown) into which the disc 90 is loaded validates the track descriptor corresponding to the moved audio data. For example, link information TINFn and PINFn, which have been deleted at step (1), are restored or recreated. As a result, the track descriptor corresponding to the audio data is validated. When the track descriptor corresponding to the audio data has been deleted at step (1), the track descriptor is recreated. Alternatively, the corresponding track descriptor recorded in the personal computer 100 may be transferred to the disc drive device 1 and recorded onto the disc 90.

After steps (1) to (6) have been performed, it can be considered that the sequence of the check-out process has been completed. Thus, audio data can be copied from the disc 90 to the personal computer 100 while copyright of the audio data is protected and user's time and labor are reduced.

It is preferred to apply the copy operation for audio data at steps (1) to (6) to audio data that the user has recorded onto the disc 90 with the disc drive device 1.

When audio data that has been checked out is checked in, the personal computer 100 searches for audio data and control information of a track descriptor, for example copyright management information, makes a determination in accordance with the obtained audio data and control information, and executes a check-in operation.

10. About Synchronization with Library

Next, an embodiment of the present invention will be described. According to the embodiment of the present invention, groups created in a library of contents stored in a personal computer 100 are correlated with disc IDs of discs 90 so that each of the discs 90 can be synchronized with the library.

FIG. 47 shows an example of the structure of software according to an embodiment of the present invention. A juke box application 300 is installed in the personal computer 100. The juke box application 300 stores contents such as music data ripped from a CD (Compact Disc) and/or downloaded from a network such as the Internet in for example a hard disk drive, creates a library of the stored contents, and provides a user interface for operating the library. In addition, the juke box application 300 controls the connection of the personal computer 100 and the disc drive device 1. The function of the foregoing utility software can be contained in the juke box application 300.

The juke box application 300 has a database management module 301. The database management module 301 correlatively manages a disc ID that identifies a disc 90 and a group of the library with a disc ID database or a disc ID list. According to the embodiment of the present invention, the UID is used as a disc ID. Groups that the database management module 301 manages and the disc ID database or disc ID list will be described later.

The juke box application 300 operates through a security module 302 on an OS 303 installed in the personal computer 100. The security module 302 has a license compliance module (LCM) prescribed in SDMI (Secure Digital Music Initiative). The LCM performs an authenticating process between the juke box application 300 and the disc drive device 1. In addition, the security module 302 checks the consistency of the content ID and the UID. An exchanging operation is performed between the juke box application 300 and the disc drive device 1 through the security module 302.

On the other hand, next generation MD drive firmware 320 is installed in the disc drive device 1. The next generation MD drive firmware 320 is software that controls the operation of the disc drive device 1 itself. The personal computer 100 controls the disc drive device 1 and exchanges data with the disc drive device 1 by communicating between the next generation MD drive firmware 320 and the OS 303 through a next generation MD device driver 304.

The next generation MD drive firmware 320 can upgrade the version on the personal computer 100 side through for example a cable that connects the personal computer 100 and the disc drive device 1 or a communication interface 310 such as a network.

In addition, the juke box application 300 is recorded in a recording medium such as a CD-ROM (Compact Disc-Read Only Memory) and supplied therewith. When the recording medium is loaded into the personal computer 100 and a predetermined operation is performed, the juke box application 300 recorded in for example the recording medium is stored in for example the hard disk drive of the personal computer 100. Alternatively, the juke box application 300 (or an installer of the jukebox application 300) may be supplied to the personal computer 100 through a network such as the Internet.

Next, the disc ID database or disc ID list that the database management module 301 manages will be described. The library can set groups of contents. When contents are correlated with groups in accordance with an appropriate criterion, the contents can be categorized. According to an embodiment of the present invention, disc IDs that identify discs 90 and groups can be correlated. As the disc IDs, the foregoing UIDs can be used.

Next, with reference to FIG. 48A and FIG. 48B, the database managed by the juke box application 300 will be described in brief. FIG. 48A shows an example of the structure of a disc ID database or a disc ID list. The database management module 301 correlatively manages groups and disc IDs with the disc ID database or disc ID list. As a more practical example, as shown in FIG. 48A, group names are correlated with disc IDs, non-used capacities of discs 90 identified by the disc IDs, a dynamic flag, and a change flag. In addition, the group names may be correlated with other attributes.

The structures of the databases shown in FIG. 48A and FIG. 48B are just examples of the embodiment of the present invention. Thus, the present invention is not limited to these structures.

Field "group name" is a field for group names. The user can set a group name with the juke box application 300. Alternatively, the user can use group names that the juke box application 300 provides. In the example shown in FIG. 48A, the juke box application 300 provides for example group names "songs you have often listened this week" and "new songs" (hereinafter referred to as group "songs you have often listened this week" and group "new songs").

Field "dynamic flag" describes a dynamic flag that determines whether or not the current group is a dynamic group whose contents can be dynamically changed. The juke box application 300 may preset the dynamic flag. Alternatively, the user may set the dynamic flag. In the example shown in FIG. 48A, the juke box application 300 presets groups "songs you have often listened this week" and "new songs" as dynamic groups. The dynamic flag of each of these groups has a value that represents a dynamic group. In this example, when the value of the dynamic flag of a group is "1," it represents that the group is a dynamic group. When the value of the dynamic flag of a group is "0," it represents that the group is not a dynamic group.

Field "change flag" describes a change flag that determines whether or not the contents of the current group have been changed after the library of the personal computer 100 had been synchronized with the disc drive device 1 until the next synchronizing process is preformed. In this example, when the value of the change flag of a group is "1," it represents that the group has been changed. When the value of the change flag of a group is "0," it represents that the current group has not been changed.

In addition, each group is correlated with information about contents thereof. Alternatively, group information is correlated with each content of the library. FIG. 48B shows an example of the structure of the content database or content list with which information about contents are correlated. In the content database or content list, content IDs that identify contents contained in a group (group name "songs you have often listened this week") are correlated with a group name. For example, a content database or a content list is dynamically created for each group of which the value of the dynamic flag in the disc ID database or disc ID list shown in FIG. 48A is "1."

Field "content ID" is a field for content IDs. Each content ID has a data length of for example 128 bits. When a content is captured by the juke box application 300 and stored in the library, the security module 302 assigns the content a content ID. Contents of the library can be identified by content IDs.

In addition, attributes of contents are correlated with content IDs. In the example shown in FIG. 48B, the number of permissible CO (Check Out) times of each content of the group, the cumulative number of reproduction times of each content of the group, and the reproduction order of contents of the group are registered in fields "number of permissible CO times," "number of reproduction times," and "reproduction order." These attributes of the contents are correlated with content IDs in field "content ID." Of course, other information can be correlated with content IDs. In FIG. 48B, content IDs are correlated with a group. Alternatively, groups may be correlated with content IDs registered in the library. Alternatively, the library may be managed in accordance with the foregoing first managing method or second managing method for music data.

Figure 49:
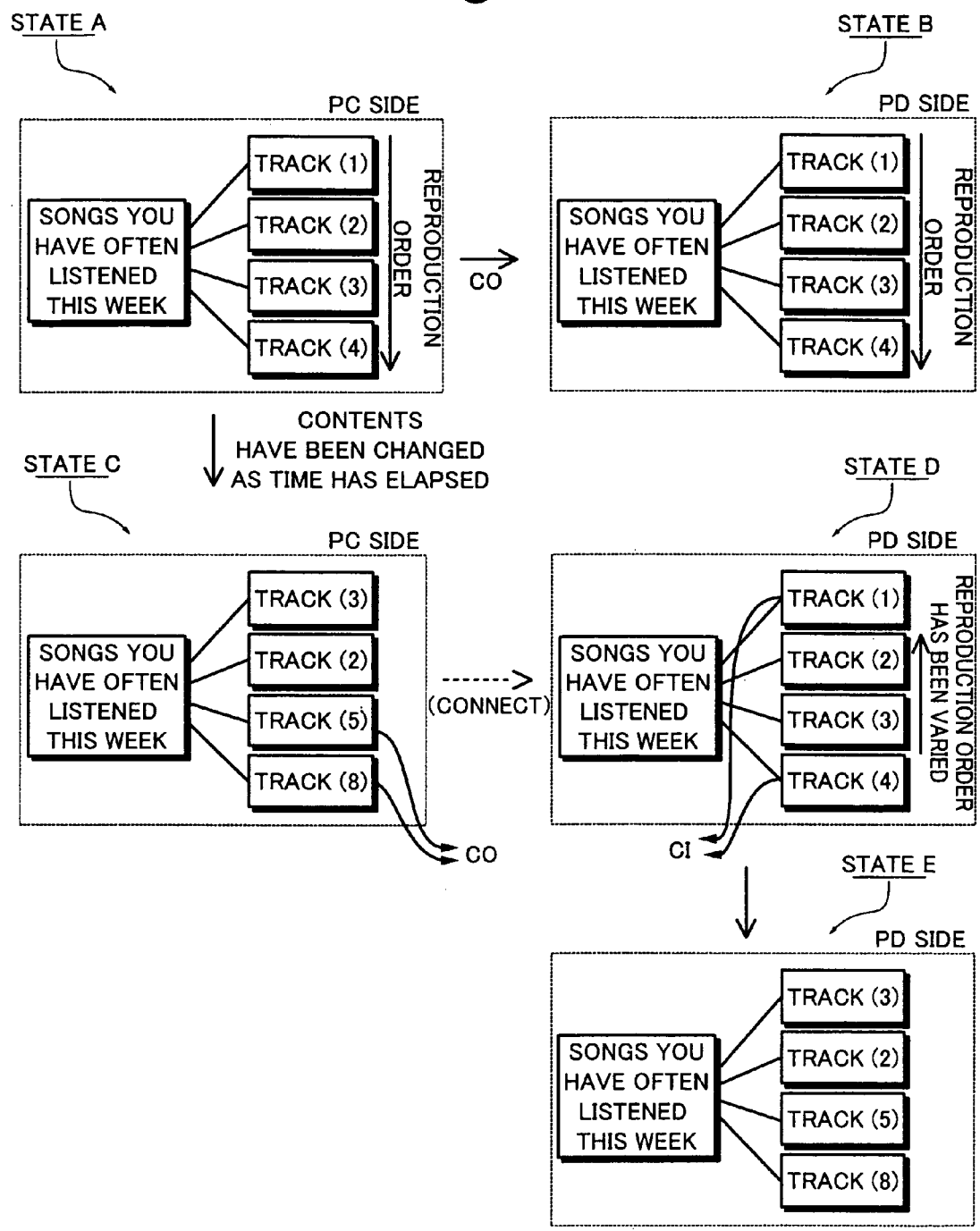
FIG. 49 is a schematic diagram describing a concept of automatic synchronization for contents of a group according to an embodiment of the present invention.

Next, with reference to FIG. 49, a concept of automatic synchronization for contents of a group according to an embodiment of the present invention will be described. In FIG. 49, state A and state C represent states on the personal computer 100 side. State B, state D, and state E represent states on the disc drive device 1 side (denoted by PD: Portable Device in FIG. 49).

Next, the case that group "songs you have often listened this week" of the library on the personal computer 100 side are checked out to the disc 90 will be described. Group "songs you have often listened this week" is a group of contents that have been highly ranked by the number of reproduction times in one week. Thus, since group "songs you have often listened this week" is a dynamic group, the value of the dynamic flag of the group has been set to "1."

Initially, as exemplified in state A of FIG. 49, on the personal computer 100 side, group "songs you have often listened this week" contains track (1), track (2), track (3), and track (4) as contents that are reproduced in the order. The contents are reproduced in the order of track (1), track (2), track (3), and track (4).

When the disc drive device 1 into which the disc 90 of the next generation MD 1, the next generation MD 1.5, or the next generation MD 2 has been loaded is connected to the personal computer 100, the LCM of the security module 302 authenticates the connected disc drive device 1 and the loaded disc 90.

When the disc drive device 1 and the disc 90 have been authorized as an authorized device and an authorized disc, respectively, track (1), track (2), track (3), and track (4) of group "songs you have often listened this week" of the personal computer 100 are checked out to the disc drive device 1. These contents are transferred to the disc drive device 1 along with content IDs corresponding to the contents. In addition, the group name and reproduction order information are transferred to the disc drive device 1. As exemplified in state B of FIG. 49, the contents of group "songs you have often listened this week" of the personal computer 100 are recorded onto the disc 90 along with corresponding content IDs. In addition, the group name and the reproduction order are reflected to the contents recorded in the personal computer 100.

Thereafter, the personal computer 100 and the disc drive device 1 are disconnected. The user repeatedly reproduces contents with the juke box application 300 on the personal computer 100. As a result, the number of reproduction times of each of the contents varies. As exemplified in state C of FIG. 49, the contents of group "songs you have often listened this week" have been changed. In state C of FIG. 49, track (1) and track (4) are removed from contents in state A of FIG. 49. Instead, track (5) and track (8) are added. In state C of FIG. 49, contents are reproduced in the order of track (3), track (2), track (5), and track (8).

In state C of FIG. 49, the disc 90 to which the contents of group "songs you have often listened this week" have been checked out is loaded into the disc drive device 1. Thereafter, the personal computer 100 and the disc drive device 1 are connected. When they are connected, the security module 302 performs an authenticating process for the disc drive device 1 and the disc 90. When the juke box application 300 performs the authenticating process, the juke box application obtains the UID of the disc 90. After the juke boxy application 300 has finished the authenticating process, the juke box application 300 reads information of the disc 90.

With reference to the disc ID database or disc ID list and content database or content list in accordance with the disc ID, the juke box application 300 compares contents recorded on the disc 90 with contents of the group correlated with the disc ID in the library. Corresponding to the compared results, the library of the personal computer 100 and the contents of the disc 90 are synchronized.

In the example shown in FIG. 49, track (5) and track (8) of contents of group "songs you have often listened this week" on the personal computer 100 have not been recorded on the disc 90. On the other hand, track (1) and track (4) recorded on the disc 90 are not contained in group "songs you have often listened this week" correlated with the disc ID of the disc 90 in the library of the personal computer 100.

As exemplified in state C of FIG. 49, the juke box application 300 checks out track (5) and track (8) of the library to the disc 90. As exemplified in state D of FIG. 49, track (1) and track (4) are checked in to the library of the personal computer 100. In addition, the juke box application 300 changes the reproduction order of the contents of the disc 90 so that the reproduction order matches the reproduction order of the contents of group "songs you have often listened this week" on the personal computer 100.

When the foregoing process is successively performed, as exemplified in state E of FIG. 49, the recorded contents of the disc 90 become the same as the contents of group "songs you have often listened this week" on the personal computer 100 side. As a result, the library of the personal computer 100 is synchronized with the disc 90. At that point, the content IDs of the contents recorded on the disc 90 become the same as the content IDs of the contents of the library of the personal computer 100. As a result, the content IDs of the contents recorded on the disc 90 are synchronized with the content IDs of the contents of the library.

The process from state A to state E of FIG. 49 is automatically and successively performed when the disc drive device 1 into which the disc 90 has been loaded is connected to the personal computer 100. When the user loads the disc 90 into the disc drive device 1 and connects the disc drive device 1 to the personal computer 100, the disc 90 can be synchronized with the library of the personal computer 100.

Figure 50:
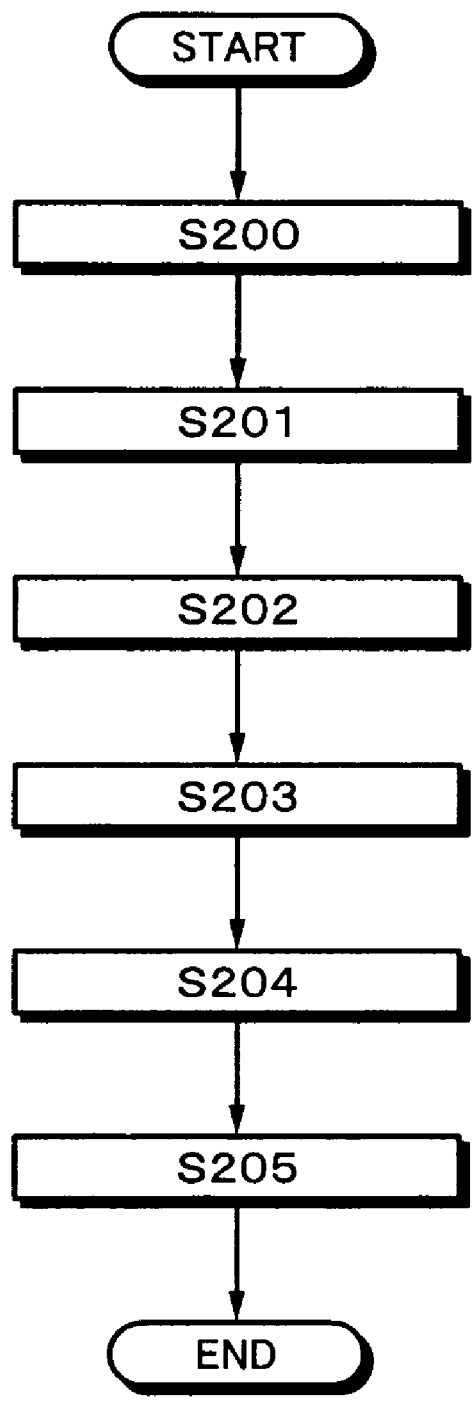
FIG. 50 is a flow chart showing an example of a process for newly creating a dynamic group on the personal computer side.

FIG. 50 is a flow chart showing an example of a process for newly creating a dynamic group on the personal computer 100 side. At step S200, the disc drive device 1 into which the disc 90 has been loaded is connected to the personal computer 100. In addition, the juke box application 300 is started on the personal computer 100 (not shown).

At step S201, the user operates the juke box application 300 and selects contents to be checked out as a dynamic group from the library. The user can use a dynamic group that the juke box application 300 provides in advance or a group that he or she has created as a dynamic group. When the user defines a new group by operating the juke box application 300, he or she sets a group name and designates the group as a dynamic group.

As an example, the juke box application 300 displays a library management screen having a group display portion and a library display portion on the display of the personal computer 100. The user sets a group name in accordance with data displayed on the group display portion and designates the group as a dynamic group. The group display portion displays for example an icon of the group name that the user has set as a dynamic group. On the other hand, the library display portion displays for example a list of contents. The user selects contents in accordance with data displayed on the library display portion and registers the selected contents to the library.

At step S202, it is determined whether or not the disc 90 of the next generation MD 1, the disc 90 of the next generation MD 1.5, or the disc 90 of the next generation MD 2 has been loaded into the disc drive device 1 (abbreviated as PD). When the disc 90 has been loaded into the disc drive device 1, the security module 302 reads the UID of the disc 90 so as to perform the authenticating process for the disc 90.

When the disc 90 has not been loaded into the disc drive device 1, for example the user loads the disc 90 into the disc drive device 1. At that point, it is preferred that the juke box application 300 should warn the user that the disc 90 has not been loaded into the disc drive device 1 and prompt the user to load the disc 90 into the disc drive device 1. When the disc 90 is loaded into the disc drive device 1, the security module reads the UID of the disc 90 and performs the authenticating process for the disc 90.

At step S203, the juke box application 300 obtains the UID of the disc 90. The disc ID is correlated with the dynamic group that has been set at step S201. The database management module 301 registers the disc ID and the dynamic group to the disc ID database or disc ID list. For example the group name is registered to field "group name" of the foregoing disc ID database or disc ID list and the value of the dynamic flag corresponding to the group is set to "1."

At step S204, the contents selected as the dynamic group at step S201 are checked out to the disc 90. In other words, the contents selected from the library of the personal computer 100 are transferred from the personal computer 100 to the disc drive device 1 along with the content IDs of the contents. At that point, in the content database of the personal computer 100, the number of permissible check-out times for each content that has been transferred is decremented by 1.

The disc drive device 1 records the transferred contents to the loaded disc 90. When the disc drive device 1 manages the contents in accordance with the foregoing first managing method, the contents are recorded as audio blocks of audio data files. In addition, track index files are described. The reproduction order of the contents is described in the play order table on the personal computer 100 side. The track numbers of the transferred contents are described in the group descriptors of the group information table. In addition, the group name that has been set by the juke box application 300 on the personal computer 100 side is described in the group information table. The content IDs transferred from the personal computer 100 along with the contents are described in the track information table. In addition, the part information table and the name table are described in a predetermined manner.

When the disc drive device 1 manages the contents in accordance with the foregoing second managing method, data are recorded onto the disc in the foregoing manner.

After a new dynamic group has been designated and contents thereof have been recoded onto the disc 90, when the contents of the dynamic group are changed on the personal computer 100 side, the value of the change flag corresponding to the dynamic group in the disc ID database or disc ID list is set to "1."

It is preferred that when the value of the change flag is set to "1," the indication of an icon corresponding to the dynamic group should be varied so that the user can easily recognize that the group has been changed.

Figure 51:
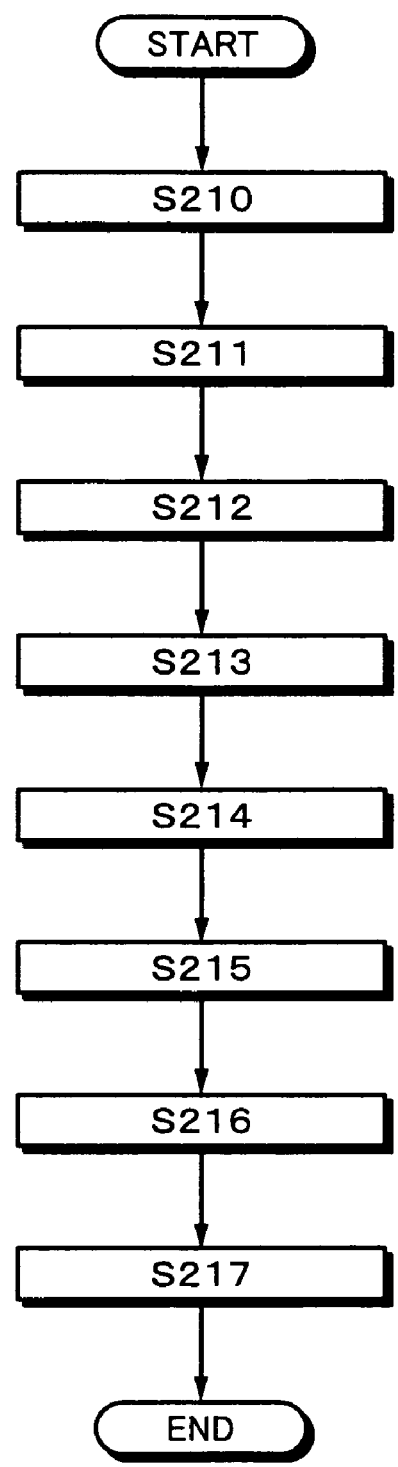
FIG. 51 is a flow chart showing an example of a process performed when the personal computer is connected to the disc drive device after a new dynamic group has been created.

FIG. 51 is a flow chart showing an example of a process performed when the personal computer 100 is connected to the disc drive device 1 after the process shown in FIG. 50 has been performed. At step S210, the personal computer 100 is connected to the disc drive device 1. At step S211, the personal computer 100 side determines whether or not the disc 90 has been loaded into the connected disc drive device 1 (abbreviated as PD). When the disc 90 has been loaded into the disc drive device 1, the security module 302 reads the UID of the disc 90 so as to perform the authenticating process for the disc 90.

When the disc 90 has not been loaded into the disc drive device 1, for example the user loads the disc 90 into the disc drive device 1. At that point, it is preferred that the juke box application 300 should warn the user that the disc 90 has not been loaded into the disc drive device 1 and prompt the user to load the disc 90 into the disc drive device 1. When the disc 90 is loaded into the disc drive device 1, the security module reads the UID of the disc 90 and performs the authenticating process for the disc 90.

At step S212, for example the database management module 301 determines whether or not the UID of the disc 90 has been registered as the disc ID in the disc ID database or disc ID list of the personal computer 100 and whether or not the dynamic group has been correlated with the disc ID. When the disc ID of the disc 90 has not been registered to the disc ID database or disc ID list or even if the disc ID of the disc 90 has been registered to the disc ID database or disc ID list, when the determined result represents that the disc ID has not been correlated with the dynamic group, the process is finished (not shown).

On the other hand, when the disc ID of the disc 90 has been registered to the disc ID database or disc ID list and the disc ID has been correlated with the dynamic group, the flow advances to step S213. At step S213, for example the database management module 301 determines whether or not the value of the change flag of the dynamic group has been set to "1" in accordance with the disc ID database or disc ID list. When the determined result represents that the value of the change flag has not been set to "1," the process is finished (not shown).

When the determined result at step S213 represents that the value of the change flag corresponding to the dynamic group has been set to "1," for example the database management module 301 compares the contents of the dynamic group on the personal computer 100 side with the contents of the disc 90 loaded into the disc drive device 1.

When the determined result at step S213 represents that they do not match, the flow advances to step S214. At step S214, contents that exist on only the disc 90 are checked in from the disc 90 to the personal computer 100. In other words, on the disc drive device 1 side, contents that exist on only the disc 90 are deleted therefrom. In addition, the juke box application 300 increments the number of permissible check-out times for each of the contents in the content data base or content list by 1.

Thereafter, at step S215, on the personal computer 100 side, contents that exist in only the dynamic group are checked out to the disc 90. In other words, the juke box application 300 transfers the contents and content IDs corresponding thereto from the personal computer 100 to the disc drive device 1. The transferred contents and content IDs are recorded onto the disc 90 in a predetermined manner.

When the disc drive device 1 manages the contents in accordance with the foregoing first managing method, the contents are recorded as audio blocks of audio files. In addition, a track index file is described. The track numbers of the transferred contents are described in the group descriptors of the group information table. In addition, the group name that has been set by the juke box application 300 on the personal computer 100 side is described in the group descriptor. The content IDs transferred along with the contents from the personal computer 100 are described in the track information table. In addition, the part information table and the name table are described in a predetermined manner.

In addition, the juke box application 300 decrements the number of permissible check-out times for each of the contents by 1.

At step S216, the reproduction order of contents that have been checked out to the disc 90 and recorded onto the disc 90 is changed so that the reproduction order thereof matches the reproduction order of the dynamic group on the personal computer 100 side. For example, the juke box application 300 transfers information that represents the reproduction order of the contents from the personal computer 100 to the disc drive device 1. The disc drive device 1 rewrites the play order table in accordance with the transferred information.

Thereafter, at step S217, on the personal computer 100 side, the value of the change flag corresponding to the dynamic group is set to "0." As a result, the process is finished.

As described above, according to the embodiment of the present invention, when the personal computer 100 side and the disc drive device 1 are connected, the process for synchronizing the library and the recorded contents of the disc 90 is automatically performed in accordance with the value of the change flag in the disc ID database or disc ID list. In other words, when the personal computer 100 side and the disc drive device 1 are connected, management information about the disc 90 is dynamically generated in accordance with the disc ID database or disc ID list.

In the foregoing example, after contents recorded on the disc 90 are checked in (at step S214), the personal computer 100 checks out contents to the disc 90 (at step S215). Alternatively, after contents are checked out, contents recorded on the disc 90 may be checked in. In reality, it is desired that after contents of the disc 90 are checked in, contents should be checked out because of the limited capacity of the disc 90 loaded into the disc drive device 1.

In the foregoing example, contents of one group are checked out to the disc 90. However, the present invention is not limited to such an example. When the disc 90 has a sufficient capacity, it is possible to check out contents of a plurality of groups to the disc 90. On the disc 90, a plurality of groups can be identified with reference to the group information table.

In this case, when the disc drive device 1 into which the disc 90 has been loaded is connected to the personal computer 100, the juke box application 300 determines whether or not the disc ID of the disc 90 has been registered in the ID database 301. In addition, the juke box application 300 checks the group information table for information about the disc 90 so as to determine whether or not there is a group descriptor that describes a group as a dynamic group. When there is a group descriptor that describes a group checked out as a dynamic group, the contents of the group are synchronized with the library in the foregoing manner. When there are a plurality of groups checked out as dynamic groups, the contents of each of the groups are synchronized with the library in the foregoing manner. Of course, when contents of only one group have been recorded on the disc 90, the foregoing method can be applied.

DESCRIPTION OF REFERENCE NUMERALS

1 DISC DRIVE DEVICE
2 MEDIUM DRIVE PORTION
3 MEMORY TRANSFER CONTROLLER
4 CLUSTER BUFFER MEMORY
5 AUXILIARY MEMORY
6, 8 USB INTERFACE
7 USB HUB
10 AUDIO PROCESSING PORTION
12 RS-LDC ENCODER
13 1-7 pp MODULATING PORTION
14 ACIRC ENCODER
15 EFM MODULATING PORTION
16 SELECTOR
17 MAGNETIC HEAD DRIVER
18 MAGNETIC HEAD
18 OPTICAL HEAD
19 1-7 DEMODULATING PORTION
22 RS-LDC DECODER
23 EFM MODULATING PORTION
24 ACIRC DECODER
26 SELECTOR
30 ADIP DEMODULATING PORTION
32, 33 ADDRESS DECODER
50 SWITCH
90 DISC
100 PERSONAL COMPUTER
300 JUKE BOX APPLICATION
301 DATABASE MANAGEMENT MODULE
302 SECURITY MODULE
S100 CHECK UID.
S101 RECORD UTOC.
S102 RECORD ALERT TRACK.
S103 RECORD DDT.

S104 RECORD UNIQUE ID.
S105 RECORD FAT AND SO FORTH.
S110 CHECK UID.
S111 RECORD DDT.
S112 UNIQUE ID
S113 RECORD FAT AND SO FORTH.
S200 CONNECT PC AND PD.
S201 USER SELECTS DYNAMIC GROUP TO BE CHECKED OUT.
S202 HAS DISC BEEN LOADED INTO PD ?
S203 RECORD DISC ID AND NAME OF DYNAMIC GROUP TO DB OF PC.
S204 PERFORM CHECK-OUT OPERATION.
S205 (THEREAFTER, WHEN DYNAMIC GROUP HAS CHANGED ON PC, SET VALUE OF CHANGE FLAG OF DB TO "1.")
S210 CONNECT PC AND PD.
S211 HAS DISC BEEN LOADED INTO PD ?
S212 HAS DISC ID OF DISC LOADED INTO PD BEEN RECORDED IN DB OF PC ? HAS DYNAMIC GROUP ALSO BEEN REGISTERED ?
S213 HAS VALUE OF CHANGE FLAG OF DYNAMIC GROUP BEEN SET TO "1" ?
S214 CHECK IN CONTENTS THAT EXIST ON ONLY PD SIDE.
S215 CHECK OUT CONTENTS THAT EXIST ON ONLY PC SIDE.
S216 CHANGE REPRODUCTION ORDER OF CONTENTS ON PD SIDE IN ACCORDANCE WITH REPRODUCTION ORDER OF CONTENTS ON PC SIDE.
S217 SET VALUE OF CHANGE FLAG OF DYNAMIC GROUP TO "0."

The invention claimed is:

1. A content data transferring system for transferring content data comprising:
a first recording medium on which a plurality of content data are recorded;
a recording and reproducing apparatus configured to reproduce a recording medium identification information unique to a second recording medium and recorded on the second recording medium, to reproduce an existing reproduction control information recorded on the second recording medium identifying content data recorded on the second recording medium, and to record content data transferred from the first recording medium onto the second recording medium;
a set creating device configured to categorize the plurality of content data recorded on the first recording medium in accordance with a predetermined rule into a group of content data and correlate the recording medium identification information with the group and record the correlation, the group identifying a portion of the plurality of content data recorded on the first recording medium that satisfies the predetermined rule;
a reproduction control information creating device configured to create a new reproduction control information, for the group, based on the recording medium identification information and the correlation recorded by the set creating device of the group correlated with the recording medium identification information, the new reproduction control information identifying the content data recorded on the first recording medium that satisfy the predetermined rule and are categorized into the group; and
a content transfer controlling device configured to transfer, in response to a comparison of the existing reproduction control information with the new reproduction control information, content data from the first recording medium to the second recording medium which are categorized into the group, satisfy the predetermined rule and are not recorded on the second recording medium based on the comparison of the existing reproduction control information with the new reproduction control information.

2. The content data transferring system as set forth in claim 1,
wherein the content transfer controlling device is configured to transfer the newly created reproduction control information to the recording and reproducing apparatus to record the newly created reproduction control information onto the second recording medium to replace the existing reproduction control information with the newly created reproduction control information.

3. The content data transferring system as set forth in claim 1,
wherein the content data recorded on the first recording medium are managed in accordance with the number of permissible record times for each of content data transferred from the first recording medium to other recording mediums, and
wherein when each of content data which have not been recorded on the second recording medium is transferred thereto, the number of permissible record times for each of the content data is decremented.

4. The content data transferring system as set forth in claim 1,
wherein when content data that have not been recorded on the second recording medium are transferred thereto, the newly created reproduction control information is transmitted to the recording and reproducing apparatus so as to record the newly created reproduction control information onto the second recording medium.

5. The content data transferring system as set forth in claim 1,
wherein content data recorded on to the second recording medium, that are not indicated by the newly created reproduction control information, are deleted from the second recording medium in accordance with the newly created reproduction control information.

6. The content data transferring system as set forth in claim 5,
wherein each of the content data recorded on the first recording medium is managed in accordance with a number of permissible record times for each of the contents that are recorded from the first recording medium onto other recording mediums including the second recording medium, and
wherein the number of permissible record times for a recorded content data is incremented when the recorded content data is deleted from the second recording medium.

7. The content data transferring system as set forth in claim 1,
wherein the reproduction control information is information with which the reproduction order of content data is controlled.

8. The content data transferring system as set forth in claim 1,
wherein the second recording medium can be loaded into and unloaded from the recording and reproducing apparatus.

9. The content data transferring system as set forth in claim 8,
wherein the new reproduction control information is created in response to loading the second recording medium into the recording and reproducing apparatus.

10. A content data transferring method for transferring content data selected from a first recording medium on which a plurality of content data have been recorded to a second recording medium different from the first recording medium comprising:
reproducing a recording medium identification information unique to the second recording medium by a recording and reproducing apparatus configured to record data to the second recording medium and reproduce data from the second recording medium;
reproducing an existing reproduction control information recorded onto the second recording medium by the recording and reproducing apparatus, the existing reproduction control information identifying content data recorded on the second recording medium;
categorizing the plurality of content data recorded on the first recording medium in accordance with a predetermined rule into a group of content data;
correlating the recording medium identification information with the group and recording the correlation, the group identifying a portion of the plurality of content data recorded on the first recording medium that satisfies the predetermined rule;
creating a new reproduction control information, for the group, based on the recording medium identification information and the correlation recorded on the first recording medium, the new reproduction control information identifying the content data recorded on the first recording medium that satisfy the predetermined rule and are categorized into the group;
comparing the existing reproduction control information to the new reproduction control information; and
transferring, in response to and based on a result of the comparing, content data from the first recording medium to the second recording medium which are categorized into the group, satisfy the predetermined rule and are not recorded on the second recording medium.

11. The content data transferring method as set forth in claim 10,
wherein the newly created reproduction control information is transferred to the recording and reproducing apparatus and recorded onto the second recording medium to replace the existing reproduction control information.

12. The content data transferring method as set forth in claim 10,
wherein the content data recorded on the first recording medium are managed in accordance with the number of permissible record times for each of content data transferred from the first recording medium to other recording mediums, and
wherein when each of content data which have not recorded on the second recording medium is transferred thereto, the number of permissible record times for each of the content data is decremented.

13. The content data transferring method as set forth in claim 10,
wherein when content data that have not been recorded on the second recording medium are transferred thereto, the newly created reproduction control information is transmitted to the recording and reproducing apparatus so as to record the newly created reproduction control information onto the second recording medium.

14. The content data transferring method as set forth in claim 10,
wherein content data recorded on the second recording medium, that are not indicated by the newly created reproduction control information, are deleted from the second recording medium in accordance with the newly created reproduction control information.

15. The content data transferring method as set forth in claim 14,
wherein each of the content data recorded on the first recording medium is managed in accordance a the number of permissible record times for each of the contents that are recorded from the first recording medium onto other recording mediums including the second recording medium, and
wherein the number of permissible record times for a recorded content data is incremented when the recorded content data is deleted from the second recording medium.

16. The content data transferring method as set forth in claim 10,
wherein the reproduction control information is information with which the reproduction order of content data is controlled.

17. The content data transferring method as set forth in claim 10,
wherein the second recording medium can be loaded into and unloaded from the recording and reproducing apparatus.

18. The content data transferring method as set forth in claim 17,
wherein the new reproduction control information is created in response to loading the second recording medium into the recording and reproducing apparatus.

* * * * *